United States Patent
Masuda et al.

(10) Patent No.: US 7,309,740 B2
(45) Date of Patent: Dec. 18, 2007

(54) BIAXIALLY ORIENTED POLYPROPYLENE FILM

(75) Inventors: Jun'ichi Masuda, Kyoto (JP); Shigeru Tanaka, Yasu-gun (JP); Tai Sasamoto, Yokohama (JP); Masatoshi Ohkura, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/416,396

(22) PCT Filed: May 8, 2002

(86) PCT No.: PCT/JP02/04466

§ 371 (c)(1),
(2), (4) Date: May 9, 2003

(87) PCT Pub. No.: WO02/092671

PCT Pub. Date: Nov. 21, 2002

(65) Prior Publication Data

US 2004/0053064 A1    Mar. 18, 2004

(30) Foreign Application Priority Data

May 11, 2001   (JP) ............................. 2001-141119

(51) Int. Cl.
*C08L 23/10*    (2006.01)
(52) U.S. Cl. .................. 525/240; 428/910; 428/461
(58) Field of Classification Search ................ 428/910, 428/461; 525/240
See application file for complete search history.

(56) References Cited

U.S. PATENT DOCUMENTS

| 5,209,892 | A  | * | 5/1993 | Breidt et al. ................ 264/544 |
| 6,596,814 | B2 | * | 7/2003 | Kim et al. ................... 525/191 |
| 6,723,795 | B1 | * | 4/2004 | Dupire et al. ................ 525/240 |
| 6,770,697 | B2 | * | 8/2004 | Drewniak et al. ........... 524/445 |
| 2002/0156171 | A1 | * | 10/2002 | Drewniak et al. ........... 524/445 |
| 2004/0053064 | A1 | * | 3/2004 | Masuda et al. .............. 428/500 |
| 2004/0054100 | A1 | * | 3/2004 | Debras et al. ................ 526/95 |
| 2004/0110910 | A1 | * | 6/2004 | Arjunan ....................... 526/127 |

FOREIGN PATENT DOCUMENTS

JP    2001/072778    *    3/2001

OTHER PUBLICATIONS

Cimmino et al. "Blends of Isotactic Polypropylene and Natural Terpene Resins, I Phase Structure, Thermal, and Dynamic—Mechanical Properties", Journal of Polymer Science vol. 37, (867-878), 1999.*

* cited by examiner

*Primary Examiner*—D. Lawrence Tarazano
(74) *Attorney, Agent, or Firm*—DLA Piper US LLP

(57) ABSTRACT

A biaxially stretched polypropylene film of the present invention has high stiffness in the film longitudinal direction and can be manufactured by a conventional longitudinal-transverse sequential biaxial stretching method, since the biaxially stretched polypropylene film comprises a polypropylene which comprises a polypropylene having controlled specific values of a melt strength (MS) and a melt flow rate (MFR) at 230° C. or consists of a polypropylene having controlled specific values of a melt strength (MS) and a melt flow rate (MFR) at 230° C. and/or a Trouton ratio of the polypropylene is controlled at a specific value, moreover, the biaxially stretched polypropylene film contains regulated longitudinal fibrils.

11 Claims, No Drawings

BIAXIALLY ORIENTED POLYPROPYLENE FILM

RELATED APPLICATION

This is a §371 of International Application No. PCT/JP02/04466, with an international filing date of May 8, 2002 (WO 02/092671 A1, published Nov. 21, 2002), which is based on Japanese Patent Application No. 2001-141119, filed May 11, 2001.

TECHNICAL FIELD

This disclosure relates to a biaxially stretched polypropylene film suitable in a variety of use including packaging and industrial use.

BACKGROUND ART

Based on the social demand for the reduction of waste and resource, there is an increasing demand for decreasing the film thickness of materials, particularly the materials for packaging uses. Presently, for example, biaxially stretched polypropylene films having a thickness of 20 μm are used as the packaging materials. Most of the biaxially stretched polypropylene films are manufactured by conventional longitudinal-transverse sequential biaxial stretching method. In conventional longitudinal-transverse sequential biaxial stretching method, polymer is melted by an extruder, filtered, extruded from a slit die, and wound around a metal drum to prepare a cooled and solidified unstretched film. The unstretched film is passed between rolls of different rotating speeds and is stretched in the longitudinal direction. The film is then fed into a tenter, is stretched in the transverse direction, is heat-set, cooled, and winded. This process is the typical process for manufacturing biaxially stretched polypropylene films.

Compared with the above-described biaxially stretched polypropylene films having a thickness of 20 μm, a 25% reduction of wastes and resources can be achieved if the same performance and the same converting ability can be achieved with biaxially stretched polypropylene films having a thickness of 15 μm.

To achieve this, biaxially stretched polypropylene films must be tensilized to decrease the elongation against tension applied during the converting process. During the converting process, the tension works in the longitudinal direction of the film. Thus, biaxially stretched polypropylene films must be tensilized mainly in the longitudinal direction.

In general, the heat shrinkage of polypropylene films tends to increase as the polypropylene films are tensilized. When the dimensional stability of the film decreases at high temperatures, the film shrinks during the converting process such as printing, coating, and laminating, thereby drastically decreasing the commercial value of the film. Accordingly, the heat shrinkage must be comparable to or even lower than that of common biaxially stretched polypropylene films.

Japanese Patent Publication of Examined Application Nos. 41-21790, 45-37879, and 49-18628 disclose methods for making films tensilized in the longitudinal directions whereby the film is re-stretched in the longitudinal direction after it is stretched in the longitudinal and transverse direction to increase the longitudinal strength of the film. A drawback of these films tensilized in the longitudinal direction is their low strength in the transverse direction. To overcome this drawback, Japanese Unexamined Patent Application Publication No. 56-51329 discloses a method whereby a polypropylene sheet having predetermined melting/recrystallization temperatures re-stretched in the longitudinal direction after it has been biaxially stretched.

However, in conventional longitudinal-transverse sequential biaxial stretching method, it has been difficult to obtain films tensilized in the longitudinal direction. In other words, in conventional longitudinal-transverse sequential biaxial stretching method, the film must be kept at a certain temperature to maintain a half-melted state because the oriented crystals produced by longitudinal stretching is stretched by transverse stretching. Since most of the crystals become oriented in the transverse direction after transverse stretching, the resulting biaxially stretched polypropylene film has a markedly high strength in the transverse direction when compared to that in the longitudinal direction.

The microstructure, hereinafter referred to as the "fibril structure", of a common biaxially stretched polypropylene film manufactured by a conventional longitudinal-transverse sequential biaxial stretching method is observed with an atomic force microscope (AFM). A network structure consisting of fibrils having a diameter of approximately 20 nm and being mainly oriented in the transverse direction is observed. The fibrils have a high strength in the length direction, but readily deform in the width direction. This fact is considered as the cause of bias of the film strength in the transverse direction.

Moreover, the methods described in Japanese Patent Publication of Examined Application No. 41-21790 and Japanese Unexamined Patent Application Publication No. 56-51329 in which re-stretching in the longitudinal direction is performed are complex, and require high equipment costs. Moreover, the heat shrinkage is higher than that of common biaxially stretched polypropylene films, which is a problem.

SUMMARY

An embodiment (first embodiment) of the biaxially stretched polypropylene film is a biaxially stretched polypropylene film comprising a polypropylene which comprises a polypropylene having a melt strength (MS) and a melt flow rate (MFR) measured at 230° C. that satisfies formula (1) below:

$$\log(MS) > -0.61 \log(MFR) + 0.82 \quad (1).$$

Another embodiment (second embodiment) of the biaxially stretched polypropylene film is a biaxially stretched polypropylene film comprising a polypropylene which consists of a polypropylene having a melt strength (MS) and a melt flow rate (MFR) that satisfies formula (2) below:

$$\log(MS) > -0.61 \log(MFR) + 0.52 \quad (2).$$

Another embodiment (third embodiment) of the biaxially stretched polypropylene film is a biaxially stretched polypropylene film comprising a polypropylene which comprises a polypropylene having a Trouton ratio of 30 or more.

Another embodiment (fourth embodiment) of the biaxially stretched polypropylene film is a biaxially stretched polypropylene film comprising a polypropylene which consists of a polypropylene having a Trouton ratio of 16 or more.

Another embodiment (fifth embodiment) of the biaxially stretched polypropylene film is a biaxially stretched polypropylene film, wherein, in a 1-μm square area of a surface of the film, one side of the area being parallel to the longitudinal direction, at least one longitudinal fibril having a width of at least 40 nm and extending across two sides parallel to the transverse direction is present.

The above-described biaxially stretched polypropylene films not only are tensilized in the longitudinal direction but also have low heat shrinkage and excellent film dimensional stability at high temperatures.

DETAILED DESCRIPTION

A biaxially stretched polypropylene film of a first embodiment comprising a polypropylene which comprises a polypropylene having a melt strength (MS) and a melt flow rate (MFR) measured at 230° C. that satisfies formula (1) below will now be described:

$$\log(MS) > -0.61 \log(MFR) + 0.82 \quad (1).$$

The first embodiment is a biaxially stretched polypropylene film comprising a polypropylene which comprises a polypropylene having a melt strength (MS) and a melt flow rate (MFR) measured at 230° C. that satisfies formula (1) below:

$$\log(MS) > -0.61 \log(MFR) + 0.82 \quad (1).$$

This kind of polypropylene is commonly referred to as "high melt strength (MS) polypropylene (PP), and is hereinafter denoted as "HMS-PP".

The melt strength (MS) at 230° C. is measured by the following process. Using a melt tension tester manufactured by Toyo Seiki Kogyo Co., Ltd., the polypropylene is heated to 230° C., and the resulting molten polypropylene is extruded at an extrusion rate of 15 mm/min to make a strand. The tension of the strand at a take-over rate of 6.5 m/min is measured, and this tension is defined as the melt strength (MS). The unit therefor is cN.

The melt flow rate (MFR) at 230° C. is measured according to Japanese Industrial Standards (JIS) K 6758, whereby a melt flow rate (MFR) under a load of 2.16 kg is measured. The unit therefor is g/10 min.

Because the polypropylene used for the biaxially stretched polypropylene film comprises the polypropylene which comprises the polypropylene that satisfies formula (1), a biaxially stretched polypropylene film having a high strength in the longitudinal direction, which has previously been difficult to manufacture by conventional longitudinal-transverse sequential biaxial stretching method, can be manufactured. In other words, the polypropylene that satisfies formula (1) inhibits the longitudinally-oriented crystals from reorienting in the transverse direction during transverse stretching.

Preferable examples of methods for preparing the polypropylene satisfying formula (1) include a method of blending a polypropylene containing high-molecular-weight components in a large amount, a method of blending polymer or oligomer having a branched structure, a method disclosed in Japanese Unexamined Patent Application Publication No. 62-121704 in which long-chain branched structures are introduced into polypropylene molecules, and a method disclosed in Japanese Patent Publication No. 2869606 in which a straight-chain crystalline polypropylene having a melt strength, an intrinsic viscosity, a crystallizing temperature, and a melting point satisfy a predetermined relationship, and a melting point that satisfy a predetermined relationship, and the boiling-xylene extraction residual rate within a predetermined range is prepared without introducing long-chain branches.

The biaxially stretched polypropylene film especially preferably uses a HMS-PP, the melt strength of which is increased by introducing long-chain branches into polypropylene molecules. Specific examples of the HMS-PP, the melt strength of which is increased by introducing long-chain branches, include HMS-PP (Type name: PF-814, etc.) manufactured by Basell Polyolefins, HMS-PP (Type name: WB130HMS, etc.) manufactured by Borealis, and HMS-PP (Type name: D201, etc.) manufactured by Dow Chemical Company, etc.

An example of an index indicating the degree of long-chain branching in the polypropylene is a branching index g represented by the equation below:

$$g = [\eta]_{LB}/[\eta]_{Lin}$$

wherein $[\eta]_{LB}$ is the intrinsic viscosity of the polypropylene having a long-chain branch, and $[\eta]_{Lin}$ is the intrinsic viscosity of a straight-chain crystalline polypropylene having substantially the same weight average molecular weight as the polypropylene having the long-chain branch. The intrinsic viscosity is measured by a publicly known method in which a sample dissolved in tetralin is measured at 135° C. The weight average molecular weight is measured by a method presented by M. L. McConnell in American Laboratory, May 63-75 (1978), i.e., low-angle laser light scattering photometry.

The branching index g of the polypropylene which is comprised in the biaxially stretched polypropylene film and satisfies formula (1) is preferably 0.95 or less and more preferably, 0.9 or less. At a branching index exceeding 0.95, the effect of adding the polypropylene satisfying formula (1) may be diminished, resulting in insufficient Young's modulus in the longitudinal direction when processed into a film.

The melt strength (MS) of the polypropylene, which is comprised in the biaxially stretched polypropylene film and satisfies formula (1), is preferably in the range of 3 to 100 cN. If a MS is less than 3 cN, the Young's modulus in the longitudinal direction of the resulting film may be insufficient. The Young's modulus in the longitudinal direction tends to increase as the melt strength (MS) becomes larger. However, if a melt strength (MS) exceeds 100 cN, film formability may be degraded. More preferably, the melt strength (MS) of the polypropylene satisfying formula (1) is in the range of 4 to 80 cN, more preferably 5 to 40 cN, and most preferably 5 to 20 cN.

The content of the polypropylene satisfying the formula (1) comprised in the biaxially stretched polypropylene film is not restricted. However, the polypropylene content is preferably 1 to 60 percent by weight. A certain degree of effect can be achieved with a relatively small content. If a polypropylene content is less than 1 percent by weight, the stretchability in the transverse direction may be degraded, and improvements in stiffness in the longitudinal direction may be small. If a polypropylene content exceeds 60 percent by weight, the stretchability in the longitudinal direction, the impact resistance, and the haze of the resulting film may be degraded. More preferably, the content of the polypropylene satisfying formula (1) is in the range of 2 to 50 percent by weight and, furthermore preferably, 3 to 40 percent by weight.

A second embodiment is a biaxially stretched polypropylene film comprising a polypropylene which consists of a polypropylene having a melt strength (MS) and a melt flow rate (MFR) that satisfies formula (2):

$$\log(MS) > -0.61 \log(MFR) + 0.52 \quad (2).$$

Since the polypropylene used in the biaxially stretched polypropylene film comprises a polypropylene which consists of a polypropylene that satisfies the following formula (2), a biaxially stretched polypropylene film having high stiffness in the longitudinal direction, which has previously been difficult to manufacture by conventional longitudinal-transverse sequential biaxial stretching method, can be manufactured.

The polypropylene preferably satisfies formula (3) and, more preferably, satisfies formula (4). Such polypropylenes can be made by adjusting the HMS-PP content, for example. The stiffness in the longitudinal direction can be further improved:

$$\log (MS) > -0.61 \log (MFR) + 0.56 \quad (3),$$

$$\log (MS) > -0.61 \log (MFR) + 0.62 \quad (4).$$

For example, the polypropylene satisfying formula (2) above can be prepared by blending a high-melt-strength polypropylene (HMS-PP) with a common polypropylene, and by introducing long-chain branch components into main-chain of the common polypropylene by means of copolymerization or graft polymerization, so as to increase the melt strength (MS) of the polypropylene. By blending the HMS-PP, the longitudinally oriented crystals are prevented from being re-oriented in the transverse direction during transverse stretching.

In the first and second embodiments, the melt flow rate (MFR) of the polypropylene used in the biaxially stretched polypropylene film is preferably in the range of 1 to 30 g/10 min from the point of view of the film formability. At a melt flow rate (MFR) less than 1 g/10 min, problems such as an increase in filtration pressure during melt extrusion and an increase in time required for replacing extrusion materials may occur. If a melt flow rate (MFR) exceeds 30 g/10 min, the thickness irregularity in the resulting film may be large, which is a problem. The melt flow rate (MFR) is more preferably 1 to 20 g/10 min.

In the first and second embodiments, the meso pentad fraction (mmmm) of the polypropylene in the biaxially stretched polypropylene film is preferably in 90 to 99.5% and, more preferably, 94 to 99.5%. Here, the meso pentad fraction (mmmm) is the index that directly indicates the conformation of isotactic stereo-regularity in polypropylene.

Since a film having a superior dimensional stability, heat resistance, stiffness, moisture-proof property, and chemical resistance can be reliably manufactured by being the meso pentad fraction (mmmm) between 90 to 99.5%, the film that exhibits high converting ability during film converting such as printing, coating, metallization, bag-making, and laminating can be manufactured. If a meso pentad fraction (mmmm) is less than 90%, the resulting film tends to exhibit a less stiffness and a large heat shrinkage, as the result, the converting ability during printing, coating, metallization, bag-making, and laminating may be degraded, and the water vapor permeability may be increased. If a meso pentad fraction (mmmm) exceeds 99.5%, the film formability may be degraded. More preferably, the meso pentad fraction (mmmm) is 95 to 99%, and most preferably, 96 to 98.5%.

In the first and second embodiments, the isotactic index (II) of the polypropylene used in the biaxially stretched polypropylene film is preferably in the range of 92 to 99.8%. If an isotactic index (II) is less than 92%, problems may arise such as less stiffness, large heat shrinkage, and degraded moisture-proof property. If an isotactic index (II) exceeds 99.8%, the film formability may be degraded. The isotactic index (II) is more preferably in the range of 94 to 99.5%.

The polypropylene used in the biaxially stretched polypropylene film of the first and second embodiments may be blended with scrapped films produced during manufacture of the biaxially stretched polypropylene film or scrapped films produced during manufacture of other types of film or other types of resins mainly to improve economical efficiency as long as the characteristics are not degraded.

The polypropylene used in the biaxially stretched polypropylene films of the first and second embodiments mainly comprises homopolymers of the propylene. The polypropylene may be a polymer in which monomer components of other unsaturated hydrocarbons are copolymerized or may be blended with polymers in which propylene is copolymerized with monomer components other than propylene, as long as the purpose can be achieved. Examples of the copolymer components and monomer components for preparing the blended material include ethylene, propylene (for preparing the copolymerized blended material), 1-butene, 1-pentene, 3-methylpentene-1,3-methylbutene-1, 1-hexene, 4-methypenten-1,5-ethylhexene-1,1-octene, 1-decene, 1-dodecene, vinylcyclohexene, styrene, allylbenzene, cyclopentene, norbornene, and 5-methyl-2-norbornene, etc.

The above-described characteristic values of the polypropylene such as the melt strength (MS), the melt flow rate (MFR), the g value, the meso pentad fraction (mmmm), and the isotactic index (II) are preferably measured using raw material chips before film-formation. Alternatively, after film-formation, the film may be subjected to extraction with n-heptane at 60° C. or less for approximately 2 hours to remove impurities and additives and then vacuum-dried at 130° C. for at least 2 hours to prepare a sample. The above-described values may be measured using this sample.

Next, a biaxially stretched polypropylene film comprising a polypropylene which comprises a polypropylene having a Trouton ratio of 30 or more is described as a third embodiment of the present invention.

The third embodiment is a biaxially stretched polypropylene film comprising a polypropylene which comprises a polypropylene having a Trouton ratio of 30 or more.

The Trouton ratio is measured by a converging flow method according to a theory by Cogswell [Polymer Engineering Science, 12, 64 (1972)]. The Trouton ratio is a ratio of the extensional viscosity to shear viscosity at 230° C. and a strain rate of 60 $S^{-1}$ calculated from an extensional viscosity-extensional strain rate curve and a shear viscosity-shear strain rate curve approximated by an exponential function.

Since the biaxially stretched polypropylene film of the third embodiment comprises a polypropylene which comprises a polypropylene having a Trouton ratio of 30 or more, a biaxially stretched polypropylene film having high stiffness in the longitudinal direction, which has previously been difficult to manufacture by a conventional longitudinal-transverse sequential biaxial stretching method, can be manufactured. Namely, the polypropylene having a Trouton ratio of 30 or more prevents the longitudinally oriented crystals from re-orienting in the transverse direction during transverse stretching.

The Trouton ratio of the polypropylene comprised in the biaxially stretched polypropylene film is preferably high. However, at an excessively high ratio, the film formability and surface haze may be degraded. The Trouton ratio of the polypropylene comprised in the biaxially stretched polypropylene film of the present invention is more preferably 35 or more, and furthermore preferably in the range of 40 to 100.

Preferable examples of methods for preparing a polypropylene having a Trouton ratio of 30 or more include a method of blending a polypropylene containing high-molecular-weight components in a large amount, a method of blending polymer or oligomer having a branched structure, a method disclosed in Japanese Unexamined Patent Application Publication No. 62-121704 in which long-chain branched structures are introduced into polypropylene molecules, and a method disclosed in Japanese Patent Publication No. 2869606 in which a straight-chain crystalline polypropylene having a melt strength, an intrinsic viscosity, a crystallizing temperature, and a melting point that satisfy a predetermined relationship, and the boiling-xylene extraction residual rate within a predetermined range is prepared without introducing of long-chain branches, which are the methods of increasing the melt strength (MS) of the polypropylene.

Among these high melt strength polypropylene (HMS-PP) described above, the biaxially stretched polypropylene film of the third embodiment preferably comprises a HMS-PP which has the increased melt strength by introducing long-chain branches into polypropylene molecules. Specific examples of the HMS-PP which has the increased melt strength by introducing a long-chain branch include HMS-PP (Type name: PF-814, etc.) manufactured by Basell Polyolefins, HMS-PP (Type name: WB130HMS, etc.) manufactured by Borealis, and HMS-PP (Type name: D201, etc.) manufactured by Dow Chemical Company, etc.

An example of an index indicating the degree of long-chain branching in the polypropylene is a branching index g represented by the equation below:

$$g=[\eta]_{LB}/[\eta]_{Lin}$$

wherein $[\eta]_{LB}$ is the intrinsic viscosity of the polypropylene having a long-chain branch, and $[\eta]_{Lin}$ is the intrinsic viscosity of a straight-chain crystalline polypropylene having substantially the same weight average molecular weight as the polypropylene having the long-chain branch. The intrinsic viscosity is measured by a publicly known method in which a sample dissolved in tetralin is measured at 135° C. The weight average molecular weight is measured by a method presented by M. L. McConnell in American Laboratory, May 63-75 (1978), i.e., low-angle laser light scattering photometry.

The branching index g of the polypropylene which is comprised in the biaxially stretched polypropylene film of the third embodiment and has a Trouton ratio of 30 or more is preferably 0.95 or less and, more preferably, 0.9 or less. If a branching index exceeds 0.95, the effect of adding the HMS-PP may be diminished, resulting in insufficient Young's modulus in the longitudinal direction when processed into a film. More preferably, the branching index g is 0.9 or less.

The melt strength (MS) of the polypropylene which is comprised in the biaxially stretched polypropylene film of the third embodiment and has a Trouton ratio of 30 or more is preferably in the range of 3 to 100 cN. If a melt strength (MS) is less than 3 cN, the Young's modulus in the longitudinal direction of the resulting film may be insufficient. The Young's modulus in the longitudinal direction tends to increase as the melt strength (MS) becomes larger. However, at a melt strength (MS) exceeding 100 cN, film formability may be degraded. More preferably, the melt strength of HMS-PP is in the range of 4 to 80 cN, more preferably 5 to 40 cN, and furthermore preferably 5 to 20 cN.

The content of the polypropylene having a Trouton ratio of 30 or more comprised in the biaxially stretched polypropylene film of the third embodiment is not restricted. However, the content of the polypropylene having a Trouton ratio of 30 or more is preferably 1 to 60 percent by weight. A certain degree of effect can be achieved with a relatively small content. When the content of the polypropylene having a Trouton ratio of 30 or more is less than 1 percent by weight, the stretchability in the transverse direction may be degraded, and improvements in stiffness in the longitudinal direction may be small. When the content of the polypropylene having a Trouton ratio of 30 or more exceeds 60 percent by weight, the stretchability in the longitudinal direction, the impact resistance, and the haze may be degraded. More preferably, the content of the polypropylene having a Trouton ratio of 30 or more is in the range of 2 to 50 percent by weight and, furthermore preferably, 3 to 40 percent by weight.

A fourth embodiment is a biaxially stretched polypropylene film comprising a polypropylene which consists of a polypropylene having a Trouton ratio of 16 or more.

Because the biaxially stretched polypropylene film according to the fourth embodiment comprises a polypropylene which consists of a polypropylene having a Trouton ratio of 16 or more, a biaxially stretched polypropylene film having high stiffness in the longitudinal direction, which has previously been difficult to manufacture by conventional longitudinal-transverse sequential biaxial stretching, can be manufactured.

The Trouton ratio of the polypropylene used in the biaxially stretched polypropylene film is preferably high. However, at an excessively high ratio, the film formability and the surface haze may be degraded. The Trouton ratio of the polypropylene used in the biaxially stretched polypropylene film is more preferably 18 or more, furthermore preferably in the range of 20 to 50, and most preferably in the range of 20 to 45. The Trouton ratio can be controlled by adjusting the amount of additive HMS-PP as described below, and the stiffness in the longitudinal direction can be further increased.

Examples of methods for preparing a polypropylene having a Trouton ratio of 16 or more include a method in which a high-melt-strength polypropylene (hereinafter, denoted as HMS-PP) having a high melt strength (MS) described below is blended with a common polypropylene and a method in which long-chain branch components are introduced into the main chain of a common polypropylene by means of copolymerization or graft polymerization, so as to increase the melt strength (MS) of the polypropylene. With the HMSPP, the longitudinally-oriented crystals are prevented from re-orienting in the transverse direction during the transverse stretching.

The types of polypropylene used in the biaxially stretched polypropylene film of the fourth embodiment are not restricted as long as the Trouton ratio is 16 or more. For example, a polypropylene having following properties is preferably comprised.

The polypropylene preferably comprises a polypropylene having a Trouton ratio of 30 or more so as to achieve a Trouton ratio of 16 or more. Examples of methods for preparing a polypropylene having a Trouton ratio of 30 or more include a method in which a high-melt-strength polypropylene (hereinafter, HMS-PP) having a high melt strength (MS) is blended with a common polypropylene and a method in which long-chain branch components are introduced into the main chains of a common polypropylene by means of copolymerization or graft polymerization, so as to increase the melt strength (MS) of the polypropylene. With the HMSPP, the longitudinally-oriented crystals are prevented from re-orienting in the transverse direction during the transverse stretching.

In the third and fourth embodiments, the melt flow rate (MFR) of the polypropylene used in the biaxially stretched polypropylene film is preferably in the range of 1 to 30 g/10 min from the point of view of the film formability. If a melt flow rate (MFR) is less than 1 g/10 min, problems such as an increase in filtration pressure during melt extrusion and an increase in time required for replacing extrusion materials may occur. If a melt flow rate (MFR) exceeds 30 g /10 min, the thickness irregularity in the resulting film may be large, which is a problem. The melt flow rate (MFR) is more preferably 1 to 20 g/10 min.

In the third and fourth embodiments, the meso pentad fraction (mmmm) of the polypropylene used in the biaxially stretched polypropylene film is preferably in 90 to 99.5% and, more preferably, 94 to 99.5%. Here, the meso pentad fraction (mmmm) is the index that directly indicates the conformation of isotactic stereo-regularity in polypropylene. If a meso pentad fraction (mmmm) is 90 to 99.5%, a film having superior dimensional stability, heat resistance, stiffness, moisture-proof property, and chemical resistance can be reliably manufactured. Thus, a film that exhibits high converting ability during film converting processes such as printing, coating, metallization, bag-making, and laminating can be manufactured. If a meso pentad fraction (mmmm) is less than 90%, the resulting film tends to exhibit a less stiffness and a large heat shrinkage, which may result in degradation in converting ability during printing, coating, metallization, bag-making, and laminating, and in an increase in high water vapor permeability. If a meso pentad fraction (mmmm) exceeds 99.5%, the film formability may be degraded. More preferably, the meso pentad fraction (mmmm) is 95 to 99% and, most preferably, 96 to 98.5%.

In the third and fourth embodiments, the isotactic index (II) of the polypropylene used in the biaxially stretched polypropylene film is preferably in the range of 92 to 99.8%. If an isotactic index (II) is less than 92%, the resulting film may exhibit a less stiffness, a large heat shrinkage, and may have a degraded moisture-proof property, which are problems. If an isotactic index (II) exceeds 99.8%, the film formability may be degraded. The isotactic index (II) is more preferably in the range of 94 to 99.5%.

The polypropylene used in the biaxially stretched polypropylene film of the third and fourth embodiments may be blended with scrapped films produced during manufacture of the biaxially stretched polypropylene film or scrapped films produced during manufacture of other types of film or other types of resins to improve economical efficiency as long as the characteristics are not degraded.

The polypropylene used in the biaxially stretched polypropylene film of the third and fourth embodiments mainly comprises homopolymers of the propylene. The polypropylene may be a polymer in which monomer components of other unsaturated hydrocarbons are copolymerized or may be blended with a polymer, which is prepared by copolymerizing a propylene with a monomer component other than propylene, as long as the purpose can be achieved. Examples of the copolymer components and monomer components for preparing the blended material include ethylene, propylene (for preparing the copolymerized blended material), 1-butene, 1-pentene, 3-methylpentene-1,3-methylbutene-1,1-hexene, 4-methypentene-1,5-ethylhexene-1,1-octene, 1-decene, 1-dodecene, vinylcyclohexene, styrene, allylbenzene, cyclopentene, norbornene, and 5-methyl-2-norbornene, etc.

The above-described characteristic values of the polypropylene such as the Trouton ratio, the melt strength (MS), the melt flow rate (MFR), the g value, the meso pentad fraction (mmmm), and the isotactic index (II) are preferably measured using raw material chips before film-formation. Alternatively, after film-formation, the film may be subjected to extraction with n-heptane at 60° C. or less for approximately 2 hours to remove impurities and additives and then vacuum-dried at 130° C. for at least 2 hours to prepare a sample. The above-described values may be measured using this sample.

In order to increase the strength and improve the film formability, at least one additive that has compatibility with the polypropylene and can provide plasticity during stretching is comprised in the biaxially stretched polypropylene films of the first, second, third, and fourth embodiments. Here, the additive that can provide plasticity refers to a plasticizer that enables stable stretching to a high stretching ratio. Without the additive, the purpose is not sufficiently achieved, and the film formability is degraded. The additive is preferably at least one of petroleum resin substantially containing no polar group and/or terpene resin substantially containing no polar group from the point of view of achieving stretching to a high stretching ratio and improving barrier property.

The petroleum resin substantially containing no polar group refers to a petroleum resin containing no polar groups such as hydroxyl, carboxyl, halogen, or sulfone, or modified forms thereof, etc. Specific examples of the resin are cyclopentadiene resins made from petroleum unsaturated hydrocarbon and resins containing higher olefin hydrocarbon as the primary component.

Preferably, the glass transition temperature (hereinafter, sometimes referred to as Tg) of the petroleum resin substantially containing no polar group is 60° C. or more. If a glass transition temperature (Tg) is less than 60° C., the effect of improving the stiffness may be small.

Particularly preferably, a hydrogen-added (hereinafter, sometimes referred to as hydrogenated) petroleum resin, whose hydrogenation rate is 90% or more and more preferably 99% or more, is used. A representative example of the hydrogen-added petroleum resin is an alicyclic petroleum resin such as polydicyclopentadiene having a glass transition temperature (Tg) of 70° C. or more and a hydrogenation rate of 99% or more.

Examples of the terpene resin substantially containing no polar group are terpene resins containing no polar group such as hydroxyl, aldehyde, ketone, carboxyl, halogen, or sulfone, or the modified forms thereof, etc., i.e., hydrocarbons represented by $(C_5H_8)n$ and modified compounds derived therefrom, wherein n is a natural number between 2 and 20.

The terpene resins are sometimes called terpenoids. Representative compounds thereof include pinene, dipentene, carene, myrcene, ocimene, limonene, terpinolene, terpinene, sabinene, tricyclene, bisabolene, zingiberene, santalene, campholene, mirene, and totarene, etc. In relation to the biaxially stretched polypropylene film, hydrogen is preferably added at hydrogenation rate of 90% or more, particularly preferably, 99% or more. Among them, hydrogenated β-pinene and hydrogenated β-dipentene are particularly preferred.

The bromine number of the petroleum resin or the terpene resin is preferably 10 or less, more preferably 5 or less, and most preferably 1 or less.

The amount of the additive may be large enough to achieve the plasticizing effect. Preferably, the total amount of the petroleum resin and the terpene resin is in the range of 0.1 to 30 percent by weight. When the amount of the additive resins is less than 0.1 percent by weight, the effect of improving the stretchability and the stiffness in the longitudinal direction may be small and the transparency may be degraded. When an amount exceeds 30 percent by weight, thermal dimensional stability may be degraded, and the additive may bleed out onto the film surface, resulting in degradation of slipperiness. The amount of additives or the total amount of the petroleum resin and the terpene resin is more preferably 1 to 20 percent by weight, and furthermore preferably 2 to 15 percent by weight.

When a petroleum resin and/or a terpene resin that contain polar groups is used as the additive, voids may readily be formed inside the film, the water vapor permeability may increase, and bleeding out of antistatic agents or lubricants may be prevented due to their poor compatibility with polypropylene.

Specific examples of additives that has compatibility with the polypropylene and can provide plasticizing effect during stretching include "Escorez" (type name: E5300 series, etc.) manufactured by Tornex Co., "Clearon" (type name: P-125, etc.) manufactured by Yasuhara Chemical Co., Ltd., and "Arkon" (type name: P-125, etc.) manufactured by Arakawa Chemical Industries, Ltd., etc.

The biaxially stretched polypropylene film of the first, second, third, and fourth embodiments can be made into a metallized film having a high gas barrier property by depositing a metallization layer on at least one side of the film.

Moreover, at least one side of the biaxially stretched polypropylene film of the first, second, third, and fourth embodiments may be provided with a coating layer composed of polyesterpolyurethane-based resin and a metallization layer. As a result, a metallized film having a superior gas barrier property to that of the above-described metallized film can be made.

In achieving high gas barrier property after metallization, the coating layer is preferably formed by applying a blended coating material containing a water-soluble organic solvent and a water-soluble and/or water-dispersible crosslinked polyesterpolyurethane-based resin, and drying the applied coat.

The polyesterpolyurethane-based resin used in the coating layer includes polyesterpolyol obtained by esterifying dicarboxylic acid and a diol component, and polyisocyanate. A chain extension agent may be included, if necessary.

Examples of the dicarboxylic acid component in the polyesterpolyurethane-based resin used in the coating layer include terephthalic acid, isophthalic acid, 2,6-naphthalene dicarboxylic acid, adipic acid, trimethyladipic acid, sebacic acid, malonic acid, dimethylmalonic acid, succinic acid, glutaric acid, pimelic acid, 2,2-dimethylglutaric acid, azelaic acid, fumaric acid, maleic acid, itaconic acid, 1,3-cyclopentane dicarboxylic acid, 1,2-cyclohexane dicarboxylic acid, 1,4-cyclohexane dicarboxylic acid, 1,4-naphthalic acid, diphenic acid, 4,4'-hydroxybenzoic acid, and 2,5-naphthalene dicarboxylic acid, etc.

Examples of the diol component in the polyesterpolyurethane-based resin used in the coating layer include aliphatic glycols such as ethylene glycol, 1,4-butanediol, diethylene glycol, and triethylene glycol; aromatic diols such as 1,4-cyclohexane dimethanol; and poly(oxyalkylene)glycols such as polyethylene glycol, polypropylene glycol, and polytetramethylene glycol, etc.

The polyesterpolyurethane-based resin used in the coating layer may be copolymerized with hydroxycarboxylic acid, etc. such as p-hydroxy benzoic acid, etc. in addition to containing the dicarboxylic acid component and the diol component. Moreover, although these have a linear structure, branching polyester may be made using ester-forming components of trivalent or more.

Examples of polyisocyanate include hexamethylene diisocyanate, diphenylmethane diisocyanate, tolylene diisocyanate, isophorone diisocyanate, tetramethylene diisocyanate, xylylene diisocyanate, lysine diisocyanate, an adduct of tolylene diisocyanate and trimethylolpropane, and an adduct of hexamethylene diisocyanate and trimethylolethane, etc.

Examples of the chain extension agent include pendant-carboxyl-group-containing diols; glycols such as ethylene glycol, diethylene glycol, propylene glycol, 1,4-butanediol, hexamethylene glycol, and neopentyl glycol; and diamines such as ethylenediamine, propylenediamine, hexamethylenediamine, phenylenediamine, tolylenediamine, diphenyldiamine, diaminodiphenylmethane, diaminodiphenylmethane, and diaminocyclohexylmethane, etc.

A specific example of the polyesterpolyurethane-based resin includes "Hydran" (type name: AP-40F, etc.) manufactured by Dainippon Ink and Chemicals, Inc., etc.

In forming the coating layer, at least one of N-methylpyrrolidone, ethylcellosolve acetate, and dimethylformamide as water-soluble organic solvents is preferably added to the coating material to improve the coating-layer formability and increase the adhesion of the coating layer to the base layer. Particularly, N-methylpyrrolidone is preferred since it has a significant effect of improving the coating-layer formability and increasing the adhesion of the coating layer to the base layer. Preferably, the content of the water-soluble organic solvent is 1 to 15 parts by weight, and more preferably 3 to 10 parts by weight relative to 100 parts by weight of the polyesterpolyurethane-based resin from the point of view of flammability of the coating material and odor control.

Preferably, a crosslinking structure is introduced into the water-dispersible polyesterpolyurethane-based resin so as to increase the adhesion between the coating layer and the base layer. Examples of the method for obtaining such a coating material include methods disclosed in Japanese Unexamined Patent Application Publication Nos. 63-15816, 63-256651, and 5-152159. At least one crosslinking agent selected from isocyanate compounds, epoxy compounds, and amine compounds is added as the crosslinking component. These crosslinking agents form crosslinks with the polyesterpolyurethane-based resin described above and thus increase the adhesion between the base layer and the metallization layer.

Examples of the isocyanate compounds used as the crosslinking agents include toluene diisocyanate, xylene diisocyanate, naphthalene diisocyanate, hexamethylene diisocyanate, and isophorone diisocyanate, etc., described above. However, it is not limited to these isocyanate compounds.

Examples of the epoxy compounds used as the crosslinking agents include diglycidyl ether of bisphenol A and oligomers thereof, diglycidyl ether of hydrogenated bisphenol A and oligomers thereof, diglycidyl ether ortho-phthalate, diglycidyl ether isophthalate, diglycidyl ether terephthalate, and diglycidyl ether adipate, etc. However, it is not limited to these epoxy compounds.

Examples of the amine compounds used as the crosslinking agents include amine compounds such as melamine, urine, and benzoguanamine, etc.; amino resins obtained by addition condensation of the above-described amino compounds with formaldehyde or $C_1$-$C_6$ alcohol; hexamethylenediamine; and triethanolamine, etc. However, it is not limited to these amine compounds.

An amine compound is preferably contained in the coating layer from the point of view of food hygiene and adhesion to the base material. A specific example of the amine compound used as the crosslinking agent is "Beckamine" (type name: APM, etc.) manufactured by Dainippon Ink and Chemicals, Inc., etc.

The amount of the crosslinking agent selected from isocyanate compounds, epoxy compounds, and amine compounds is preferably 1 to 15 parts by weight, and more preferably 3 to 10 parts by weight relative to 100 parts by weight of the mixed coating material containing the water-soluble polyesterpolyurethane-based resin and the water-soluble organic solvent from the point of view of improving the chemical resistance and preventing degradation in the water-proof property. When the amount of the crosslinking agent is less than 1 part by weight, the effect of improving the adhesion may not be obtained. At an amount exceeding 15 parts by weight, the adhesion between the coating layer and the base layer may be degraded presumably due to the unreacted remaining crosslinking agent.

Moreover, a small amount of a crosslinking accelerator may be added to the coating layer so that the coating layer composition described above can completely form crosslinks and cure within the time taken to manufacture the film for metallization.

The crosslinking accelerator contained in the coating layer is preferably a water-soluble acidic compound since it has a significant crosslinking promoting effect. Examples of the crosslinking accelerator include terephthalic acid, isophthalic acid, 2,6-naphthalene dicarboxylic acid, adipic acid, trimethyladipic acid, sebacic acid, malonic acid, dimethylmalonic acid, succinic acid, glutaric acid, sulfonic acid, pimelic acid, 2,2-dimethylglutaric acid, azelaic acid, fumaric acid, maleic acid, itaconic acid, 1,3-cyclopentane dicarboxylic acid, 1,2-cyclohexane dicarboxylic acid, 1,4-cyclohexane dicarboxylic acid, 1,4-naphthalic acid, diphenic acid, 4,4'-hydroxy benzoic acid, and 2,5-naphthalene dicarboxylic acid, etc.

A specific example of the crosslinking accelerator is "Catalyst" (type name: PTS, etc.) manufactured by Dainippon Ink and Chemicals, Inc., etc.

Moreover, inert particles may be added to the coating layer. Examples of the inert particles include inorganic fillers such as silica, alumina, calcium carbonate, barium sulfate, magnesium oxide, zinc oxide, and titanium oxide, and organic polymer particles such as crosslinked-polystyrene particles, crosslinked-acryl particles, and crosslinked-silicon particles, etc. In addition to the inert particles, a wax-based lubricant and a mixture of these, etc. may be added.

The coating layer is preferably formed on at least one side of the base layer to a thickness of 0.05 to 2 μm. When the thickness of the coating layer is less than 0.05 μm, the adhesion to the base layer is decreased, and coating defect may be formed, resulting in degradation of the gas barrier property after metallization. When the thickness of the coating layer exceeds 2 μm, the time required for curing of the coating layer becomes longer, and the crosslinking reaction described above may be incomplete, thereby degrading the gas barrier property. Moreover, when the coating layer is formed on the base layer during the film-forming process, the reclaimability of the film scraps to the base layer is degraded, and numerous inner voids are formed by the resin of the coating layer which acts as the nuclei, thereby degrading the mechanical properties.

The adhesive strength between the coating layer and the base layer is preferably 0.6 N/cm or more. When the adhesive strength between the coating layer and the base layer is less than 0.6 N/cm, the coating layer may peel off during converting, thereby imposing a significantly large limitation on the usage. The adhesive strength between the coating layer and the base layer is preferably 0.8 N/cm or more, and more preferably 1.0 N/cm or more.

When a coating layer is formed on at least one side of the biaxially stretched polypropylene film of the first, second, third, and fourth embodiments so that the film can be used as the film for metallization, the centerline average roughness (Ra) of the biaxially stretched polypropylene film of the first, second, third, and fourth embodiments is preferably 0.01 to 0.5 μm from the point of view of handling convenience, slipperiness, and blocking prevention. More preferably, the centerline average roughness is 0.02 to 0.2 am. When the centerline average roughness (Ra) is less than 0.02 μm, the slipperiness may be degraded, resulting in the degradation of handling convenience of the film. At a centerline average roughness (Ra) exceeding 0.2 μm, pinholes may occur in an aluminum layer when a metallized film is made by sequentially depositing the coating layer and a metallization layer, thereby degrading the gas barrier property.

When a coating layer is formed on at least one side of the biaxially stretched polypropylene film of the first, second, third, and fourth embodiments so that the film can be used as the film for metallization, the surface gloss of the biaxially stretched polypropylene film of the first, second, third, and fourth embodiments is preferably 135% or more and, more preferably, 138% or more to ensure superior metallic gloss after metallization.

The coating layer is preferably formed by a process of applying a coating solution using a reverse roll coater, a gravure coater, a rod coater, an air doctor coater, or other coating machines outside the polypropylene film manufacturing process. More preferably, the coating is performed in the film manufacturing process. More preferably, examples thereof include a method to apply coating solutions during the film manufacturing process, in which a coating solution is applied on an unstretched polypropylene film and then the film is sequentially biaxially stretched, and in which a coating solution is applied on a uniaxially stretched polypropylene film and then the film is stretched in the direction perpendicular to the uniaxial stretching. This method in which a coating solution is applied on a uniaxially stretched polypropylene film and then stretching the film in the direction perpendicular to the uniaxial stretching is most preferred since the thickness of the coating layer can be uniform and the production efficiency can be improved.

When the biaxially stretched polypropylene film of the first, second, third, and fourth embodiments is used as the film for metallization, the polypropylene used in the base layer preferably contains no organic lubricants such as fatty acid amide, etc. in point of view of adhesion of the coating layer and the metallization layer. However, a small amount of organic crosslinked particles or inorganic particles may be added to provide slipperiness and improve the processability and windability. Examples of the organic crosslinked particles added to the polypropylene of the base layer at a small amount include crosslinked-silicone particles, crosslinked-polymethylmethacrylate particles, and crosslinked-polystyrene particles. Examples of the organic particles include zeolite, calcium carbonate, silicon oxide, and aluminum silicate. The average size of these particles is preferably 0.5 to 5 μm since the slipperiness can be increased without significantly degrading the transparency of the film.

An antistatic for avoiding the troubles resulting from the static electrification of the film is preferably added to the biaxially stretched polypropylene film of the first, second, third, and fourth embodiments except for when the film is used as the film for metallization having the above-described construction. The antistatic agent contained in the biaxially stretched polypropylene film of the first, second, third, and fourth embodiments is not restricted. However, examples of the antistatic agent include ethylene oxide adducts of betaine derivatives, quaternary amine compounds, alkyldiethanolamine fatty acid esters, glycerin fatty acid ester, gylceride stearates, etc. and mixtures of these.

A lubricant is preferably added to the biaxially stretched polypropylene film of the first, second, third, and fourth embodiments, more preferably, in addition to the antistatic agent described above, except for when the film is used as the film for metallization having the above-described construction. The lubricant is added to improve the mold-releasing property and the flowability during thermo-forming of thermoplastic resins according to the wordings of Japanese Industrial Standards, and to adjust the frictional force between a converting machine and the film surface and between the films themselves.

The lubricant added to the biaxially stretched polypropylene film of the first, second, third, and fourth embodiments is not restricted. However, examples of the lubricant include amide compounds such as stearamide, erucic amide, erucamide, oleamide, etc. and mixtures of these.

The content of the antistatic agent added to the biaxially stretched polypropylene film of the first, second, third, and fourth embodiments is preferably 0.3 part by weight or more, and more preferably in the range of 0.4 to 1.5 parts by weight relative to 100 parts by weight of the polypropylene resin used. The total content of the antistatic agent and the lubricant is more preferably 0.5 to 2.0 parts by weight from the point of view of antistatic property and slipperiness.

Inorganic particles and/or crosslinked organic particles for increasing the slipperiness are preferably contained in the biaxially stretched polypropylene film of the first, second, third, and fourth embodiments.

The term "inorganic particles" refers to inorganic particles of metal compounds, and the inorganic particles are not restricted. However, examples of inorganic particles include particles of zeolite, calcium carbonate, magnesium carbonate, alumina, silica, aluminum silicate, kaolin, kaolinite, talc, clay, diatomite, montmorillonite, and titanium oxide, etc. and mixtures of these.

The term "crosslinked organic particles" refers to particles in which polymer compounds are crosslinked by a crosslinking agent. The crosslinked organic particles contained in the biaxially stretched polypropylene film of the first, second, third, and fourth embodiments are not restricted. However, examples of crosslinked organic particles include crosslinked particles of polymethoxysilane-based compounds, crosslinked particles of polystyrene-based compounds, crosslinked particles of acrylic-based compounds, crosslinked particles of polyurethane-based compounds, crosslinked particles of polyester-based compounds, crosslinked particles of fluoric-based compounds, and mixtures of these.

The average particle size of the inorganic particles and crosslinked organic particles is preferably in the range of 0.5 to 6 μm. If an average particle size of is less than 0.5 μm, the slipperiness may be degraded. If an average particle size exceeds 6 μm, drop-off of particles may occur, and the film surface may be readily damaged when the films come into contact with each other.

The amount of the inorganic particles and/or the crosslinked organic particles added is preferably in the range of 0.02 to 0.5 percent by weight, and more preferably 0.05 to 0.2 percent by weight from the point of view of blocking prevention, slipperiness, and transparency.

In addition to the above-described additives, a nucleating agent, a heat stabilizer, and an antioxidant may be added to the biaxially stretched polypropylene film of the first, second, third, and fourth embodiments, if necessary.

Examples of the nucleating agent include sorbitol-based, organic-metal-phosphate-ester-based, organic-metal-carboxylate-based, and rosin-based nucleating agents. The amount of the nucleating agent is 0.5 percent by weight or less. As the heat stabilizer, 2,6-di-tertiary-butyl-4-methylphenol (BHT) or the like may be added in an amount of 0.5 percent by weight or less. As the antioxidant, tetrakis-(methylene-(3,5-di-tertiary-butyl-4-hydroxy-hydrocinnamate))butane (Irganox 1010) or the like may be added in amount of 0.5 percent by weight or less.

A publicly known polyolefin resin is preferably laminated on at least one side of the biaxially stretched polypropylene film of the first, second, third, and fourth embodiments for the purposes other than those described above, such as prevention of bleed-out/flying-off of additives, adhesion of the metallization layer, high printability, enhancement of heat sealability, enhancement of print lamination property, enhancement of glossy appearance, haze reduction (enhancement of transparency), enhancement of releasing property, and enhancement of slipperiness, etc.

The thickness of the laminated polyolefin resin is preferably 0.25 μm or more and half the total thickness of the film or less. If the thickness is less than 0.25 μm, it is difficult to form a uniform layer due to lamination defects. When the thickness exceeds half the total thickness of the film, the effect of the surface layer on the mechanical property becomes large, resulting in a decrease in Young's modulus and tension resistance of the film. This resin laminated on the surface need not satisfy the ranges of the present invention. Examples of the lamination method include co-extrusion, in-line/off-line extrusion lamination and in-line/off-line coating, etc. The method is not limited to these, and the most suitable method should be selected as needed.

At least one film surface of the biaxially stretched polypropylene film of the first, second, third, and fourth embodiments is preferably subjected to corona discharge treatment so as to allow the film surface to have a surface wetting tension of at least 35 mN/m because the printability, adhesion, antistatic property, and lubricant bleed-out property can be improved. The atmospheric gas during corona discharge treatment is preferably air, oxygen, nitrogen, carbon dioxide gas, or a nitrogen/carbon dioxide mixture gas. From the point of view of economical efficiency, corona discharge treatment in air is particularly preferred.

The Young's modulus in the longitudinal direction (Y(MD)) at 25° C. of the biaxially stretched polypropylene film of the first, second, third, and fourth embodiments is preferably 2.5 GPa or more. When the Y(MD) at 25° C. is less than 2.5 GPa, the stiffness in the transverse direction becomes high when compared with that in the longitudinal direction, resulting in an imbalance of stiffness and insufficient firmness of the film. As a result, pitch displacement may occur during printing, elongation of the film may occur during laminating, and cracks may occur if the film is subjected to coating/metallization processes. In other words, the film may exhibit insufficient tension resistance. The Young's modulus in the longitudinal direction (Y(MD)) at 25° C. can be controlled by adjusting the temperature of cooling drum for cooling and solidifying the molten material to prepare an unstretched sheet, the conditions for the longitudinal stretching (temperature, stretching ratio, etc.), the crystallinity of the polypropylene (depending on mmmm, II, etc.), the amount of the additive for providing plasticity during stretching, and the like. The optimum film forming conditions and raw materials should be selected as needed, as long as the advantages of the present invention are not impaired. The Young's modulus in the longitudinal direction (Y(MD)) at 25° C. is more preferably 2.7 GPa or more, more preferably 3.0 GPa or more, and most preferably 3.2 GPa or more.

The Young's modulus in the longitudinal direction (Y(MD)) at 80° C. of the biaxially stretched polypropylene film of the first, second, third, and fourth embodiments is preferably 0.4 GPa or more. When the Y(MD) at 80° C. is less than 0.4 GPa, the tension resistance during film converting may be insufficient. The Young's modulus in the longitudinal direction (Y(MD)) at 80° C. can be controlled by adjusting the temperature of cooling drum for cooling and solidifying the molten material to prepare an unstretched sheet, the conditions for the longitudinal stretching (temperature, stretching ratio, etc.), the crystallinity of the polypropylene (depending on mmmm, II, etc.), the amount of the additive for providing plasticity during stretching, and the like. The optimum film forming conditions and raw materials should be selected as needed, as long as the advantages of the present invention are not impaired. The Young's modulus in the longitudinal direction (Y(MD)) at 80° C. is more preferably 0.5 GPa or more and, furthermore preferably, 0.6 GPa or more.

In the biaxially stretched polypropylene film of the first, second, third, and fourth embodiments, the m value at 25° C. is preferably in the range of 0.4 to 0.7 wherein the m value in terms of a Young's modulus in the longitudinal direction (Y(MD)) and a Young's modulus in the transverse direction (Y(TD)) is expressed as below:

$$m = Y(MD)/(Y(MD)+Y(TD)).$$

Here, the m value is the ratio of the Young's modulus in the longitudinal direction to the total of the Young's moduli in the longitudinal and transverse directions. Accordingly, a film having an m value of less than 0.5 has a higher stiffness in the transverse direction than in the longitudinal direction. A film having an m value of 0.5 has a substantially balanced stiffness between the stiffness in the longitudinal direction and the stiffness in the transverse direction. A film having an m value of more than 0.5 has a higher stiffness in the longitudinal direction than in the transverse direction. When a film has an m value of 0.4 to 0.7, the film has balanced and high stiffness. When the m value at 25° C. is less than 0.4, the stiffness in the longitudinal direction is significantly lower than that in the transverse direction, resulting in an imbalance of the stiffness. This may result in insufficient tension resistance during film converting and insufficient film stiffness and is therefore not preferred. An m value exceeding 0.7 is also not preferred since the stiffness in the transverse direction may be significantly lower than that in the longitudinal direction and the firmness of the resulting film may be insufficient.

The m value at 25° C. can be controlled by adjusting the film-forming conditions, e.g., the temperature of cooling drum for cooling and solidifying the molten material to prepare an unstretched sheet, the temperatures during longitudinal/transverse stretching, stretching ratio, relaxation of the film after longitudinal/transverse stretching, the crystallinity of the polypropylene (depending on mmmm, II, etc.), the amount of the additive for providing plasticity during stretching, and the like. The optimum film-forming conditions and raw materials should be selected as needed, as long as the advantages of the present invention are not impaired.

The m value at 25° C. is more preferably 0.42 to 0.68, more preferably 0.44 to 0.65, and most preferably 0.46 to 0.62. Preferably, the m value at 80° C. is also in the range of 0.4 to 0.7.

The F2 value in the longitudinal direction at 25° C. of the biaxially stretched polypropylene film of the first, second, third, and fourth embodiments is preferably 40 MPa or more. Here, the F2 value in the longitudinal direction is a stress applied on a sample 15 cm in the longitudinal direction and 1 cm in the transverse direction at an elongation of 2% when the sample is stretched at an original length of 50 mm and a testing speed of 300 mm/min. When the F2 value in the longitudinal direction at 25° C. is less than 40 MPa, pitch displacement may occur during printing, elongation of the film may occur during laminating, and cracks may occur if the film is subjected to coating/metallization processes. In other words, the film may exhibit insufficient tension resistance. The F2 value in the longitudinal direction at 25° C. is more preferably 45 MPa or more.

The F5 value in the longitudinal direction at 25° C. of the biaxially stretched polypropylene film of the first, second, third, and fourth embodiments is preferably 50 MPa or more. Here, the F5 value in the longitudinal direction is a stress applied on a sample 15 cm in the longitudinal direction and 1 cm in the transverse direction at an elongation of 5% when the sample is stretched at an original length of 50 mm and a testing speed of 300 mm/min. When the F5 value in the longitudinal direction at 25° C. is less than 50 MPa, pitch displacement may occur during printing, elongation of the film may occur during laminating, and cracks may occur if the film is subjected to coating/metallization processes. In other words, the film may exhibit insufficient tension resistance. The F5 value in the longitudinal direction at 25° C. is more preferably 55 MPa or more.

The heat shrinkage in the longitudinal direction at 120° C. of the biaxially stretched polypropylene film of the first, second, third, and fourth embodiments is preferably 5% or less. When the heat shrinkage in the longitudinal direction at 120° C. exceeds 5%, an extensive degree of shrinking occurs when the film is heated during processes such as printing, laminating, coating, metallization, and the like, resulting in process failures such as defects in the film, pitch displacement, and wrinkles. The heat shrinkage in the longitudinal direction at 120° C. can be controlled by adjusting the temperature of cooling drum for cooling and solidifying the molten material to prepare an unstretched sheet, the conditions for the longitudinal stretching (stretching temperature, stretching ratio, relaxation of the film after longitudinal stretching, etc.), the crystallinity of the polypropylene (depending on mmmm, II, etc.), the amount of the additive for providing plasticity during stretching, and the like. The optimum longitudinal-stretching conditions and raw materials should be selected as needed, as long as the advantages are not impaired. More preferably, the heat shrinkage in the longitudinal direction at 120° C. is 4% or less.

In the biaxially stretched polypropylene film of the first, second, third, and fourth embodiments, the sum of the heat shrinkage in the longitudinal direction and the heat shrinkage in the transverse direction at 120° C. is preferably 8% or less and, more preferably, 6% or less. When the sum of the heat shrinkage rates in the longitudinal and transverse directions exceeds 8%, an extensive degree of shrinking occurs when the film is heated during processes such as printing, laminating, coating, metallization, and the like, resulting in process failures such as defects in the film, pitch displacement, and wrinkles. The sum of the heat shrinkages in the longitudinal and transverse directions can be controlled by adjusting the film-forming conditions, e.g., the temperature of cooling drum for cooling and solidifying the molten material to prepare an unstretched sheet, the temperatures during longitudinal/transverse stretching, stretching ratio, relaxation of the film after longitudinal/transverse stretching; the crystallinity of the polypropylene (depending on mmmm, II, etc.); the amount of the additive for providing plasticity during stretching; and the like. The optimum film-forming conditions and raw materials should be selected as needed, as long as the advantages are not impaired. More preferably, the sum of the heat shrinkages in the longitudinal and transverse directions at 120° C. is 6% or less.

The water vapor permeability of the biaxially stretched polypropylene film of the first, second, third, and fourth embodiments is preferably 1.5 g/m$^2$/d/0.1 mm or less. When the water vapor permeability exceeds 1.5 g/m$^2$/d/0.1 mm, the biaxially stretched polypropylene film may exhibit poor moisture-proof property when it is used as a packaging material that shields the contents from the external air. The water vapor permeability can be controlled by adjusting the film-forming conditions, e.g., the temperature of cooling drum for cooling and solidifying the molten material to prepare an unstretched sheet, the temperatures during longitudinal/transverse stretching, stretching ratio; the crystallinity of the polypropylene (depending on mmmm, II, etc.); the amount of the additive for providing plasticity during stretching; and the like. The optimum film-forming conditions and raw materials should be selected as needed as long as the advantages are not impaired. More preferably, the water vapor permeability is 1.2 g/m$^2$/d/0.1 mm or less.

Preferably, the biaxially stretched polypropylene film of the first, second, third, and fourth embodiments includes longitudinal fibrils having a width of 40 nm or more and extending across two sides parallel to the transverse direction in a 1-μm square film surface, one side of which is parallel to the longitudinal direction.

The term "longitudinal fibrils" refers to the fibrils oriented in the longitudinal direction when the film surface is observed with an atomic force microscope (AFM). The longitudinal fibrils include fibrils having undulating shapes and branching shapes to some extent. Moreover, the longitudinal fibrils may be tilted to a certain extent from an axis in the longitudinal direction depending on the position of the observation. The longitudinal fibrils include those preferentially oriented in the longitudinal direction rather than the transverse direction within ±45° with respect to the axis in the longitudinal direction.

Observation with an atomic force microscope (AFM) is performed 5 times at different positions in a 1-μm square field view, one side of which is parallel to the longitudinal direction. A film is defined to have longitudinal fibrils if one or more longitudinal fibrils having a width of 40 nm or more and extending across two sides parallel to the transverse direction are observed in all of the acquired images. Preferably, longitudinal fibrils are observed in both surfaces of the film. Alternatively, longitudinal fibrils in only one surface may be observed.

Because the longitudinal fibrils described above are introduced in the first, second, third, and fourth embodiments, the stiffness of the film in the longitudinal direction can be significantly increased. This is because the longitudinal fibrils rarely deform when stress is applied in the longitudinal direction of the film.

The longitudinal fibrils in the biaxially stretched polypropylene film of the first, second, third, and fourth embodiments extend across two sides parallel to the transverse direction in a 1-μm square film surface, one side of which is parallel to the longitudinal direction. The longitudinal fibrils preferably extend across two sides parallel to the transverse direction in a 5-μm square film surface one side of which is parallel to the longitudinal direction and, more preferably, across two sides parallel to the transverse direction in a 10-μm square film surface, one side of which is parallel to the longitudinal direction.

In the biaxially stretched polypropylene films of the first, second, third, and fourth embodiments, the Young's modulus in the longitudinal direction can be sufficiently high and thereby a sufficient tension resistance can be achieved if one or more longitudinal fibrils are present in the 1-μm square film surface, one side of which is parallel to the longitudinal direction. The number of longitudinal fibrils is more preferably 2 or more and, furthermore, preferably 3 to 10. Here, a branching longitudinal fibril is counted as one fibril. When no longitudinal fibrils extending across two sides parallel to the transverse direction in the 1-μm square film surface, one side of which is parallel to the longitudinal direction are present, the fibril structure may readily deform in the longitudinal direction, possibly resulting in a decrease in stiffness of the film in the longitudinal direction and in insufficient tension resistance of the film.

The Young's modulus of the film in the longitudinal direction tends to increase as the number of the longitudinal fibrils described above increases. However, when the number is excessively large, the surface haze may become high. More preferably, the number of the longitudinal fibrils in the biaxially stretched polypropylene films of the first, second, third, and fourth embodiments in a 5-μm square film surface, one side of which is parallel to the longitudinal direction, is 1 or more, more preferably 2 or more, and furthermore preferably in the range of 3 to 10.

Furthermore preferably, the number of the longitudinal fibrils in the biaxially stretched polypropylene films of the first, second, third, and fourth embodiments in a 10-μm square film surface, one side of which is parallel to the longitudinal direction, is 1 or more, more preferably 2 or more, and most preferably in the range of 3 to 10.

In the biaxially stretched polypropylene films of the first, second, third, and fourth embodiments, preferably, one or more longitudinal fibrils are present in a 1-μm square film surface, one side of which is parallel to the longitudinal direction. A sufficient number of longitudinal fibrils are present if the above-described ranges are satisfied. Accordingly, a film having a fibril structure, which is difficult to deform, sufficient tension resistance, glossy surface, and superior gas barrier property can be obtained.

The width of the longitudinal fibrils in the biaxially stretched polypropylene films of the first, second, third, and fourth embodiments is preferably 40 nm or more from the point of view of providing sufficient tension resistance by increasing the Young's modulus in the longitudinal direction of the film. Here, the term "width of the longitudinal fibril" refers to an average value of widths of the longitudinal fibrils measured along three straight lines extending in the transverse direction in an image observed with the atomic force microscope (AFM). The three straight lines are drawn at regular interval between two sides of the image, which is parallel to the transverse direction, so as to divide the image into four equal segments. The width of the branching longitudinal fibrils is measured as follows. The width of the portion of the fibril containing no branching is measured as above. As for the branching portions, the sum of the widths of all the branching portions measured along the straight lines parallel to the transverse direction is calculated. When the width of the longitudinal fibrils is less than 40 nm, the longitudinal fibrils may readily deform when a stress is applied in the longitudinal direction of the film. As a result, the Young's modulus in the longitudinal direction may become insufficient, and the tension resistance may become poor. The Young's modulus in the longitudinal direction of the film tends to increase as the width of the longitudinal fibrils increases. However, when the widths of the longitudinal fibrils are excessively large, the surface haze may become high. The width of the longitudinal fibrils in the biaxially stretched polypropylene film is preferably in the range of 50 to 500 nm, more preferably 55 to 200 nm, and most preferably 60 to 200 nm. A film having sufficient tension resistance and excellent surface haze and gas barrier property can be obtained when the width of the longitudinal fibrils in the biaxially stretched polypropylene films of the first, second, third, and fourth embodiments is 40 nm or more.

The fibril structure of the biaxially stretched polypropylene film preferably includes a fine network of fibrils, having a width of about 20 nm, growing from the above-described longitudinal fibrils. With such a structure, the film can be highly firm.

Publicly known methods may be employed in manufacturing the biaxially stretched polypropylene films of the first, second, third, and fourth embodiments. For example, a polypropylene which comprises a polypropylene satisfying formula (1) described above, $$\log(MS) > -0.61 \log(MFR) + 0.82 \quad (1)$$

or a polypropylene which consists of a polypropylene satisfying formula (2) described above, $$\log(MS) > -0.61 \log(MFR) + 0.52 \quad (2)$$

or a polypropylene which comprises a polypropylene having a Trouton ratio of 30 or more, or a polypropylene which consists of a polypropylene having a Trouton ratio of 16 or more is blended with at least one of petroleum resins substantially containing no polar-group and/or terpene resins substantially containing no polar-group, and the mixture is fed into an extruder. The mixture is melted at a temperature of 200 to 290° C., filtered, and extruded from a slit die. The extruded mixture is then wound around a cooling drum to be cooled and solidified into a sheet so as to make an unstretched film. The temperature of the cooling drum is preferably 20 to 100° C. so that the film can be adequately crystallized. In this manner, a large number of longitudinal fibrils having a large length can be obtained after biaxially stretching.

Next, the resulting unstretched film is biaxially stretched by a publicly known longitudinal-transverse sequential biaxial stretching method. The important factor for making a biaxially stretched polypropylene film highly tensilized in the longitudinal direction is the stretching ratio in the longitudinal direction. The real longitudinal stretching ratio in a conventional longitudinal-transverse sequential biaxial stretching method for making a polypropylene film is in the range of 4.5 to 5.5, and if a longitudinal stretching ratio exceeds 6, film-forming may become unstable, and the film may break during transverse stretching. On the contrary, the real longitudinal stretching ratio is preferably 6 or more. If a real longitudinal stretching ratio is less than 6, sufficient longitudinal fibrils may not be obtained, the stiffness in the longitudinal direction of the film may be insufficient, and the firmness of the resulting film may be insufficient in making the thinner film. The more preferable real stretching ratio in the longitudinal direction is 7 or more, and the furthermore preferable real longitudinal stretching ratio is 8 or more. It is sometimes preferable to perform the longitudinal stretching in two or more steps from the point of view of tensilization in the longitudinal direction and introduction of the longitudinal fibrils. The longitudinal stretching temperature is an optimum temperature selected from the point of view of stability in film-forming, tensilization in the longitudinal direction, and introduction of the longitudinal fibrils. The longitudinal stretching temperature is preferably 120 to 150° C. Moreover, during the cooling process that follows longitudinal stretching, the film is preferably relaxed in the longitudinal direction to an extent that does not further induce thickness irregularity of the film from the point of view of dimensional stability in the longitudinal direction.

The real stretching ratio in the transverse direction is preferably 10 or less. If a real transversal stretching ratio exceeding 10, the stiffness of the resulting film in the longitudinal direction may be low, the number of longitudinal fibrils may decrease, and the film-forming may become unstable. The transversal stretching temperature is an optimum temperature selected from the point of view of stability in film-forming, thickness irregularities, tensilization in the longitudinal direction, and introduction of the longitudinal fibrils. The transversal stretching temperature is preferably 150 to 180° C.

After stretching in the transverse direction, the film is heat-set at 150 to 180° C. while relaxing the film in the transverse direction by 1% or more, cooled, and wound to obtain the biaxially stretched polypropylene film of the present invention.

An example method for manufacturing a film for metallization using a biaxially stretched polypropylene film of the first, second, third, and fourth embodiments will now be described. However, this disclosure is not limited by the manufacturing method described below.

For example, a polypropylene which comprises a polypropylene satisfying formula (1) described above, $$\log(MS) > -0.61 \log(MFR) + 0.82 \quad (1)$$

or a polypropylene which consists of a polypropylene satisfying formula (2) described above, $$\log(MS) > -0.61 \log(MFR) + 0.52 \quad (2)$$

or a polypropylene which comprises a polypropylene having a Trouton ratio of 30 or more, or a polypropylene which consists of a polypropylene having a Trouton ratio of 16 or more is blended with at least one of petroleum resins substantially containing no polar-group and/or terpene resins substantially containing no polar-group. The mixed resin and/or the third layer resin are prepared. These resins are fed into separate extruders, melted at 200 to 290° C., and are filtered. The resins are put together inside a short pipe or a die, extruded from a slit die to form a laminate each layer of which has a target thickness, and wound around a cooling drum so as to be cooled and solidified into a sheet so as to make an unstretched laminate film. The temperature of the cooling drum is preferably 20 to 100° C. so that the film can be adequately crystallized. In this manner, a large number of longitudinal fibrils having a large length can be obtained after biaxially stretching.

The unstretched laminate film is heated to a temperature of 120 to 150° C. and stretched in the longitudinal direction to 6 times the initial length or more. The film is then fed into a tenter-type drawing machine so as to stretch the film in the transverse direction to 10 times the initial length or less at 150 to 180° C., relaxed by heating at 150 to 180° C., and cooled. If necessary, a surface of the base layer on which a metallization layer is to be deposited and/or the third surface opposite of the base layer is subjected to corona discharge treatment in air, nitrogen, or mixture gas of carbon dioxide and nitrogen. When a heat-seal layer is to be laminated as a third layer, corona discharge treatment is preferably avoided to achieve high adhesive strength. Next, the film is wound to obtain a biaxially stretched polypropylene film for metallization.

To make a film having a superior gas barrier property, the above-described unstretched laminate film is heated to a temperature of 120 to 150° C., stretched in the longitudinal direction to 6 times the initial length or more, and cooled. Subsequently, the above-described coating material is applied on the uniaxially stretched film base layer. The base layer surface may be subjected to corona discharge treatment, if necessary. The film is then fed into a tenter-type drawing machine, stretched at a temperature of 150 to 180° C. in the transverse direction to 10 times the initial length or less, relaxed by heating at 150 to 180° C., and cooled. The resulting coating layer on the base layer and/or the third layer surface opposite of the base layer may be subjected to corona discharge treatment in air, nitrogen, or mixture gas of carbon dioxide and nitrogen if necessary. At this stage, when a heat-seal layer is to be laminated as a third layer, corona discharge treatment is preferably avoided to achieve high adhesive strength. Next, the film is wound to obtain a biaxially stretched polypropylene film for metallization.

In the present invention, the biaxially stretched polypropylene film for metallization is preferably aged at 40 to 60° C. so as to accelerate the reaction in the coating layer. When the reaction in the coating layer is accelerated, the adhesive strength of the coating layer to the base layer and to the metallization layer can be increased, and gas barrier property of the film can be improved. Aging is preferably performed for 12 hours or more, and more preferably 24 hours or more to improve the chemical resistance.

Next, the metallization is performed by vacuum metallization of metal. A metal from evaporation source is deposited on the coating layer, which coats the surface of the biaxially stretched polypropylene film, to form a metallization layer.

Examples of the evaporation source include those of a resistance-heating boat type, a radiation- or radio-frequency-heating crucible type, and an electron beam heating type. The evaporation source is not restricted.

The metal used in the metallization is preferably a metal such as Al, Zn, Mg, Sn, Si, or the like. Alternatively, Ti, In, Cr, Ni, Cu, Pb, Fe, or the like may be used. These metals preferably have purities of 99% or more, and more preferably 99.5% or more and are preferably processed into grains, rods, tablets, wires, and crucibles.

Among the metals for metallization, an aluminum metallization layer is preferably formed on at least one side of the film from the point of view of durability of the metallization layer, production efficiency, and cost. Other metal components such as nickel, copper, gold, silver, chromium, zinc, and the like may be metallized sequentially or simultaneously with aluminum.

The metallization layer preferably has a thickness of 10 nm or more, and more preferably 20 nm or more to achieve high gas barrier property. No limit is imposed as to the upper limit of the thickness of the metallization layer; however, the thickness is preferably less than 50 nm from the point of view of economical and production efficiencies.

The gloss of the metallization layer is preferably 600% or more, and more preferably 700% or more.

Alternatively, a metallization layer composed of metal oxide may be formed so that the film may be used as a transparent gas-barrier film for packaging having a superior gas barrier property. The metal oxide metallization layer is preferably a layer of a metal oxide such as incompletely oxidized aluminum, or incompletely oxidized silicon. Incompletely oxidized aluminum is particularly preferable from the point of view of durability of the metallization layer, production efficiency, and cost. Metallization can be performed by publicly known methods. For example, in depositing the metallization layer composed of incompletely oxidized aluminum, the film is allowed to run in a high-vacuum device having a degree of vacuum of $10^{-4}$ Torr or less, aluminum metal is heated, melted, and evaporated, and a small amount of oxygen gas is supplied at the site of evaporation so that the aluminum can be coherently deposited on the film surface to form a metallization layer while being oxidized. The thickness of the metal oxide metallization layer is preferably in the range of 10 to 50 nm, and more preferably 10 to 30 nm. The oxidation of the metal oxide metallization layer composed of incompletely oxidized metal proceeds after metallization and changes the light transmittance of the metal oxide metallized film. The light transmittance is preferably in the range of 70 to 90%. A light transmittance of less than 70% is not preferred since the content cannot be seen through the package when the film is made into a packaging bag. A light transmittance exceeding 90% is not preferred because the gas barrier property tends to be poor when the film is made into a packaging bag.

The adhesive strength between the metallization layer and the coating layer of the metallized biaxially stretched polypropylene film and between the metal oxide metallization layer and the coating layer of the metallized biaxially stretched polypropylene is preferably 0.6 N/cm or more, and more preferably 0.8 N/cm or more. When the adhesive strength is less than the above-described range, the metallization layer may be picked off when the metallized film is being wound into a roll and when the metallized film is being wound off for converting, resulting in degradation of the gas barrier properties.

The gas barrier properties of the films prepared by depositing a metallization layer of a metal and an oxide metal on the biaxially stretched polypropylene films are preferably as follows. The water vapor permeability is preferably 4 g/m$^2$/d or less, and more preferably 1 g/m$^2$/d or less, and the oxygen permeability is preferably 200 ml/m$^2$/d/MPa or less, and more preferably 100 ml/m$^2$/d/MPa for use in food packaging bags.

The biaxially stretched polypropylene films of the first, second, third, and fourth embodiments have an increased stiffness in the longitudinal direction compared with conventional biaxially stretched polypropylene films without degrading important properties such as dimensional stability and moisture-proof property. As a result, the film exhibits superior handling convenience and excellent tension resistance against converting tension applied during film converting such as printing, laminating, coating, metallizing, and bag-making. Moreover, the troubles such as film cracks and print pitch displacement due to the quality of base films can be avoided. Furthermore, the stiffness in the longitudinal direction and the tension resistance are higher than those of the conventional polypropylene films having the same thickness; hence, the same degree of converting property can be maintained with a thickness smaller than that of conventional biaxially stretched polypropylene films. Accordingly, the biaxially stretched polypropylene films are suitable for packaging and Industrial use.

A fifth embodiment is a biaxially stretched polypropylene film characterized by including longitudinal fibrils having a width of 40 nm or more and extending across two sides parallel to the transverse direction in a 1-μm square film surface, one side of which is parallel to the longitudinal direction.

The term "longitudinal fibrils" refers to the fibrils oriented in the longitudinal direction when the film surface is observed with an atomic force microscope (AFM). The longitudinal fibrils include fibrils having undulating shapes and branching shapes to some extent. Moreover, the longitudinal fibrils may be tilted to a certain extent from an axis in the longitudinal direction depending on the position of the observation. The longitudinal fibrils include those preferentially oriented in the longitudinal direction rather than the transverse direction within ±45° with respect to the axis in the longitudinal direction.

Observation with an atomic force microscope (AFM) is performed 5 times at different positions in a 1-μm square field view, one side of which is parallel to the longitudinal direction. A film is defined to have longitudinal fibrils if one or more longitudinal fibrils having a width of 40 nm or more and extending across two sides parallel to the transverse direction are observed in all of the acquired images. Preferably, longitudinal fibrils are observed in both surfaces of the film. Alternatively, longitudinal fibrils in only one surface may be observed.

Because the longitudinal fibrils described above are introduced in the fifth embodiment of the present invention, the stiffness of the film in the longitudinal direction can be significantly increased. This is because the longitudinal fibrils rarely deform when stress is applied in the longitudinal direction of the film.

The longitudinal fibrils in the biaxially stretched polypropylene film of the fifth embodiment extend across two sides parallel to the transverse direction in a 1-μm square film surface, one side of which is parallel to the longitudinal direction. The longitudinal fibrils preferably extend across two sides parallel to the transverse direction in a 5-μm square film surface, one side of which is parallel to the longitudinal direction and, more preferably, across two sides parallel to the transverse direction in a 10-μm square film surface, one side of which is parallel to the longitudinal direction.

In the biaxially stretched polypropylene film of the fifth embodiment of the present invention, the Young's modulus can be sufficiently high and thereby a sufficient tension resistance can be achieved if one or more longitudinal fibrils are present in the 1-μm square film surface one side of which is parallel to the longitudinal direction. The number of longitudinal fibrils is more preferably 2 or more, and furthermore preferably 3 to 10. Here, a branching longitudinal fibril is counted as one fibril. When no longitudinal fibrils extending across two sides parallel to the transverse direction in the 1-μm square film surface one side of which is parallel to the longitudinal direction are present, the fibril structure may readily deform in the longitudinal direction, possibly resulting in a decrease in stiffness of the film in the longitudinal direction and in insufficient tension resistance of the film.

The Young's modulus of the film in the longitudinal direction increases as the number of the longitudinal fibrils increases. However, when the number is excessively large, the surface haze may become high. More preferably, the number of the longitudinal fibrils in the biaxially stretched polypropylene film of the fifth embodiment in a 5-μm square film surface, one side of which is parallel to the longitudinal direction, is 1 or more, more preferably 2 or more, and furthermore preferably in the range of 3 to 10.

Furthermore preferably, the number of the longitudinal fibrils in the biaxially stretched polypropylene film of the fifth embodiment in a 10-μm square film surface, one side of which is parallel to the longitudinal direction, is 1 or more, more preferably 2 or more, and furthermore preferably in the range of 3 to 10.

In the biaxially stretched polypropylene film of the fifth embodiment, preferably, one or more longitudinal fibrils are present in a 1-μm square film surface, one side of which is parallel to the longitudinal direction. A sufficient number of longitudinal fibrils are present if the above-described ranges are satisfied. Accordingly, a film having the fibril structure, which is difficult to deform, sufficient tension resistance, glossy surface, and superior gas barrier property can be obtained.

The width of the longitudinal fibrils in the biaxially stretched polypropylene film of the fifth embodiment is 40 nm or more from the point of view of providing sufficient tension resistance by increasing the Young's modulus in the longitudinal direction of the film. Here, the term "width of the longitudinal fibril" refers to an average value of widths of the longitudinal fibrils measured along three straight lines extending in the transverse direction in an image observed with the atomic force microscope (AFM). The three straight lines are drawn at regular intervals between two sides of the image, which is parallel to the transverse direction, so as to divide the image into four equal segments. The width of the branching longitudinal fibrils is measured as follows. The width of the portion of the fibril containing no branching is measured as above. As for the branching portions, the sum of the widths of all the branching portions measured along the straight lines parallel to the transverse direction is calculated. When the width of the longitudinal fibrils is less than 30 nm, the longitudinal fibrils may readily deform when a stress is applied in the longitudinal direction of the film. As a result, the Young's modulus in the longitudinal direction may become insufficient, and the tension resistance may become poor. The Young's modulus in the longitudinal direction of the film tends to increase as the width of the longitudinal fibrils increases. However, when the widths of the longitudinal fibrils are excessively large, the surface haze may become high. The width of the longitudinal fibrils in the biaxially stretched polypropylene film of the fifth embodiment is preferably in the range of 50 to 500 nm, more preferably 55 to 250 nm, and most preferably 60 to 200 nm. A film having sufficient tension resistance and excellent surface haze and gas barrier property can be obtained when the width of the longitudinal fibrils in the biaxially stretched polypropylene film is 40 nm or more.

The fibril structure of the biaxially stretched polypropylene film of the fifth embodiment preferably includes a fine network of fibrils, having a width of about 20 nm, growing from the above-described longitudinal fibrils. With such a structure, the film can be highly firm.

Preferably, the biaxially stretched polypropylene film of the fifth embodiment comprises a high-melt-strength polypropylene (HMS-PP) having higher melt strength (MS) than that of conventional polypropylenes.

The melt strength (MS) and the melt flow rate (MFR) of the HMS-PP described above measured at 230° C. preferably satisfy the formula:

$$\log(MS) > -0.61 \log(MFR) + 0.82.$$

The melt strength (MS) at 230° C. is measured by the following process. Using a melt tension tester manufactured by Toyo Seiki Kogyo Co., Ltd., the polypropylene is heated to 230° C., and the resulting molten polypropylene is extruded at an extrusion rate of 15 mm/min to prepare a strand. The tension of the strand at a take-over rate of 6.5 m/min is measured, and this tension is defined as the melt strength (MS). The unit therefor is cN.

The melt flow rate (MFR) at 230° C. is measured according to Japanese Industrial Standards (JIS) K 6758, whereby a melt flow rate (MFR) under a load of 2.16 kg is measured. The unit therefor is g/10 min.

Preferably, the Trouton ratio of the HMS-PP described above is 30 or more.

The Trouton ratio is measured by a converging flow method according to a theory by Cogswell [Polymer Engineering Science, 12, 64 (1972)]. The Trouton ratio is a ratio of the extensional viscosity to shear viscosity at 230° C. and a strain rate of 60 $S^{-1}$ calculated from an extensional viscosity-extensional strain rate curve and a shear viscosity-shear strain rate curve approximated by an exponential function.

Generally, the higher the Trouton ratio of the HMS-PP described above, the more preferable. However, at an excessively high ratio, the film formability and surface haze may be degraded. The Trouton ratio of the HMS-PP described above is preferably 35 or more, and most preferably in the range of 40 to 100.

Because the biaxially stretched polypropylene film of the fifth embodiment comprises the above-described HMS-PP, a biaxially stretched polypropylene film having high stiffness in the longitudinal direction, which has previously been difficult to manufacture by a publicly known longitudinal-transverse sequential biaxial stretching, can be manufactured. In other words, the HMS-PP described above prevents the longitudinally-oriented crystals from re-orienting in the transverse direction during transverse stretching.

Preferable examples of methods for preparing the above-described HMS-PP include a method whereby a polypropylene containing a large amount of high-molecular-weight components is blended, a method whereby polymer or oligomer having a branch structure is blended, a method disclosed in Japanese Unexamined Patent Application Publication No. 62-121704 whereby a long-chain branched structure is introduced into a polypropylene molecule, and a method disclosed in Japanese Patent Publication No. 2869606 in which a straight-chain crystalline polypropylene, which has a melt strength, a inherent viscosity, a crystallization temperature, and a melting point that satisfy a predetermined formula and exhibits a boiling-xylene extraction residual rate within a predetermined range, is prepared without introducing long-chain branches.

Among them, the biaxially stretched polypropylene film of the fifth embodiment preferably comprises a HMS-PP, the melt strength of which is increased by introducing long-chain branches into polypropylene molecules. Specific examples of the HMS-PP, the melt strength of which is increased by introducing a long-chain branch, include HMS-PP (Type name: PF-814, etc.) manufactured by Basell Polyolefins, HMS-PP (Type name: WB130HMS, etc.) manufactured by Borealis, and HMS-PP (Type name: D201, etc.) manufactured by Dow Chemical Company, etc.

An example of an index indicating the degree of long-chain branching in the polypropylene is a branching index g represented by the equation below:

$$g = [\eta]_{LB}/[\eta]_{Lin}$$

wherein $[\eta]_{LB}$ is the intrinsic viscosity of the polypropylene having a long-chain branch, and $[\eta]_{Lin}$ is the intrinsic viscosity of a straight-chain crystalline polypropylene having substantially the same weight average molecular weight as the polypropylene having the long-chain branch. The intrinsic viscosity is measured by a publicly known method in which a sample dissolved in tetralin is measured at 135° C. The weight average molecular weight is measured by a method presented by M. L. McConnell in American Laboratory, May 63-75 (1978), i.e., low-angle laser light scattering photometry.

The branching index g of the HMS-PP comprised in the biaxially stretched polypropylene film of the fifth embodiment is preferably 0.95 or less, and more preferably 0.9 or less. If a branching index exceeds 0.95, the effect of adding the HMS-PP may be diminished, resulting in insufficient Young's modulus in the longitudinal direction when processed into a film.

The melt strength (MS) of the HMS-PP comprised in the biaxially stretched polypropylene film of the fifth embodiment is preferably in the range of 3 to 100 cN. If a MS is less than 3 cN, the Young's modulus in the longitudinal direction of the resulting film may be insufficient. The Young's modulus in the longitudinal direction tends to increase as the melt strength (MS) becomes larger. However, if a melt strength (MS) exceeds 100 cN, film formability may be degraded. More preferably, the melt strength (MS) of the HMS-PP is in the range of 4 to 80 cN, more preferably 5 to 40 cN, and furthermore preferably 5 to 20 cN.

The content of the HMS-PP comprised in the polypropylene used in the biaxially stretched polypropylene film of the fifth embodiment is not restricted. However, the HMS-PP content is preferably 1 to 60 percent by weight. A certain degree of effect can be achieved with a relatively small content. If a HMS-PP content is less than 1 percent by weight, the stretchability in the transverse direction may be degraded, and improvements in the stiffness in the longitudinal direction may be small. If a HMS-PP content exceeds 60 percent by weight, the stretchability in the longitudinal direction, the impact resistance, and the haze of the resulting film may be degraded. More preferably, the HMS-PP content is in the range of 2 to 50 percent by weight and, furthermore preferably, 3 to 40 percent by weight.

The melt strength (MS) and the melt flow rate (MFR) measured at 230° C. of the polypropylene used in the biaxially stretched polypropylene film of the fifth embodiment preferably satisfy the formula:

$$\log(MS) > -0.61 \log(MFR) + 0.52.$$

More preferably, the polypropylene used satisfies the formula:

$$\log(MS) > -0.61 \log(MFR) + 0.56.$$

Particularly preferably, the relationship formula below is satisfied:

$$\log(MS) > -0.61 \log(MFR) + 0.62.$$

The melt strength and the melt flow rate can be controlled by adjusting the amount of the HMS-PP described above. The stiffness in the longitudinal direction can be further increased.

For example, the polypropylene satisfying the formula $$\log(MS) > -0.61 \log(MFR) + 0.52$$

can be prepared by blending, a high-melt-strength polypropylene (HMS-PP) having a high melt strength with a conventional polypropylene, and by introducing long-chain branch components into the main-chain of the conventional polypropylene by means of copolymerization or graft polymerization, so as to increase the melt strength (MS) of the polypropylene. With the HMS-PP, the longitudinally-oriented crystals are prevented from being re-oriented in the transverse direction during transverse stretching.

The Trouton ratio of the polypropylene used in the biaxially stretched polypropylene film of the fifth embodiment is preferably 16 or more.

Generally, the Trouton ratio of the polypropylene used in the biaxially stretched polypropylene film of the fifth embodiment is preferably high. However, at an excessively high ratio, the film formability and the surface haze may be degraded. The Trouton ratio is more preferably 18 or more, more preferably in the range of 20 to 50, and most preferably in the range of 20 to 45. The Trouton ratio can be controlled by adjusting the amount of addition of HMS-PP described above, and the stiffness in the longitudinal direction can be further increased.

Examples of methods for preparing the polypropylene having a Trouton ratio of 16 or more include a method in which a HMS-PP having a Trouton ratio of 30 or more is blended with a conventional polypropylene and a method in which long-chain branch components are introduced into the main chains of a conventional polypropylene by means of copolymerization or graft polymerization so as to increase the melt strength (MS) of the polypropylene. With the HMSPP, the longitudinally-oriented crystals are prevented from re-orienting in the transverse direction during the transverse stretching.

The melt flow rate (MFR) of the polypropylene used in the biaxially stretched polypropylene film of the fifth embodiment is preferably in the range of 1 to 30 g/10 min from the point of view of the film formability. If a melt flow rate (MFR) is less than 1 g/10 min, problems such as an increase in filtration pressure during melt extrusion and an increase in time required for replacing extrusion materials may occur. If a melt flow rate (MFR) exceeds 30 g /10 min, the thickness irregularity in the resulting film may be large, which is a problem. The melt flow rate (MFR) is more preferably 1 to 20 g/10 min.

The meso pentad fraction (mmmm) of the polypropylene used in the biaxially stretched polypropylene film of the fifth embodiment is preferably in the range of 90 to 99.5% and, more preferably, 94 to 99.5%. Here, the meso pentad fraction (mmmm) is the index that directly indicates the conformation of isotactic stereo-regularity in polypropylene. If a meso pentad fraction (mmmm) is 90 to 99.5%, a film having superior dimensional stability, heat resistance, stiffness, moisture-proof property, and chemical resistance can be reliably manufactured. Thus, a film that exhibits high converting ability during film converting processes such as printing, coating, metallizing, bag-making, and laminating can be manufactured. If a meso pentad fraction (mmmm) is less than 90%, the resulting film tends to exhibit a less stiffness and a large heat shrinkage, which may result in degradation in converting ability during film converting such as printing, coating, metallization, bag-making, and laminating, and in an increase in high water vapor permeability. If a meso pentad fraction (mmmm) exceeds 99.5%, the film formability may be degraded. More preferably, the meso pentad fraction (mmmm) is 95 to 99% and, furthermore preferably, 96 to 98.5%.

The isotactic index (II) of the polypropylene used in the biaxially stretched polypropylene film of the fifth embodiment is preferably in the range of 92 to 99.8%. At an isotactic index (II) of less than 92%, the resulting film may exhibit a less stiffness, a large heat shrinkage, and may have a degraded moisture-proof property, which are problems. If an isotactic index (II) exceeds 99.8%, the film formability may be degraded. The isotactic index (II) is more preferably in the range of 94 to 99.5%.

The polypropylene used in the biaxially stretched polypropylene film of the fifth embodiment may be blended with scrapped films produced during manufacture of the biaxially stretched polypropylene film or scrapped films produced during manufacture of other types of film or other types of resins to improve economical efficiency as long as the characteristics are not degraded.

The polypropylene used in the biaxially stretched polypropylene film mainly comprises homopolymers of the propylene. The polypropylene may be a polymer in which monomer components of other unsaturated hydrocarbons are copolymerized or may be blended with polymers in which propylene is copolymerized with monomer components other than propylene, as long as the purpose can be achieved. Examples of the copolymer components and monomer components for preparing the blended material include ethylene, propylene (for preparing the copolymerized blended material), 1-butene, 1-pentene, 3-methylpentene-1,3-methylbutene-1,1-hexene, 4-methypentene-1,5-ethylhexene-1,1-octene, 1-decene, 1-dodecene, vinylcyclohexene, styrene, allylbenzene, cyclopentene, norbornene, and 5-methyl-2-norbornene, etc.

The above-described characteristic values of the polypropylene such as the melt strength (MS), the melt flow rate (MFR), the Trouton ratio, the g value, the meso pentad fraction (mmmm), and the isotactic index (II) are preferably measured using raw material chips before film-formation. Alternatively, after film-formation, the film may be subjected to extraction with n-heptane at 60° C. or less for approximately 2 hours to remove impurities and additives and then vacuum-dried at 130° C. for at least 2 hours to prepare a sample. The above-described values may be then measured using this sample.

In order to increase the strength and improve the film formability, at least one additive that has compatibility with the polypropylene and can provide plasticity during stretching is preferably contained in the biaxially stretched polypropylene film of the fifth embodiment. Here, the additive that can provide plasticity refers to a plasticizer that enables stable stretching to a high stretching ratio. With the additive, the purpose is not sufficiently achieved, sufficient longitudinal fibrils cannot be obtained, and the film formability is degraded. The additive is preferably at least one of petroleum resins substantially containing no polar groups and/or terpene resins substantially containing no polar groups from the point of view of achieving stretching to a high ratio and improved barrier property.

The petroleum resins substantially containing no polar group refers to petroleum resins containing no polar groups such as hydroxyl, carboxyl, halogen, or sulfone, or modified forms thereof. Specific examples of the resins are cyclopentadiene resins made from petroleum unsaturated hydrocarbon and resins containing higher olefin hydrocarbon as the primary component.

Preferably, the glass transition temperature (hereinafter, sometimes referred to as Tg) of the petroleum resin substantially containing no polar group is 60° C. or more. If a glass transition temperature (Tg) is less than 60° C., the effect of improving the stiffness may be small.

Particularly preferably, a hydrogen-added (hereinafter, sometimes referred to as hydrogenated) petroleum resin, whose hydrogenation rate is 90% or more and more preferably 99% or more, is used. A representative example of the hydrogen-added petroleum resin is an alicyclic petroleum resin such as polydicyclopentadiene having a glass transition temperature (Tg) of 70° C. or more and a hydrogenation rate of 99% or more.

Examples of the terpene resins substantially containing no polar group are terpene resins containing no polar group such as hydroxyl, aldehyde, ketone, carboxyl, halogen, or sulfone, or the modified forms thereof, etc., i.e., hydrocarbons represented by $(C_5H_8)n$ and modified compounds derived therefrom, wherein n is a natural number between 2 and 20.

The terpene resins are sometimes called terpenoids. Representative compounds thereof include pinene, dipentene, carene, myrcene, ocimene, limonene, terpinolene, terpinene, sabinene, tricyclene, bisabolene, zingiberene, santalene, campholene, mirene, and totarene, etc. In relation to the biaxially stretched polypropylene film, hydrogen is preferably added at hydrogenation rate of 90% or more, particularly preferably, 99% or more. Among them, hydrogenated β-pinene and hydrogenated β-dipentene are particularly preferred.

The bromine number of the petroleum resin or the terpene resin is preferably 10 or less, more preferably 5 or less, and most preferably 1 or less.

The amount of the additive may be large enough to achieve the plasticizing effect. Preferably, the total amount of the petroleum resin and the terpene resin is in the range of 0.1 to 30 percent by weight. When the amount of the additive resins is less than 0.1 percent by weight, the effect of improving the stretchability and the stiffness in the longitudinal direction may become small and the transparency may be degraded. When an amount exceeds 30 percent by weight, thermal dimensional stability may be degraded, and the additive may bleed out onto the film surface, resulting in degradation of slipperiness. The amount of additives or the total amount of the petroleum resin and the terpene resin is more preferably 1 to 20 percent by weight, and furthermore preferably 2 to 15 percent by weight.

When a petroleum resin and/or a terpene resin that contain polar groups is used as the additive, voids may readily be formed inside the film, the water vapor permeability may increase, and bleeding out of antistatic agents or lubricants may be prevented due to their poor compatibility with polypropylene.

Specific examples of additives that are compatible with the polypropylene and can provide plasticizing effect during stretching include "Escorez" (type name: E5300 series, etc.) manufactured by Tornex Co., "Clearon" (type name: P-125, etc.) manufactured by Yasuhara Chemical Co., Ltd., and "Arkon" (type name: P-125, etc.) manufactured by Arakawa Chemical Industries, Ltd, etc.

The biaxially stretched polypropylene film of the fifth embodiment can be made into a metallized film having a high gas barrier property by depositing a metallization layer on at least one side of the film.

Moreover, at least one side of the biaxially stretched polypropylene film of the fifth embodiment may be provided with a coating layer composed of polyesterpolyurethane-based resin and a metallization layer. As a result, a metallized film having a superior gas barrier property to that of the above-described metallized film can be made.

In achieving high gas barrier property after metallization, the coating layer is preferably formed by applying a blended coating material containing a water-soluble organic solvent and a water-soluble and/or water-dispersible crosslinked polyesterpolyurethane-based resin, and drying the applied coat.

The polyesterpolyurethane-based resin used in the coating layer includes polyester-polyol obtained by esterifying dicarboxylic acid and a diol component, and polyisocyanate. A chain extension agent may be included, if necessary.

Examples of the dicarboxylic acid component in the polyesterpolyurethane-based resin used in the coating layer include terephthalic acid, isophthalic acid, 2,6-naphthalene dicarboxylic acid, adipic acid, trimethyladipic acid, sebacic acid, malonic acid, dimethylmalonic acid, succinic acid, glutaric acid, pimelic acid, 2,2-dimethylglutaric acid, azelaic acid, fumaric acid, maleic acid, itaconic acid, 1,3-cyclopentane dicarboxylic acid, 1,2-cyclohexane dicarboxylic acid, 1,4-cyclohexane dicarboxylic acid, 1,4-naphthalic acid, diphenic acid, 4,4'-hydroxybenzoic acid, and 2,5-naphthalene dicarboxylic acid, etc.

Examples of the diol component in the polyesterpolyurethane-based resin used in the coating layer include aliphatic glycols such as ethylene glycol, 1,4-butanediol, diethylene glycol, and triethylene glycol; aromatic diols such as 1,4-cyclohexane dimethanol; and poly(oxyalkylene)glycols such as polyethylene glycol, polypropylene glycol, and polytetramethylene glycol, etc.

The polyesterpolyurethane-based resin used in the coating layer may be copolymerized with hydroxy-carboxylic acid, etc. such as p-hydroxy benzoic acid, etc. in addition to containing the dicarboxylic acid component and the diol component. Moreover, although these have a linear structure, branching polyester may be made using ester-forming components of trivalent or more.

Examples of polyisocyanate include hexamethylene diisocyanate, diphenylmethane diisocyanate, tolylene diisocyanate, isophorone diisocyanate, tetramethylene diisocyanate, xylylene diisocyanate, lysine diisocyanate, an adduct of tolylene diisocyanate and trimethylolpropane, and an adduct of hexamethylene diisocyanate and trimethylolethane, etc.

Examples of the chain extension agent include pendant-carboxyl-group-containing diols; glycols such as ethylene glycol, diethylene glycol, propylene glycol, 1,4-butanediol, hexamethylene glycol, and neopentyl glycol; and diamines such as ethylenediamine, propylenediamine, hexamethylenediamine, phenylenediamine, tolylenediamine, diphenyldiamine, diaminodiphenylmethane, diaminodiphenylmethane, and diaminocyclohexylmethane, etc.

A specific example of the polyesterpolyurethane-based resin includes "Hydran" (type name: AP-40F, etc.) manufactured by Dainippon Ink and Chemicals, Inc., etc.

In forming the coating layer, at least one of N-methylpyrrolidone, ethylcellosolve acetate, and dimethylformamide as water-soluble organic solvents is preferably added to the coating material to improve the coating-layer formability and increase the adhesion of the coating layer to the base layer. Particularly, N-methylpyrrolidone is preferred since it has a significant effect of improving the coating-layer formability and increasing the adhesion of the coating layer to the base layer. Preferably, the content of the water-soluble organic solvent is 1 to 15 parts by weight, and more preferably 3 to 10 parts by weight relative to 100 parts by weight of the polyesterpolyurethane-based resin from the point of view of flammability of the coating material and odor control.

Preferably, a crosslinking structure is introduced into the water-dispersible polyesterpolyurethane-based resin so as to increase the adhesion between the coating layer and the base layer. Examples of the method for obtaining such a coating material include methods disclosed in Japanese Unexamined Patent Application Publication Nos. 63-15816, 63-256651, and 5-152159. At least one crosslinking agent selected from isocyanate compounds, epoxy compounds, and amine compounds is added as the crosslinking component. These crosslinking agents form crosslinks with the polyesterpolyurethane-based resin described above and thus increase the adhesion between the base layer and the metallization layer.

Examples of the isocyanate compounds used as the crosslinking agents include toluene diisocyanate, xylene diisocyanate, naphthalene diisocyanate, hexamethylene diisocyanate, and isophorone diisocyanate, etc., described above. However, it is not limited to these isocyanate compounds.

Examples of the epoxy compounds used as the crosslinking agents include diglycidyl ether of bisphenol A and oligomers thereof, diglycidyl ether of hydrogenated bisphenol A and oligomers thereof, diglycidyl ether orthophthalate, diglycidyl ether isophthalate, diglycidyl ether terephthalate, and diglycidyl ether adipate, etc. However, it is not limited to these epoxy compounds.

Examples of the amine compounds used as the crosslinking agents include amine compounds such as melamine, urine, benzoguanamine, etc.; amino resins obtained by addition condensation of the above-described amino compounds with formaldehyde or $C_1$-$C_6$ alcohol; hexamethylenediamine; and triethanolamine, etc. However, it is not limited to these amine compounds.

An amine compound is preferably contained in the coating layer from the point of view of food hygiene and adhesion to the base material. A specific example of the amine compound used as the crosslinking agent is "Beckamine" (type name: APM, etc.) manufactured by Dainippon Ink and Chemicals, Inc., etc.

The amount of the crosslinking agent selected from isocyanate compounds, epoxy compounds, and amine compounds is preferably 1 to 15 parts by weight, and more preferably 3 to 10 parts by weight relative to 100 parts by weight of the mixed coating material of the water-soluble polyesterpolyurethane-based resin and the water-soluble organic solvent from the point of view of improving the chemical resistance and preventing degradation in the waterproof property. When the amount of the crosslinking agent is less than above-described range, the effect of improving the adhesion may not be obtained. At an amount exceeding 15 parts by weight, the adhesion between the coating layer and the base layer may be degraded presumably due to the unreacted remaining crosslinking agent.

Moreover, a small amount of a crosslinking accelerator may be added to the coating layer so that the coating layer composition described above can completely form crosslinks and cure within a time taken to manufacture a film for metallization.

The crosslinking accelerator contained in the coating layer is preferably a water-soluble acidic compound since it has a significant crosslinking promoting effect. Examples of the crosslinking accelerator include terephthalic acid, isophthalic acid, 2,6-naphthalene dicarboxylic acid, adipic acid, trimethyladipic acid, sebacic acid, malonic acid, dimethylmalonic acid, succinic acid, glutaric acid, sulfonic acid, pimelic acid, 2,2-dimethylglutaric acid, azelaic acid, fumaric acid, maleic acid, itaconic acid, 1,3-cyclopentane dicarboxylic acid, 1,2-cyclohexane dicarboxylic acid, 1,4-cyclohexane dicarboxylic acid, 1,4-naphthalic acid, diphenic acid, 4,4'-hydroxy benzoic acid, and 2,5-naphthalene dicarboxylic acid, etc.

A specific example of the crosslinking accelerator is "Catalyst" (type name: PTS, etc.) manufactured by Dainippon Ink and Chemicals, Inc., etc.

Moreover, inert particles may be added to the coating layer. Examples of the inert particles include inorganic fillers such as silica, alumina, calcium carbonate, barium sulfate, magnesium oxide, zinc oxide, and titanium oxide, and organic polymer particles such as crosslinked-polystyrene particles, crosslinked-acryl particles, and crosslinked-silicon particles, etc. In addition to the inert particles, a wax-based lubricant and a mixture of these, etc. may be added.

The coating layer is preferably formed on at least one side of the base layer at a thickness of 0.05 to 2 µm. When the thickness of the coating layer is less than 0.05 µm, the adhesion to the base layer is decreased, and coating defect may be formed, resulting in degradation of the gas barrier property after metallization. When the thickness of the coating layer exceeds 2 µm, the time required for curing of the coating layer becomes longer, and the crosslinking reaction described above may be incomplete, thereby degrading the gas barrier property. Moreover, when the coating layer is formed on the base layer during the film-forming process, the reclaimability of the film scraps to the base layer is degraded, and numerous inner voids are formed by the resin of the coating layer which acts as the nuclei, thereby degrading the mechanical properties.

The adhesive strength between the coating layer and the base layer is preferably 0.6 N/cm or more. When the adhesive strength between the coating layer and the base layer is less than 0.6 N/cm, the coating layer may peel off during converting, thereby imposing a significantly large limitation on the usage. The adhesive strength between the coating layer and the base layer is preferably 0.8 N/cm or more, and more preferably 1.0 N/cm or more.

When a coating layer is formed on at least one side of the biaxially stretched polypropylene film of the fifth embodiment so that the film can be used as the film for metallization, the centerline average roughness (Ra) of the biaxially stretched polypropylene film of the fifth embodiment is preferably 0.01 to 0.5 µm from the point of view of handling convenience, slipperiness, and blocking prevention. More preferably, the centerline average roughness is 0.02 to 0.2 µm. When the centerline average roughness (Ra) is less than 0.02 µm, the slipperiness may be degraded, resulting in the degradation of handling convenience of the film. At a centerline average roughness (Ra) exceeding 0.2 µm, pinholes may occur in an aluminum layer when a metallized film is made by sequentially depositing the coating layer and a metallization layer, thereby degrading the gas barrier property.

When a coating layer is formed on at least one side of the biaxially stretched polypropylene film of the fifth embodiment so that the film can be used as the film for metallization, the surface gloss of the biaxially stretched polypropylene film of the fifth embodiment is preferably 135% or more, and more preferably 138% or more to ensure superior metallic gloss after metallization.

The coating layer is preferably formed by a process of applying a coating solution using a reverse roll coater, a gravure coater, a rod coater, an air doctor coater, or other coating machines outside the polypropylene film manufacturing process. More preferably, the coating is performed in the film manufacturing process. More preferably, examples thereof include a method to apply coating solutions during the film manufacturing process, in which a coating solution is applied on an unstretched polypropylene film and then the film is sequentially biaxially stretched, and in which a coating solution is applied on a uniaxially stretched polypropylene film and then the film is stretched in the direction perpendicular to the uniaxial stretching. This method in which a coating solution is applied on a uniaxially stretched polypropylene film and then stretching the film in the direction perpendicular to the uniaxial stretching is most preferred since the thickness of the coating layer can be uniform and the production efficiency can be improved.

When the biaxially stretched polypropylene film of the fifth embodiment is used as the film for metallization, the polypropylene used in the base layer preferably contains no organic lubricants such as fatty acid amide, etc. in point of view of adhesion of the coating layer and the metallization layer. However, a small amount of organic crosslinked particles or inorganic particles may be added to provide slipperiness and improve the processability and windability. Examples of the organic crosslinked particles added to the polypropylene of the base layer at a small amount include crosslinked-silicone particles, crosslinked-polymethyl-methacrylate particles, and crosslinked-polystyrene particles, etc. Examples of the inorganic particles include zeolite, calcium carbonate, silicon oxide, and aluminum silicate, etc. The average particle size of these particles is preferably 0.5 to 5 µm since the slipperiness can be increased without significantly degrading the transparency of the film.

An antistatic agent for avoiding the troubles resulting from the static electrification of the film is preferably added to the biaxially stretched polypropylene film of the fifth embodiment except for when the film is used as the film for metallization having the above-described construction. The antistatic agent contained in the biaxially stretched polypropylene film of the fifth embodiment is not restricted. However, examples of the antistatic agent include ethylene oxide adducts of betaine derivatives, quaternary amine compounds, alkyldiethanolamine fatty acid esters, glycerin fatty acid ester, gylceride stearates, etc. and mixtures of these.

A lubricant is preferably added, more preferably, in addition to the antistatic agent described above except for when the film is used as the film for metallization having the above-described construction. The lubricant is added to improve the mould-releasing property and the flowability during thermo-forming of thermoplastic resins according to the wordings of Japanese Industrial Standards, and to adjust the frictional force between a converting machine and the film surface and between the films themselves.

The lubricant is not restricted. However, examples of the lubricants include amide compounds such as stearamide, erucic amide, erucamide, oleamide, etc. and mixtures of these.

The content of the antistatic agent is preferably 0.3 parts by weight or more, and more preferably in the range of 0.4 to 1.5 parts by weight relative to 100 parts by weight of the polypropylene resin used. The total content of the antistatic agent and the lubricant is more preferably 0.5 to 2.0 parts by weight from the point of view of antistatic property and slipperiness.

Inorganic particles and/or crosslinked organic particles for increasing the slipperiness are preferably contained in the biaxially stretched polypropylene film of the fifth embodiment.

The term "inorganic particles" refers to inorganic particles of metal compounds, and the inorganic particle is not restricted. However, examples of inorganic particles include inorganic particles of zeolite, calcium carbonate, magnesium carbonate, alumina, silica, aluminum silicate, kaolin, kaolinite, talc, clay, diatomite, montmorillonite, and titanium oxide, etc. and mixtures of these.

The term "crosslinked organic particles" refers to particles in which polymer compounds are crosslinked by a crosslinking agent. The crosslinked organic particles contained in the biaxially stretched polypropylene film are not restricted. However, examples of crosslinked organic particles include crosslinked particles of polymethoxysilane-based compounds, crosslinked particles of polystyrene-based compounds, crosslinked particles of acrylic-based compounds, crosslinked particles of polyurethane-based compounds, crosslinked particles of polyester-based compounds, crosslinked particles of fluoric-based compounds, and mixtures of these.

The average particle size of the inorganic particles and crosslinked organic particles is preferably in the range of 0.5 to 6 µm. If an average particle size of is less than 0.5 µm, the slipperiness may be degraded. If an average particle size exceeds 6 µm, drop-off of particles may occur, and the film surface may be readily damaged when the films come into contact with each other.

The amount of the inorganic particles and/or the crosslinked organic particles added is preferably in the range of 0.02 to 0.5 percent by weight, and more preferably 0.05 to 0.2 percent by weight from the point of view of blocking prevention, slipperiness, and transparency.

In addition to the above-described additives, a nucleating agent, a heat stabilizer, and an antioxidant may be added to the biaxially stretched polypropylene film of the fifth embodiment, if necessary.

Examples of the nucleating agent include sorbitol-based, organic-metal-phosphate-ester-based, organic-metalcarboxylate-based, and rosin-based nucleating agents. The amount of the nucleating agent is 0.5 percent by weight or less. As the heat stabilizer, 2,6-di-tertiary-butyl-4-methylphenol (BHT) or the like may be added in amount of 0.5 percent by weight or less. As the antioxidant, tetrakis-(methylene-(3,5-di-tertiary-butyl-4-hydroxy-hydrocinnamate))butane (Irganox 1010) or the like may be added in amount of 0.5 percent by weight or less.

A publicly known polyolefin resin is preferably laminated on at least one side of the biaxially stretched polypropylene film of the fifth embodiment for the purposes other than those described above, such as prevention of bleed-out/flying-off of additives, adhesion of the metallization layer, high printability, enhancement of heat sealability, enhancement of print-lamination property, enhancement of glossy appearance, haze reduction (enhancement of transparency), enhancement of releasing property, and enhancement of slipperiness, etc.

The thickness of the laminated polyolefin resin is preferably 0.25 µm or more and half the total thickness of the film or less. If a thickness is less than 0.25 µm, it is difficult to form a uniform layer due to lamination defects. When the thickness exceeds half the total thickness of the film, the effect of the surface layer on the mechanical property becomes large, resulting in a decrease in Young's modulus and tension resistance of the film. This resin laminated on the surface need not satisfy the ranges of the present invention. Examples of the lamination method include co-extrusion, in-line/off-line extrusion lamination and in-line/ off-line coating, etc. The method is not limited to these, and the most suitable method should be selected as needed.

At least one film surface of the biaxially stretched polypropylene film of the fifth embodiment is preferably subjected to corona discharge treatment so as to allow the film surface to have a surface wetting tension of at least 35 mN/m because the printability, adhesion, antistatic property, and lubricant bleed-out property can be improved. The atmospheric gas during corona discharge treatment is preferably air, oxygen, nitrogen, carbon dioxide gas, or a nitrogen/carbon dioxide mixture gas. From the point of view of economical efficiency, corona discharge treatment in air is particularly preferred.

The Young's modulus in the longitudinal direction (Y(MD)) at 25° C. of the biaxially stretched polypropylene film of the fifth embodiment is preferably 2.5 GPa or more. When the Y(MD) at 25° C. is less than 2.5 GPa, the stiffness in the transverse direction becomes high when compared with that in the longitudinal direction, resulting in an imbalance of stiffness and insufficient firmness of the film. As a result, the film may exhibit insufficient tension resistance. The Young's modulus in the longitudinal direction (Y(MD)) at 25° C. can be controlled by adjusting the temperature of cooling drum for cooling and solidifying the molten material to prepare an unstretched sheet, the conditions for the longitudinal stretching (temperature, stretching ratio, etc.), the crystallinity of the polypropylene (depending on meso pentad fraction (mmmm), isotactic index (II), etc.), the amount of the additive for providing plasticity during stretching, and the like. The optimum film forming conditions and raw materials should be selected as needed, as long as the advantages are not impaired. The Young's modulus in the longitudinal direction (Y(MD)) at 25° C. is more preferably 2.7 GPa or more, yet more preferably 3.0 GPa or more, and most preferably 3.2 GPa or more.

The Young's modulus in the longitudinal direction (Y(MD)) at 80° C. of the biaxially stretched polypropylene film of the fifth embodiment is preferably 0.4 GPa or more. When the Y(MD) at 80° C. is less than 0.4 GPa, the tension resistance during film converting may be insufficient. The Young's modulus (Y(MD)) in the longitudinal direction at 80° C. can be controlled by adjusting the temperature of cooling drum for cooling and solidifying the molten material to prepare an unstretched sheet, the conditions for the longitudinal stretching (temperature, stretching ratio, etc.), the crystallinity of the polypropylene (depending on meso pentad fraction (mmmm), isotactic index (II), etc.), the amount of the additive for providing plasticity during stretching, and the like. The optimum film forming conditions and raw materials should be selected as needed, as long as the advantages are not impaired. The Young's modulus in the longitudinal direction (Y(MD)) at 80° C. is more preferably 0.5 GPa or more, and furthermore preferably 0.6 GPa or more.

In the biaxially stretched polypropylene film of the fifth embodiment, the m value at 25° C. is preferably in the range of 0.4 to 0.7 wherein the m value in terms of a Young's modulus in the longitudinal direction (Y(MD)) and a Young's modulus in the transverse direction (Y(TD)) is expressed as below:

$$m = Y(MD)/(Y(MD)+Y(TD))$$

Here, the m value is the ratio of the Young's modulus in the longitudinal direction to the total of the Young's moduli in the longitudinal and transverse directions. Accordingly, a film having an m value of less than 0.5 has a higher stiffness in the transverse direction than in the longitudinal direction. A film having an m value of 0.5 has a substantially balanced stiffness between the stiffness in the longitudinal direction and the stiffness in the transverse direction. A film having an m value of more than 0.5 has a higher stiffness in the longitudinal direction than in the transverse direction. When a film has an m value of 0.4 to 0.7, the film has balanced and high stiffness. When the m value at 25° C. is less than 0.4, the stiffness in the longitudinal direction is significantly lower than that in the transverse direction, resulting in an imbalance of the stiffness. This may result in insufficient tension resistance during film converting and insufficient film stiffness and is therefore not preferred. An m value exceeding 0.7 is also not preferred since the stiffness in the transverse direction may be significantly lower than that in the longitudinal direction and the firmness of the resulting film may be insufficient.

The m value at 25° C. can be controlled by adjusting the film-forming conditions, e.g., the temperature of cooling drum for cooling and solidifying the molten material to prepare an unstretched sheet, the temperatures during longitudinal/transverse stretching, stretching ratio, relaxation of the film after longitudinal/transverse stretching; the crystallinity of the polypropylene (depending on meso pentad fraction (mmmm), isotactic index (II), etc.): the amount of the additive for providing plasticity during stretching, and the like. The optimum film-forming conditions and raw materials should be selected as needed, as long as the advantages of the present invention are not impaired. The m value at 25° C. is more preferably 0.42 to 0.68, yet more preferably 0.44 to 0.65, and most preferably 0.46 to 0.62. Preferably, the m value at 80° C. is also in the range of 0.4 to 0.7.

The F2 value in the longitudinal direction at 25° C. of the biaxially stretched polypropylene film of the fifth embodiment of the present invention is preferably 40 MPa or more. Here, the F2 value in the longitudinal direction is a stress applied on a sample 15 cm in the longitudinal direction and 1 cm in the transverse direction at an elongation of 2% when the sample is stretched at an original length of 50 mm and a testing speed of 300 mm/min. When the F2 value in the longitudinal direction at 25° C. is less than 40 MPa, the stiffness in the transverse direction becomes higher than that in the longitudinal direction, resulting in a film having an imbalanced stiffness and low firmness. Moreover, the tension resistance of the film may be poor. The F2 value is more preferably 45 MPa in the longitudinal direction at 25° C. or more.

The F5 value in the longitudinal direction at 25° C. of the biaxially stretched polypropylene film of the fifth embodiment is preferably 50 MPa or more. Here, the F5 value in the longitudinal direction is a stress applied on a sample 15 cm in the longitudinal direction and 1 cm in the transverse direction at an elongation of 5% when the sample is stretched at an original length of 50 mm and a testing speed of 300 mm/min. When the F5 value in the longitudinal direction at 25° C. is less than 50 MPa, the stiffness in the transverse direction becomes higher than that in the longitudinal direction, resulting in a film having an imbalanced stiffness and low firmness. Moreover, the tension resistance of the film may be poor. The F5 value in the longitudinal direction at 25° C. is more preferably 55 MPa or more.

The heat shrinkage in the longitudinal direction (S(MD)) at 120° C. of the biaxially stretched polypropylene film of the fifth embodiment is preferably 5% or less. When the heat shrinkage in the longitudinal direction at 120° C. exceeds 5%, an extensive degree of shrinking occurs when the film is heated during processes such as printing, laminating, coating, metallizing, and the like, resulting in process failures such as defects in the film, pitch displacement, and wrinkles. The heat shrinkage in the longitudinal direction at 120° C. can be controlled by adjusting the temperature of cooling drum for cooling and solidifying the molten material to prepare an unstretched sheet, the conditions for the longitudinal stretching (stretching temperature, stretching ratio, relaxation of the film after longitudinal stretching, etc.), the crystallinity of the polypropylene (depending on meso pentad fraction (mmmm), isotactic index (II), etc.), the amount of the additive for providing plasticity during stretching, and the like. The optimum longitudinal-stretching conditions and raw materials should be selected as needed, as long as the advantages are not impaired. More preferably, the heat shrinkage in the longitudinal direction at 120° C. is 4% or less.

In the biaxially stretched polypropylene film of the fifth embodiment, the sum of the heat shrinkage in the longitudinal direction (S(MD)) and the heat shrinkage in the transverse direction at 120° C. is preferably 8% or less. When the sum of the heat shrinkage in the longitudinal and transverse directions exceeds 8%, an extensive degree of shrinking occurs when the film is heated during processes such as printing, laminating, coating, metallizing, and the like, resulting in process failures such as defects in the film, pitch displacement, and the like. The index (II) of the fifth embodiment corresponds to this. The sum of the heat shrinkages in the longitudinal and transverse directions can be controlled by adjusting the amount of the additive for providing plasticity during stretching and the like. The optimum film-forming conditions and raw materials should be selected as needed, as long as the advantages are not impaired. More preferably, the sum of the heat shrinkage in the longitudinal (S(MD)) and the heat shrinkage in the transverse directions at 120° C. is 6% or less.

The biaxially stretched polypropylene film preferably has a Young's modulus in the longitudinal direction (Y(MD)) at 25° C. and a heat shrinkage in the longitudinal direction (S(MD)) at 120° C. that satisfy the formula below:

$Y(MD) \geq S(MD)-1.$

The biaxially stretched polypropylene film that satisfies the above-described formula can exhibit high tension resistance and superior handling convenience during film converting. When the above-described formula is not satisfied, the biaxially stretched polypropylene film may exhibit poor tension resistance during film converting or may induce process failures due to film shrinkage. In order to satisfy the above-described formula, adjustment of the following may be performed: the film-forming conditions, e.g., the temperature of cooling drum for cooling and solidifying the molten material to prepare an unstretched sheet, the temperatures during longitudinal/transverse stretching, stretching ratio, relaxation of the film after longitudinal/transverse stretching; the crystallinity of the polypropylene (depending on meso pentad fraction (mmmm), isotactic index (II), etc.); the amount of the additive for providing plasticity during stretching; and the like. The optimum film-forming conditions and raw materials should be selected as needed, as long as advantages are not impaired. More preferably, the formula below is satisfied:

$Y(MD) \geq S(MD)-0.7.$

The water vapor permeability of the biaxially stretched polypropylene film of the fifth embodiment is preferably 1.5 g/m$^2$/d/0.1 mm or less. When the water vapor permeability exceeds 1.5 g/m$^2$/d/0.1 mm, the biaxially stretched polypropylene film may exhibit poor moisture-proof property when it is used as a packaging material that shields the contents from the external air, for example. The water vapor permeability can be controlled by adjusting the film-forming conditions, e.g., the temperature of cooling drum for cooling and solidifying the molten material to prepare an unstretched sheet, the temperatures during longitudinal/transverse stretching, stretching ratio; the crystallinity of the polypropylene (depending on meso pentad fraction (mmmm), isotactic index (II), etc.); the amount of the additive for providing plasticity during stretching; and the like. The optimum film-forming conditions and raw materials should be selected as needed, as long as the advantages are not impaired. More preferably, the water vapor permeability is 1.2 g/m$^2$/d/0.1 mm or less.

Publicly known methods may be employed in making the biaxially stretched polypropylene film. For example, a polypropylene which comprises a polypropylene satisfying the formula below, $\log(MS) > -0.61 \log(MFR) + 0.82,$ or a polypropylene which consists of a polypropylene satisfying the formula below, $\log(MS) > -0.61 \log(MFR) + 0.52,$ or a polypropylene which comprises having a Trouton ratio of 30 or more, or a polypropylene which consists of a polypropylene having a Trouton ratio of 16 or more is blended with at least one of petroleum resins substantially containing no polar-group and/or terpene resins substantially containing no polar-group, and the mixture is fed into an extruder. The mixture is melted, filtered, and extruded from a slit die. The extruded mixture is then wound around a cooling drum to be cooled and solidified into a sheet to make an unstretched film. The temperature of the cooling drum is preferably 20 to 100° C. so that the film can be adequately crystallized. In this manner, a large number of longitudinal fibrils having a large length can be obtained after biaxially stretcing.

Next, the resulting unstretched film is biaxially stretched by a publicly known longitudinal-transverse sequential biaxial stretching method. The important factor for making a biaxially stretched polypropylene film highly tensilized in the longitudinal direction is the stretching ratio in the longitudinal direction. The real longitudinal stretching ratio in a conventional longitudinal-transverse sequential biaxial stretching method for manufacturing a polypropylene film is in the range of 4.5 to 5.5, and when a longitudinal stretching ratio exceeds 6, film-forming may become unstable, and the film may break during transverse stretching. On the contrary, the real longitudinal stretching ratio is preferably 6 or more. When an real longitudinal stretching ratio is less than 6, sufficient longitudinal fibrils cannot be obtained, the stiffness in the longitudinal direction of the film may be insufficient, and the firmness of the resulting film may be insufficient in manufacturing thinner film. The more preferable real stretching ratio in the longitudinal direction is 7 or more, and the most preferable real stretching ratio is 8 or more. It is sometimes preferable to perform the longitudinal stretching in two or more steps from the point of view of tensilization in the longitudinal direction and introduction of the longitudinal fibrils. The longitudinal stretching temperature is an optimum temperature selected from the point of view of stability in film-forming, tensilization in the longitudinal direction, and introduction of the longitudinal fibrils. The longitudinal stretching temperature is preferably 120 to 150° C. Moreover, during the cooling process that follows longitudinal stretching, the film is preferably relaxed in the longitudinal direction to an extent that does not further induce thickness irregularity of the film from the point of view of dimensional stability in the longitudinal direction.

The real stretching ratio in the transverse direction is preferably 10 or less. When an real transverse stretching ratio exceeds 10, the stiffness of the resulting film in the longitudinal direction may be low, the number of longitudinal fibrils may decrease, and the film-forming may become unstable. The transverse stretching temperature is an optimum temperature selected from the point of view of stability in film-forming, thickness irregularities, tensilization in the longitudinal direction, and introduction of the longitudinal fibrils. The transversal stretching temperature is preferably 150 to 180° C.

After stretching in the transverse direction, the film is heat-set at 150 to 180° C. while relaxing the film in the transverse direction by 1% or more, cooled, and wound to obtain the biaxially stretched polypropylene film.

An example method for manufacturing a film for metallization using a biaxially stretched polypropylene film will now be described. However, this disclosure is not limited by the manufacturing method described below.

For example, a polypropylene which comprises a polypropylene satisfying the formula below:

$$\log(MS) > -0.61 \log(MFR) + 0.82$$

or a polypropylene which consists of a polypropylene satisfying the formula below:

$$\log(MS) > -0.61 \log(MFR) + 0.52$$

or a polypropylene which comprises a polypropylene having a Trouton ratio of 30 or more, or a polypropylene which consists of a polypropylene having a Trouton ratio of 16 or more is blended with at least one of petroleum resins substantially containing no polar-group and/or terpene resins substantially containing no polar-group. The mixed resin and/or the third layer resin is prepared. These resins are fed into separate extruders, melted at 200 to 290° C., and are filtered. The resins are put together inside a short pipe or a die, extruded from a slit die to form a laminate each layer of which has a target thickness, and wound around a cooling drum to be cooled and solidified into a sheet to obtain an unstretched laminate film. The temperature of the cooling drum is preferably 20 to 90° C. so that the film can be adequately crystallized. In this manner, a large number of longitudinal fibrils having a large length can be obtained after biaxially stretcing.

The unstretched laminate film is heated to a temperature of 120 to 150° C. and stretched in the longitudinal direction to 6 times the initial length or more. The film is then fed into a tenter-type drawing machine so as to stretch the film in the transverse direction to 10 times the initial length or less at 150 to 180° C., relaxed by heating at 150 to 180° C., and cooled. If necessary, a surface of the base layer on which a metallization layer is to be deposited and/or the third layer surface opposite of the base layer is subjected to corona discharge treatment in air, nitrogen, or mixture gas of carbon dioxide and nitrogen. When a heat-seal layer is to be laminated as a third layer, corona discharge treatment is preferably avoided to achieve high adhesive strength. Next, the film is wound to obtain a biaxially stretched polypropylene film for metallization.

To make a film having a superior gas barrier property, the above-described unstretched laminate film is heated to a temperature of 120 to 150° C., stretched in the longitudinal direction to 6 times the initial length or more, and cooled. Subsequently, the above-described coating material is applied on the uniaxially stretched film base layer. The base layer surface may be subjected to corona discharge treatment, if necessary. The film is then fed into a tenter-type drawing machine, stretched at a temperature of 150 to 180° C. in the transverse direction to 10 times the initial length or less, relaxed by heating at 150 to 180° C., and cooled. The resulting coating layer on the base layer and/or the third layer surface opposite of the base layer may be subjected to corona discharge treatment in air, nitrogen, or mixture gas of carbon dioxide and nitrogen if necessary. At this stage, when a heat-seal layer is to be laminated as a third layer, corona discharge treatment is preferably avoided to achieve high adhesive strength. Next, the film is wound to obtain a biaxially stretched polypropylene film for metallization.

The biaxially stretched polypropylene film for metallization is preferably aged at 40 to 60° C. to accelerate the reaction in the coating layer. When the reaction in the coating layer is accelerated, the adhesive strength of the coating layer to the base layer and to the metallization layer can be increased, and gas barrier property of the film can be improved. Aging is preferably performed for 12 hours or more, and more preferably 24 hours or more to improve the chemical resistance.

Next, the metallization is performed by vacuum metallization of metal. A metal from evaporation source is deposited on the coating layer, which coats the surface of the biaxially stretched polypropylene film, to form a metallization layer.

Examples of the evaporation source include those of a resistance-heating boat type, a radiation- or radiofrequency-heating crucible type, and an electron beam heating type. The evaporation source is not restricted.

The metal used in the metallization is preferably a metal such as Al, Zn, Mg, Sn, Si, or the like. Alternatively, Ti, In, Cr, Ni, Cu, Pb, Fe, or the like may be used. These metal preferably has a purity of 99% or more, and more preferably 99.5% or more and is preferably processed into grains, rods, tablets, wires, and crucibles.

Among the metals for metallization, an aluminum metallization layer is preferably formed on at least one side of the film from the point of view of durability of the metallization layer, production efficiency, and cost. Other metal components such as nickel, copper, gold, silver, chromium, zinc, and the like may be metallized sequentially or simultaneously with aluminum.

The metallization layer preferably has a thickness of 10 nm or more, and more preferably 20 nm or more to achieve high gas barrier property. The upper limit of the thickness of the metallization layer is not restricted; however, the thickness is preferably less than 50 nm from the point of view of economical and production efficiencies.

The gloss of the metallization layer is preferably 600% or more, and more preferably 700% or more.

Alternatively, a metallization layer composed of metal oxide may be formed so that the film may be used as a transparent gas-barrier film for packaging having a superior gas barrier property. The metal oxide metallization layer is preferably a layer of a metal oxide such as incompletely oxidized aluminum, or incompletely oxidized silicon. Incompletely oxidized aluminum is particularly preferable from the point of view of durability of the metallization layer, production efficiency, and cost. Metallization can be performed by publicly known methods. For example, in depositing the metallization layer composed of incompletely oxidized aluminum, the film is allowed to run in a high-vacuum device having a degree of vacuum of $10^{-4}$ Torr or less, aluminum metal is heated, melted, and evaporated, and a small amount of oxygen gas is supplied at the site of evaporation so that the aluminum can be coherently deposited on the film surface to form a metallization layer while being oxidized. The thickness of the metal oxide metallization layer is preferably in the range of 10 to 50 nm, and more preferably 10 to 30 nm. The oxidation of the metal oxide metallization layer composed of incompletely oxidized metal proceeds after metallization and changes the light transmittance of the metal oxide metallization film. The light transmittance is preferably in the range of 70 to 90%. A light transmittance of less than 70% is not preferred since the content cannot be seen through the package when the film is made into a packaging bag. A light transmittance exceeding 90% is not preferred because the gas barrier property tends to be poor when the film is made into a packaging bag.

The adhesive strength between the metallization layer and the coating layer of the metallized biaxially stretched polypropylene film and between the metal oxide metallization layer and the coating layer of the metallized biaxially stretched polypropylene film is preferably 0.6 N/cm or more, and more preferably 0.8 N/cm or more. When the adhesive strength is less than the above-described range, the metallization layer may be picked off when the metallized film is being wound into a roll and when the metallized film is being wound off for converting, resulting in degradation of the gas barrier property.

The gas barrier properties of the films prepared by depositing a metallization layer of a metal and an oxide metal on the biaxially stretched polypropylene films are preferably as follows. The water vapor permeability is preferably 4 g/m²/d or less, and more preferably 1 g/m²/d or less, and the oxygen permeability is preferably 200 ml/m²/d/MPa or less, and more preferably 100 ml/m²/d/MPa for use in food packaging bags.

The biaxially stretched polypropylene films of the first, second, third, fourth, and fifth embodiments have an increased stiffness in the longitudinal direction compared with conventional biaxially stretched polypropylene films without degrading important properties such as dimensional stability and moisture-proof property. As a result, the films exhibit superior handling convenience and excellent tension resistance against converting tension applied during film converting such as printing, laminating, coating, metallizing, and bag-making. Moreover, the troubles such as cracks and print pitch displacement due to the quality of base films can be avoided. Furthermore, the stiffness in the longitudinal direction and the tension resistance are higher than those of the conventional polypropylenes having the same thickness; hence, the converting property can be maintained with a thickness smaller than that of conventional biaxially stretched polypropylene films. Accordingly, the biaxially stretched polypropylene films are suitable for packaging and industrial use.

(Methods for Determined Characteristic Values)

The technical terms and the measurement methods employed in the present invention will now be described.

(1) Melt Strength (MS)

The melt strength MS was measured according to Japanese Industrial Standards (JIS) K7210. A polypropylene was heated to 230° C. in a melt-tension tester available from Toyo Seiki Kogyo Co., Ltd., and the molten polypropylene was extruded at an extrusion speed of 15 mm/min to make a strand. The tension of the strand at a take-over rate of 6.5 m/min was measured, and this tension was defined as the melt strength (MS).

(2) Melt Flow Rate (MFR)

The melt flow rate was measured according to the polypropylene testing method of JIS K6758 at 230° C. and 2.16 kgf.

(3) Trouton Ratio

The Trouton ratio was measured by a converging flow method according to a theory by Cogswell [Polymer Engineering Science, 12, 64 (1972)] under the following conditions:

Apparatus: twin-capillary rheometer RH-2200 (available from Rosand Inc.)

Temperature: 230° C.

| Capillary size: | Die/1.0 mm diam × 16 mm |
| | Orifice/1.0 mm diam × 0.25 mm |
| Shear rate: | approximately 10 s$^{-1}$ to approximately 1800 s$^{-1}$ |
| Extensional strain rate: | approximately 2 s$^{-1}$ to approximately 180 s$^{-1}$ |

Each sample was fed into the apparatus and maintained at 230° C. for 3 minutes. The sample was fed again and maintained for 3 minutes. Subsequently, the measurements were taken.

According to Cogswell's theory, the pressure drop of the converging flow ($\Delta P_{ent}$) at the entrance of the capillary can be expressed in terms of extensional viscosity and shear viscosity as the expression below:

$$\Delta P_{ent} = \frac{4\sqrt{2}}{3(n+1)} \gamma_a (\eta_s \eta_E)^{1/2}$$

wherein $\eta_E$: extensional viscosity, $\eta_s$: shear viscosity, $\gamma_a$: shear rate, and n is a flow index in the power law ($\sigma_s = k\gamma hd$ $a^n$, $\sigma_s$: shear stress)

With the twin-capillary rheometer, two capillaries of different lengths can be simultaneously used so that the shear viscosity and $\Delta P_{ent}$ at a particular shear rate can be simultaneously measured. The extensional viscosity $\eta_E$ can then be calculated from the equation below:

$$\eta_E = \frac{9(n+1)^2}{32\eta_s}\left[\frac{\Delta P_{ent}}{\gamma_a}\right]^2$$

$$\varepsilon = \frac{4\eta_s \gamma_a^2}{3(n+1)\Delta P_{ent}}$$

wherein $\epsilon$: extensional stress. The obtained extensional viscosity/extensional strain rate curve and shear viscosity/shear rate curve were respectively approximated as exponential functions. Using the exponential functions, $\eta_{E(60)}$ and $\eta_{s(60)}$ at a strain rate of 60 S$^{-1}$ were calculated. Based on these, the Trouton ratio at a strain rate of 60 s$^{-1}$ (the ratio of $\eta_E$ to $\eta_s$ at the same strain rate) was calculated:

Trouton ratio=$\eta_{E(60)}/\eta_{s(60)}$ (4) Meso Pentad Fraction (mmmm)

A polypropylene was dissolved in o-dichlorobenzene-D6, and $^{13}$C-NMR was measured at a resonance frequency of 67.93 MHz using JNM-GX270 apparatus available from JEOL Ltd. The assignment of the obtained spectrum and the calculation of the meso pentad fraction were performed based on the method by T. Hayashi et. al (Polymer, 29, 138-143 (1988)), in which, for a methyl-group-derived spectrum, each peaks were respectively assigned with an mmmm peak of 21.855 ppm, the peak area was calculated, and the ratio of the peak area to the total peak area of the methyl-group-derived peaks were calculated in terms of percentage. The detailed measurement conditions were as follows:

| | |
|---|---|
| Measurement density: | 15 to 20 wt. % |
| Measurement solvent: | o-dichlorobenzene (90 wt. %)/benzene-D6 (10 wt. %) |
| Measurement temperature: | 120 to 130° C. |
| Resonance frequency: | 67.93 MHz |
| Pulse width: | 10 microseconds (45° pulse) |
| Pulse repeating time: | 7.091 seconds |
| Data points: | 32K |
| Number of accumulation: | 8168 |
| Measurement mode: | Noise decoupling |

(5) Young's Modulus, F2 Value, and F5 Value

The Young's modulus, F2 value, and F5 value at 25° C. were measured at 65% RH using a film strength and elongation tester (AMF/RTA-100) available from Orientech Co., Ltd. A sample 15 cm in a measuring direction and 1 cm in a direction perpendicular to the measuring direction was prepared by cutting and was elongated at an original length of 50 mm and a stretching rate of 300 mm/min. The Young's modulus was measured according to JIS-Z1702. The F2 value and the F5 value were, respectively the stress applied on the sample at an elongation of 2% and at an elongation of 5%. When the measurement involves a high temperature, such as 80° C., a hot/cold thermostat available from Gondot Science, Ltd., under the same conditions described above.

(6) Observation of the Fibril Structure

A sample was placed in such a manner that the longitudinal direction of the sample matches with the vertical direction of an image, and was then observed with an atomic force microscope (AFM) under the condition described below. During observation, conditions such as gain and amplitude, etc. were suitably adjusted so that the image was not blurred. When blurring of the image was not corrected by adjusting the conditions, a cantilever was replaced. The sample was observed five times each time at a different position for a field view of 1 μm (or 5 μm, or 10 μm) square. A sample was evaluated as "A" when longitudinal fibrils having a width of 40 nm or more and extending across two sides parallel to the transverse direction of the images were found in all of the five 10-μm square images. A sample was evaluated as "B" when such longitudinal fibrils were found in all of the five 5-μm square images, and a sample was evaluated as "C" when such longitudinal fibrils were found in all of the five 1-μm images. A sample was evaluated as "NONE" when no longitudinal fibrils having a width of 40 nm or more were observed. The number and the width of the longitudinal fibrils of the sample were calculated and averaged from the number and the width of the longitudinal fibrils having a width of 40 nm or more in each images. Note that it is preferable to observe both surfaces of the film; however, it is sufficient to observe only one surface of the film.

| | |
|---|---|
| Apparatus: | NanoScope III AFM (manufactured by Digital Instruments, Co.) |
| Cantilever: | Single crystal of silicon |
| Scan mode: | Tapping mode |
| Scan range: | 1 μm × 1 μm, 5 μm × 5 μm, 10 μm × 10 μm |
| Scan rate: | 0.3 Hz |

(7) Isotactic Index (II)

A polypropylene was extracted with 60° C. or lower n-heptane for 2 hours so as to remove the additives in the polypropylene, and was subsequently vacuum-dried at 130° C. for 2 hours. A sample of weight W (mg) was taken therefrom, and extracted with boiled n-heptane in a Soxhlet extractor for 12 hours. The sample was then taken out, sufficiently washed with acetone, and vacuum-dried at 130° C. for 6 hours. The sample was then cooled to normal temperature, and the weight W' (mg) was measured. The isotactic index was then determined with the following equation:

$$II=(W'/W)\times 100\ (\%)$$

(8) Intrinsic Viscosity ([η])

A polypropylene was dissolved in tetralin at 135° C., and the intrinsic viscosity was measured with an Ostwald viscometer manufactured by Mitsui Toatsu Chemicals, Inc.

(9) Glass Transition Temperature (Tg)

Into a thermal analysis apparatus RDC 220 available from Seiko Instruments, Inc., 5 mg of a sample enclosed in an aluminum pan was fed, and the temperature was increased at a rate of 20° C./min. Using the internal program of a thermal analysis system SSC5200 available from Seiko Instruments, Inc., the starting point of glass transition was determined from the resulting thermal curve and this temperature was defined as the glass transition temperature (Tg).

(10) Bromine Number

The bromine number was measured according to JIS K2543-1979. The number of grams of bromine added to the unsaturated components in a 100-g of sample oil was defined as the bromine number.

(11) Heat Shrinkage

The measurement was performed in the longitudinal direction and in the transverse direction. A film sample having a length of 260 mm and a width of 10 mm was prepared, and a mark was placed at a position corresponding to a length of 200 mm, i.e., the original length $L_0$. The sample was heated at 120° C. for 15 minutes in a heat flow convection oven while being applied with a load of 3 g at the lower end of the sample. The sample was then discharged into room temperature, and the marked length ($L_1$) of the sample was measured. The heat shrinkage was calculated by the equation below. This process was performed for each direction (longitudinal direction and transverse direction), and the sum of the heat shrinkages in the longitudinal direction and the transverse direction was calculated.

$$\text{Heat shrinkage }(\%)=100\times(L_0-L_1)/L_0$$

(12) Centerline Average Roughness (Ra)

The centerline average roughness (Ra) was measured according to JIS B0601 using stylus-type roughness meter.

A high-accuracy thin-film step-difference measuring instrument (type:ET-30HK), manufactured by Kosaka Laboratory Ltd., was used. The conical stylus had a radius of 0.5 μm, the load was 16 mg, and the cut-off was 0.08 mm.

The portion of the roughness curve corresponding to the measurement length L was cut off in the center line direction, and the centerline average roughness (Ra) in terms of μm was calculated by the equation below, wherein the centerline of the portion cut off is the X axis, the longitudinal direction of the portion cut off is the Y axis, and the roughness curve is represented by y=f(x):

$$Ra = \frac{1}{L} \int |f(x)| dx$$

(13) Thickness of the Coating Layer, Metallization Layer, and Metal Oxide Metallization Layer Using a transmission electron microscope (TEM), the structure of a film cross-section was observed, and the thickness of the deposited layer and the thickness constructions were measured.

(14) Surface Gloss of the Film

The surface gloss of the film as a 60° specular gloss was measured with a digital variable angle gloss meter UGV-5D manufactured by Suga Test Instruments Co., Ltd. according to JIS Z8741 method.

(15) Surface Gloss of the Metallized Film

A metallized biaxially stretched polypropylene film was installed in a continuous vacuum metallizing apparatus. While allowing aluminum to evaporate from an electron-beam heating type evaporation source and allowing the film to run continuously, aluminum was deposited so that the optical density (−log(optical transmittance)) measured using a an optical densitometer (TR927) manufactured by Macbeth was in the range of 1.9 to 2.1. The surface gloss of the metallized film was measured according to JIS Z8741.

(16) Adhesive Strength

The adhesive strength between the surface layer of the biaxially stretched polypropylene film and the coating layer after metallization was measured as below. A biaxially oriented polypropylene film having a thickness of 20 μm (S645, manufactured by Toray Industries, Inc.) was laminated on the side of the coating layer using a polyurethane-based adhesive, and was left to stand at 40° C. for 48 hours. A 90° peel at a peeling rate of 10 cm/min was performed at a width of 15 mm using Tensilon manufactured by Toyo Baldwin Co. Ltd. The adhesive strengths between the polypropylene film for metallization and the metallization layer and that between the polypropylene film for metallization and the metal oxide metallization layer are measured by the same method described above in which a biaxially oriented polypropylene film having a thickness of 20 μm (S645, manufactured by Toray Industries, Inc.) was laminated on the side of the metallization layer and on the side of the metal oxide metallization layer using a polyurethane-based adhesive.

(17) Oxygen Permeability

A polypropylene adhesive film (Scotchmark, manufactured by 3M Company, 40 μm in thickness) was attached on the metallized side of a biaxially stretched polypropylene film, and the oxygen permeability was measured at 23° C. and a relative humidity of 0% using an oxygen permeability measuring instrument Oxtran 2/20 manufactured by MOCON/Modern Controls Inc.

(18) Water Vapor Permeability

The water vapor permeability of a biaxially stretched polypropylene film was measured at 40° C. and a relative humidity of 90% using a water vapor permeability measuring instrument PERMATRAN-W3/30 manufactured by MOCON/Modern Controls Inc. The water vapor permeability of a metallized biaxially stretched polypropylene film was measured as described above but with a polypropylene adhesive film (Scotchmark, manufactured by 3M Company, 40 μm in thickness) attached on the metallized side.

(19) Real Stretching Ratio

An unstretched film was prepared by extruding a material from a slit die and winding the extruded material on a metal drum so as to be cooled and solidified into a sheet. A 1-cm square mark the sides of which extend in the longitudinal and transverse direction of the film was inscribed on the unstretched film, and the unstretched film was stretched and wound. Subsequently, the length (cm) of the inscribed square mark on the film was measured, and the real stretching ratios in the longitudinal direction and the transverse direction were determined.

(20) Converting Ability

An unstretched polypropylene film having a thickness of 20 μm was laminated on a biaxially stretched polypropylene film or a metallized biaxially stretched polypropylene film (on the opposite side of the metallization layer) of the present invention having a length of 1,000 m and a thickness of 15 μm so as to prepare a food-packaging film. With the unstretched polypropylene film facing inward, the film was installed in a cylindrical manner using a vertical-type pillow-packaging machine (Fuji FW-77) manufactured by Fuji Machinery Co., Ltd., and was formed into bags.

In bag-making, a film that did not have wrinkles or elongated portions and that was processed into bags with good appearance was evaluated as "good". A film that was processed into bags with poor appearance since the bag had elongated portions due to a low Young's modulus of the film in the longitudinal direction and low firmness, or since the bag had wrinkles due to a poor slipperiness and a large heat shrinkage, was evaluated as "poor".

EXAMPLES

The films will now be described based on Examples. Unless otherwise noted, the screw speed of the extruder and the rotating speed of the cooling drum were adjusted to predetermined values to obtain a film having a desired thickness.

Example 1

To 90 percent by weight of a polypropylene prepared by blending a publicly known polypropylene having a melt strength (MS) of 1.5 cN, a melt flow rate (MFR) of 2.3 g/10 min, a meso pentad fraction (mmmm) of 92%, and an isotactic index (II) of 96% with 10 percent by weight of a high-melt-strength polypropylene (HMS-PP) having a melt strength of 20 cN, a melt flow rate (MFR) of 3 g/10 min, a meso pentad fraction (mmmm) of 97%, and an isotactic index (II) of 96.5%, containing long-chain branches, and satisfying the above-described formula (1) between the melt strength (MS) and the melt flow rate (MFR), 10 percent by weight of polydicyclopentadiene having Tg of 80° C., a bromine number of 3 cg/g, and a hydrogenation rate of 99%, which is a petroleum resin substantially containing no polar-group, was added as an additive that has compatibility with the polypropylene and can provide plasticity during stretching to prepare a resin. To 100 parts by weight of this resin, 0.15 parts by weight of crosslinked particles of a polymethacrylicacid-based polymer (crosslinked PMMA) having an average particle size of 2 μm was added as crosslinked organic particles, and 0.8 parts by weight of a 1:1 mixture of glycerin fatty acid ester and alkyldiethanolamine fatty acid ester was added as an antistatic agent. The resulting mixture was fed into a twin-screw extruder, was extruded at 240° C. into a gut-shape, cooled in a 20° C. water bath, and cut into a 3-mm length by a chip cutter. The resulting chips were dried for 2 hours at 100° C., fed into a single-screw extruder, melted at 260° C., and filtered. The resulting filtered material was extruded from a slit die and formed into a sheet by winding on a metal drum having a temperature of 25° C.

This sheet was passed between rolls maintained at 135° C., and pre-heated, and passed between rolls, which had different rotating speed and were maintained at 140° C., so that the sheet is stretched to 8 times the initial length in the longitudinal direction. The stretched sheet was then immediately cooled to room temperature. The stretched film was next fed into a tenter to be pre-heated at 165° C., stretched in the transverse direction to 7 times the initial length at 160° C., and heat-set at 160° C. while being relaxed in the transverse direction by 6%. The film was then cooled and wound so as to obtain a biaxially stretched polypropylene film having a thickness of 15 μm.

The composition of the raw material and the results of the evaluation of the film characteristics are shown in Tables 1 and 2. The resulting film had a high Young's modulus in the longitudinal direction and superior tension resistance, dimensional stability, moisture-proof property, and converting ability.

Example 2

A biaxially stretched polypropylene film of EXAMPLE 2 having a thickness of 15 μm was prepared as in EXAMPLE 1 except that a stretching ratio in the longitudinal direction was increased to 10.

The results are shown in Tables 1 and 2. The resulting film had a high Young's modulus in the longitudinal direction and superior tension resistance, dimensional stability, moisture-proof property, and converting ability.

Example 3

A biaxially stretched polypropylene film of EXAMPLE 3 having a thickness of 15 μm was prepared as in EXAMPLE 1 except that 5 percent by weight of the HMS-PP having long-chain branches was blended and 3 percent by weight of polydicyclopentadiene was added. Moreover, the film was stretched to 8 times the initial length in the longitudinal direction and to 8 times the initial length in the transverse direction.

The results are shown in Tables 1 and 2. The resulting film had a high Young's modulus in the longitudinal direction and superior tension resistance, dimensional stability, moisture-proof property, and converting ability.

Example 4

A biaxially stretched polypropylene film of EXAMPLE 4 having a thickness of 15 μm was prepared as in EXAMPLE 3 except that 3 percent by weight of the HMS-PP having long-chain branches was blended.

The results are shown in Tables 1 and 2. The resulting film had a high Young's modulus in the longitudinal direction and superior tension resistance, dimensional stability, moisture-proof property, and converting ability.

Example 5

A biaxially stretched polypropylene film of EXAMPLE 5 having a thickness of 15 μm was prepared as in EXAMPLE 1 except that 5 percent by weight of β-pinene having a Tg of 75° C., a bromine number of 4 cg/g, and a hydrogenation rate of 99%, which is a terpene resin substantially containing no polar-group, was added as an additive that has a compatibility with the polypropylene and can provide plasticity during stretching, and that the film is stretched to 9 times the initial length in the longitudinal direction and to 7 times the initial length in the transverse direction.

The results are shown in Tables 1 and 2. The resulting film had a high Young's modulus in the longitudinal direction and superior tension resistance, dimensional stability, moisture-proof property, and converting ability.

Example 6

To 100 parts by weight of a resin composition containing 85 percent by weight of a HMS-PP containing long-chain branches and having a melt strength (MS) of 20 cN, a melt flow rate (MFR) of 3 g/10 min, a meso pentad fraction (mmmm) of 97%, and an isotactic index (II) of 96.5%, and satisfying the formula below between the melt strength (MS) and the melt flow rate (MFR)

$$\log(MS) > -0.61 \log(MFR) + 0.82$$

and 15 percent by weight of hydrogenated β-dipentene having a Tg of 75° C., a bromine number of 3 cg/g, and a hydrogenation rate of 99%, which was a terpene resin substantially containing no polar-group, as an additive that has a compatibility with the polypropylene and can provide plasticity during stretching, 0.15 parts by weight of crosslinked particles of polystyrene-based polymer (crosslinked PS) having an average particle size of 1 μm was added as crosslinked organic particles. Furthermore, 0.8 parts by weight of a 1:1 mixture of glycerin fatty acid ester and alkyldiethanolamine fatty acid ester was added as an antistatic agent. The resulting mixture was fed into a twin-screw extruder, was extruded at 240° C. into a gut-shape, cooled in a 20° C. water bath, and cut into a 3-mm length by a chip cutter. The resulting chips were dried for 2 hours at 100° C., fed into a single-screw extruder, melted at 260° C., and filtered. The resulting filtered material was extruded from a slit die and formed into a sheet by winding on a metal drum having a temperature of 30° C.

This sheet was passed between rolls maintained at 133° C., and pre-heated, and passed between rolls, which had different rotating speed and were maintained at 138° C., so that the sheet is stretched to 8 times the initial length in the longitudinal direction. The stretched sheet was then immediately cooled to room temperature. The stretched film was next fed into a tenter to be pre-heated at 163° C., stretched in the transverse direction to 8 times the initial length at 160°

C., and heat-set at 160° C. while being relaxed in the transverse direction by 8%. The film was then cooled and wound so as to obtain a biaxially stretched polypropylene film having a thickness of 15 μm.

The results are shown in Tables 1 and 2. The resulting film had a high Young's modulus in the longitudinal direction and superior tension resistance, dimensional stability, moisture-proof property, and converting ability.

Example 7

A biaxially stretched polypropylene film having a thickness of 15 μm was prepared as in EXAMPLE 6 except that to 80 percent by weight of a polypropylene prepared by blending a publicly known polypropylene having a melt strength (MS) of 1.5 cN, a melt flow rate (MFR) of 2.3 g/10 min, a meso pentad fraction (mmmm) of 92%, and an isotactic index (II) of 96% with 5 percent by weight of a HMS-PP having a melt strength (MS) of 20 cN, a melt flow rate (MFR) of 3 g/10 min, a meso pentad fraction (mmmm) of 97%, and an isotactic index (II) of 96.5%, containing long-chain branches, and satisfying the above-described formula (1) between the melt strength (MS) and the melt flow rate (MFR), 20 percent by weight of a mixture containing β-pinene having a Tg of 75° C., a bromine number of 4 cg/g, and a hydrogenation rate of 99% and hydrogenated β-dipentene resin having a Tg of 75° C., a bromine number of 3 cg/g, and a hydrogenation rate of 99%, which are terpene resins substantially containing no polar-group, as additives that has a compatibility with the polypropylene and can provide plasticity during stretching. Moreover, the film was stretched to 11 times the initial length in the longitudinal direction, and to 6 times the initial length in the transverse direction.

The results are shown in Tables 1 and 2. The resulting film had a high Young's modulus in the longitudinal direction and superior tension resistance, dimensional stability, moisture-proof property, and converting ability.

Example 8

A biaxially stretched polypropylene film of EXAMPLE 8 having a thickness of 15 μm was prepared as in EXAMPLE 3, except that a HMS-PP that contains long-chain branches and has a melt strength (MS) of 15 cN, a melt flow rate (MFR) of 2.0 g/10 min, a meso pentad fraction (mmmm) of 96.5%, and an isotactic index (II) of 97%, satisfies the above-described formula (1) between the melt strength (MS) and the melt flow rate (MFR), was used as the HMS-PP.

The results are shown in Tables 1 and 2. The resulting film had a high Young's modulus in the longitudinal direction and superior tension resistance, dimensional stability, moisture-proof property, and converting ability.

Example 9

A biaxially stretched polypropylene film of EXAMPLE 9 having a thickness of 15 μm was prepared as in EXAMPLE 3, except that a HMS-PP containing long-chain branches, and having a melt strength (MS) of 30 cN, a melt flow rate (MFR) of 2.1 g/10 min, a meso pentad fraction (mmmm) of 97%, and an isotactic index (II) of 97%, and satisfying the formula below between the melt strength (MS) and the melt flow rate (MFR) was used as the HMS-PP:

$$\log(MS) > -0.61 \log(MFR) + 0.82$$

The results are shown in Tables 1 and 2. The resulting film had a high Young's modulus in the longitudinal direction and superior tension resistance, dimensional stability, moisture-proof property, and converting ability.

Example 10

A biaxially stretched polypropylene film of EXAMPLE 10 having a thickness of 15 μm was prepared as in EXAMPLE 5, except that 20 percent by weight of HMS-PP containing long-chain branches was blended, and that polydicyclopentadiene having Tg of 80° C., a bromine number of 3 cg/g, and a hydrogenation rate of 99%, which is a petroleum resin substantially containing no polar-group, as an additive that has compatibility with the polypropylene and can provide plasticity during stretching, was added.

The results are shown in Tables 1 and 2. The resulting film had a high Young's modulus in the longitudinal direction and superior tension resistance, dimensional stability, moisture-proof property, and converting ability.

Example 11

A biaxially stretched polypropylene film of EXAMPLE 11 having a thickness of 15 μm was prepared as in EXAMPLE 10 except that 30 percent by weight of HMS-PP was blended.

The results are shown in Tables 1 and 2. The resulting film had a high Young's modulus in the longitudinal direction and superior tension resistance, dimensional stability, moisture-proof property, and converting ability.

Example 12

A biaxially stretched polypropylene film of EXAMPLE 12 having a thickness of 15 μm was prepared as in EXAMPLE 10 except that 50 percent by weight of HMS-PP was added.

The results are shown in Tables 1 and 2. The resulting film had a high Young's modulus in the longitudinal direction and superior tension resistance, dimensional stability, moisture-proof property, and converting ability.

Example 13

A biaxially stretched polypropylene film of EXAMPLE 13 having a thickness of 15 μm was prepared as in EXAMPLE 1 except that an HMS-PP containing long-chain branches and having a melt strength (MS) of 1 cN, a melt flow rate (MFR) of 10 g/10 min, a meso pentad fraction (mmmm) of 98%, and an isotactic index (II) of 98.5%, was blended.

The results are shown in Tables 1 and 2. The resulting film had a high Young's modulus in the longitudinal direction and superior tension resistance, dimensional stability, moisture-proof property, and converting ability.

Example 14

A biaxially stretched polypropylene film of EXAMPLE 14 having a thickness of 15 μm was prepared as in EXAMPLE 1 except that a polypropylene prepared by blending a publicly known polypropylene having a melt strength (MS) of 1.1 cN, a melt flow rate (MFR) of 3 g/10 min, a meso pentad fraction (mmmm) of 97.5%, and an isotactic index (II) of 99% with 10 percent by weight of the HMS-PP was used. Moreover, the film was stretched to 9 times the initial length in the longitudinal direction and 9 times the initial length in the transverse direction.

The results are shown in Tables 1 and 2. The resulting film had a high Young's modulus in the longitudinal direction and superior tension resistance, dimensional stability, moisture-proof property, and converting ability.

Example 15

A biaxially stretched polypropylene film of EXAMPLE 15 having a thickness of 15 μm was prepared as in EXAMPLE 3 except that a polypropylene prepared by blending a publicly known polypropylene having a melt strength (MS) of 1.2 cN, a melt flow rate (MFR) of 2.7 g/10 min, a meso pentad fraction (mmmm) of 96%, and an isotactic index (II) of 98% with 5 percent by weight of the HMS-PP was used.

The results are shown in Tables 1 and 2. The resulting film had a high Young's modulus in the longitudinal direction and superior tension resistance, dimensional stability, moisture-proof property, and converting ability.

TABLE 1

| | Characteristics of polypropylene resin Characteristics of HMS-PP resin | | | | | |
|---|---|---|---|---|---|---|
| | MS (cN) | MFR (g/10 min) | log(MS) | −0.61log(MFR) +0.82 | formula (1) satisfied? | Content (wt. %) |
| EXAMPLE 1 | 20.0 | 3.0 | 1.30 | 0.53 | Yes | 10 |
| EXAMPLE 2 | 20.0 | 3.0 | 1.30 | 0.53 | Yes | 10 |
| EXAMPLE 3 | 20.0 | 3.0 | 1.30 | 0.53 | Yes | 5 |
| EXAMPLE 4 | 20.0 | 3.0 | 1.30 | 0.53 | Yes | 3 |
| EXAMPLE 5 | 20.0 | 3.0 | 1.30 | 0.53 | Yes | 10 |
| EXAMPLE 6 | 20.0 | 3.0 | 1.30 | 0.53 | Yes | 100 |
| EXAMPLE 7 | 20.0 | 3.0 | 1.30 | 0.53 | Yes | 5 |
| EXAMPLE 8 | 15.0 | 2.0 | 1.18 | 0.64 | Yes | 5 |
| EXAMPLE 9 | 30.0 | 2.1 | 1.48 | 0.62 | Yes | 5 |
| EXAMPLE 10 | 20.0 | 3.0 | 1.30 | 0.53 | Yes | 20 |
| EXAMPLE 11 | 20.0 | 3.0 | 1.30 | 0.53 | Yes | 30 |
| EXAMPLE 12 | 20.0 | 3.0 | 1.30 | 0.53 | Yes | 50 |
| EXAMPLE 13 | 1.0 | 10.0 | 0.00 | 0.21 | No | 10 |
| EXAMPLE 14 | 20.0 | 3.0 | 1.30 | 0.53 | Yes | 10 |
| EXAMPLE 15 | 20.0 | 3.0 | 1.30 | 0.53 | Yes | 5 |

| | Characteristics of polypropylene resin | | | | | |
|---|---|---|---|---|---|---|
| | MS (cN) | MFR (g/10 min) | log(MS) | −0.61log(MFR) +0.52 | formula (2) satisfied? | Meso Pentad Fraction (%) |
| EXAMPLE 1 | 3.0 | 2.3 | 0.48 | 0.30 | Yes | 92.5 |
| EXAMPLE 2 | 3.0 | 2.3 | 0.48 | 0.30 | Yes | 92.5 |
| EXAMPLE 3 | 2.7 | 2.2 | 0.43 | 0.31 | Yes | 92.3 |
| EXAMPLE 4 | 2.4 | 2.3 | 0.38 | 0.30 | Yes | 92.2 |
| EXAMPLE 5 | 3.0 | 2.3 | 0.48 | 0.30 | Yes | 92.5 |
| EXAMPLE 6 | 20.0 | 3.0 | 1.30 | 0.23 | Yes | 97.0 |
| EXAMPLE 7 | 2.7 | 2.2 | 0.43 | 0.31 | Yes | 92.5 |
| EXAMPLE 8 | 2.6 | 2.2 | 0.41 | 0.31 | Yes | 92.2 |
| EXAMPLE 9 | 3.4 | 2.2 | 0.53 | 0.31 | Yes | 92.3 |
| EXAMPLE 10 | 3.3 | 2.4 | 0.52 | 0.29 | Yes | 93.0 |
| EXAMPLE 11 | 3.6 | 2.4 | 0.56 | 0.29 | Yes | 93.5 |
| EXAMPLE 12 | 3.5 | 2.5 | 0.54 | 0.28 | Yes | 94.5 |
| EXAMPLE 13 | 2.0 | 3.0 | 0.30 | 0.23 | Yes | 92.6 |
| EXAMPLE 14 | 2.7 | 3.0 | 0.43 | 0.23 | Yes | 97.5 |
| EXAMPLE 15 | 2.8 | 2.7 | 0.45 | 0.26 | Yes | 96.1 |

| | Content (wt. %) | Petroleum resin and terpene resin | Content (wt. %) | Stretching ratio (longitudinal × transverse) |
|---|---|---|---|---|
| EXAMPLE 1 | 90 | hydrogenated dicyclopentadiene | 10 | 8 × 7 |
| EXAMPLE 2 | 90 | hydrogenated dicyclopentadiene | 10 | 10 × 6 |
| EXAMPLE 3 | 97 | hydrogenated dicyclopentadiene | 3 | 8 × 8 |
| EXAMPLE 4 | 97 | hydrogenated dicyclopentadiene | 3 | 8 × 8 |
| EXAMPLE 5 | 95 | hydrogenated β-pinene | 5 | 9 × 7 |
| EXAMPLE 6 | 85 | hydrogenated β-dipentene | 15 | 8 × 8 |
| EXAMPLE 7 | 80 | hydrogenated β-pinene and hydrogenated β-dipentene | 20 | 11 × 6 |

TABLE 1-continued

| | | | | |
|---|---|---|---|---|
| EXAMPLE 8 | 97 | hydrogenated dicyclopentadiene | 3 | 8 × 8 |
| EXAMPLE 9 | 97 | hydrogenated dicyclopentadiene | 3 | 8 × 8 |
| EXAMPLE 10 | 95 | hydrogenated dicyclopentadiene | 5 | 9 × 7 |
| EXAMPLE 11 | 95 | hydrogenated dicyclopentadiene | 5 | 9 × 7 |
| EXAMPLE 12 | 95 | hydrogenated dicyclopentadiene | 5 | 9 × 7 |
| EXAMPLE 13 | 90 | hydrogenated dicyclopentadiene | 10 | 8 × 7 |
| EXAMPLE 14 | 90 | hydrogenated dicyclopentadiene | 10 | 9 × 9 |
| EXAMPLE 15 | 97 | hydrogenated dicyclopentadiene | 3 | 8 × 8 |

TABLE 2

| | Young's modulus (longitudinal) at 25° C. (GPa) | Young's modulus (transverse) at 25° C. (GPa) | m value at 25° C. (-) | F2 value (longitudinal) at 25° C. (MPa) | F5 value (longitudinal) at 25° C. (Mpa) |
|---|---|---|---|---|---|
| EXAMPLE 1 | 3.7 | 4.2 | 0.47 | 60 | 82 |
| EXAMPLE 2 | 4.3 | 3.5 | 0.55 | 72 | 103 |
| EXAMPLE 3 | 3.1 | 3.5 | 0.47 | 48 | 64 |
| EXAMPLE 4 | 2.7 | 3.8 | 0.42 | 43 | 55 |
| EXAMPLE 5 | 3.6 | 3.7 | 0.49 | 58 | 87 |
| EXAMPLE 6 | 4.0 | 3.7 | 0.52 | 61 | 92 |
| EXAMPLE 7 | 5.2 | 4.7 | 0.53 | 80 | 115 |
| EXAMPLE 8 | 2.9 | 3.8 | 0.43 | 45 | 58 |
| EXAMPLE 9 | 3.5 | 3.3 | 0.51 | 58 | 74 |
| EXAMPLE 10 | 3.4 | 3.5 | 0.49 | 51 | 63 |
| EXAMPLE 11 | 3.3 | 3.6 | 0.48 | 50 | 63 |
| EXAMPLE 12 | 3.1 | 3.1 | 0.50 | 47 | 60 |
| EXAMPLE 13 | 2.6 | 3.7 | 0.41 | 41 | 53 |
| EXAMPLE 14 | 3.6 | 4.2 | 0.46 | 63 | 79 |
| EXAMPLE 15 | 3.3 | 4.0 | 0.45 | 53 | 65 |

| | Young's modulus (longitudinal) at 80° C. (GPa) | Young's modulus (transverse) at 80° C. (GPa) | m value at 80° C. (-) |
|---|---|---|---|
| EXAMPLE 1 | 0.59 | 0.65 | 0.48 |
| EXAMPLE 2 | 0.65 | 0.58 | 0.53 |
| EXAMPLE 3 | 0.50 | 0.48 | 0.51 |
| EXAMPLE 4 | 0.45 | 0.50 | 0.47 |
| EXAMPLE 5 | 0.58 | 0.55 | 0.51 |
| EXAMPLE 6 | 0.67 | 0.70 | 0.49 |
| EXAMPLE 7 | 0.80 | 0.75 | 0.52 |
| EXAMPLE 8 | 0.47 | 0.58 | 0.45 |
| EXAMPLE 9 | 0.53 | 0.48 | 0.52 |
| EXAMPLE 10 | 0.56 | 0.50 | 0.53 |
| EXAMPLE 11 | 0.57 | 0.52 | 0.52 |
| EXAMPLE 12 | 0.60 | 0.53 | 0.53 |
| EXAMPLE 13 | 0.42 | 0.48 | 0.47 |
| EXAMPLE 14 | 0.78 | 0.65 | 0.55 |
| EXAMPLE 15 | 0.69 | 0.68 | 0.50 |

| | Heat shrinkage (longitudinal) at 120° C. (%) | Heat shrinkage (transverse) at 120° C. (%) | Sum of heat shrinkage at 120° C. (%) | Water vapor permeability (g/m$^2$/d/0.1 mm) | Converting ability |
|---|---|---|---|---|---|
| EXAMPLE 1 | 3.3 | 0.6 | 3.9 | 0.8 | Good |
| EXAMPLE 2 | 4.0 | 1.0 | 5.0 | 0.7 | Good |
| EXAMPLE 3 | 3.0 | 0.5 | 3.5 | 1.2 | Good |
| EXAMPLE 4 | 3.1 | 0.6 | 3.7 | 1.3 | Good |
| EXAMPLE 5 | 3.0 | 0.7 | 3.7 | 1.0 | Good |
| EXAMPLE 6 | 2.9 | 0.7 | 3.6 | 0.8 | Good |
| EXAMPLE 7 | 4.2 | 1.5 | 5.7 | 0.5 | Good |
| EXAMPLE 8 | 2.5 | 0.6 | 3.1 | 1.2 | Good |
| EXAMPLE 9 | 3.1 | 0.5 | 3.6 | 1.1 | Good |

TABLE 2-continued

| EXAMPLE 10 | 3.0 | 0.5 | 3.5 | 1.0 | Good |
| EXAMPLE 11 | 2.9 | 0.5 | 3.4 | 1.0 | Good |
| EXAMPLE 12 | 2.9 | 0.4 | 3.3 | 0.9 | Good |
| EXAMPLE 13 | 3.0 | 1.0 | 4.0 | 0.8 | Good |
| EXAMPLE 14 | 1.6 | 0.3 | 1.9 | 0.5 | Good |
| EXAMPLE 15 | 1.5 | 0.2 | 1.7 | 1.2 | Good |

Comparative Example 1

To 100 parts by weight of a publicly known polypropylene having a melt strength (MS) of 1.5 cN, a melt flow rate (MFR) of 2.3 g/10 min, a meso pentad fraction (mmmm) of 92%, and an isotactic index (II) of 96%, not satisfying the above-described formula (2) between the melt strength (MS) and the melt flow rate (MFR), 0.15 parts by weight of crosslinked particles of a polymethacrylicacid-based polymer (crosslinked PMMA) having an average particle size of 2 μm was added as crosslinked organic particles, and 0.8 parts by weight of a 1:1 mixture of glycerin fatty acid ester and alkyldiethanolamine fatty acid ester was added as an antistatic agent. The mixture was fed into a singlescrew extruder, melted at 260° C., filtered, extruded from a slit die, and formed into a sheet by winding around a 25° C. metal drum.

This sheet was passed between rolls maintained at 130° C., and pre-heated, and passed between rolls, which had different rotating speed and were maintained at 135° C., so that the sheet is stretched to 5 times the initial length in the longitudinal direction. The stretched sheet was then immediately cooled to room temperature. The stretched film was next fed into a tenter to be pre-heated at 165° C., stretched in the transverse direction to 10 times the initial length at 160° C., and heat-set at 160° C. while being relaxed in the transverse direction by 7%. The film was then cooled and wound so as to obtain a biaxially stretched polypropylene film having a thickness of 15 μm.

The results are shown in Tables 3 and 4. The resulting film had a low Young's modulus in the longitudinal direction, poor tension resistance, moisture-proof property, and converting ability.

Comparative Example 2

A biaxially stretched polypropylene film of COMPARATIVE EXAMPLE 2 having a thickness of 15 μm was prepared as in COMPARATIVE EXAMPLE 1 except that the stretching ratio in the longitudinal direction was increased to 7.

The results are shown in Tables 3 and 4. Because a significant degree of film breakage occurred during transverse stretching, the sufficient film couldn't be obtained.

Comparative Example 3

A biaxially stretched polypropylene film of COMPARATIVE EXAMPLE 3 having a thickness of 15 μm was prepared as in COMPARATIVE EXAMPLE 1 except that a publicly known polypropylene having a melt strength (MS) of 1.1 cN, a melt flow rate (MFR) of 3 g/10 min, a meso pentad fraction (mmmm) of 97.5%, and an isotactic index (II) of 99% was used.

The results are shown in Tables 3 and 4. Because the edges of the film rode up when the film in the molten state was wound on a cooling drum, the sheet frequently broke during longitudinal stretching. Moreover, film breakage occurred during transverse stretching, overall film formability was poor, and the film was not suited for industrial production.

Comparative Example 4

A biaxially stretched polypropylene film of COMPARATIVE EXAMPLE 4 having a thickness of 15 μm was prepared as in COMPARATIVE EXAMPLE 1 except that a publicly known polypropylene having a melt strength (MS) of 0.6 cN, a melt flow rate (MFR) of 6 g/10 min, a meso pentad fraction (mmmm) of 99.8%, and an isotactic index (II) of 99.5% was used.

The results are shown in Tables 3 and 4. Because a significant degree of film breakage occurred during transverse stretching, the sufficient film couldn't be obtained.

Comparative Example 5

A biaxially stretched polypropylene film of COMPARATIVE EXAMPLE 5 having a thickness of 15 μm was prepared as in COMPARATIVE EXAMPLE 1 except that 3 percent by weight of polydicyclopentadiene having Tg of 80° C., a bromine number of 3 cg/g, and a hydrogenation rate of 99%, which is a petroleum resin substantially containing no polar-group as an additive that has compatibility with the polypropylene and can provide plasticity during stretching. Moreover, the film was stretched to 5 times the initial length in the longitudinal direction and 9 times the initial length in the transverse direction.

The results are shown in Tables 3 and 4. The resulting film had a low Young's modulus in the longitudinal direction, poor tension resistance and converting ability.

Comparative Example 6

A biaxially stretched polypropylene film of COMPARATIVE EXAMPLE 6 having a thickness of 15 μm was prepared as in COMPARATIVE EXAMPLE 5 except that the film was stretched to 7 times the initial length in the longitudinal direction and 8 times the initial length in the transverse direction.

The results are shown in Tables 3 and 4. Because film breakage occurred during transversal stretching, a film having a sufficient length could not be obtained, and the film was not suited for industrial production.

Comparative Example 7

A biaxially stretched polypropylene film of COMPARATIVE EXAMPLE 7 having a thickness of 15 μm was prepared as in COMPARATIVE EXAMPLE 5 except that the stretching ratio in the longitudinal direction was increased to 8.

The results are shown in Tables 3 and 4. Because a significantly degree of film breakage occurred during transverse stretching, the sufficient film could not be obtained.

Comparative Example 8

A biaxially stretched polypropylene film of COMPARATIVE EXAMPLE 8 having a thickness of 15 μm was prepared as in COMPARATIVE EXAMPLE 5 except that 10 percent by weight of polydicyclopentadiene was added.

The results are shown in Tables 3 and 4. The resulting film had a low Young's modulus in the longitudinal direction at 80° C., poor tension resistance, dimensional stability, and converting ability.

Comparative Example 9

A biaxially stretched polypropylene film of COMPARATIVE EXAMPLE 9 having a thickness of 15 μm was prepared as in COMPARATIVE EXAMPLE 8 except that the film was stretched to 8 times the initial length in the longitudinal direction and 7 times the initial length in the transverse direction.

The results are shown in Tables 3 and 4. Because film breakage occurred during transverse stretching, a film having a sufficient length could not be obtained, and the film was not suited for industrial production.

Comparative Example 10

A biaxially stretched polypropylene film of COMPARATIVE EXAMPLE 10 having a thickness of 15 μm was prepared as in COMPARATIVE EXAMPLE 8 except that the stretching ratio in the longitudinal direction was increased to 9.

The results are shown in Tables 3 and 4. Because a significant degree of film breakage occurred during transverse stretching, sufficient film could not be obtained.

Comparative Example 11

A biaxially stretched polypropylene film of COMPARATIVE EXAMPLE 11 having a thickness of 15 μm was prepared as in EXAMPLE 6 except that only the HMS-PP containing long-chain branches, satisfying the above-described formula (1) between the melt strength (MS) and the melt flow rate (MFR), was used. Moreover, the film was stretched to 5 times the initial length in the longitudinal direction and 11 times the initial length in the transverse direction.

The results are shown in Tables 3 and 4. The resulting film had a low Young's modulus in the longitudinal direction, and poor tension resistance and converting ability.

Comparative Example 12

A biaxially stretched polypropylene film of COMPARATIVE EXAMPLE 12 having a thickness of 15 μm was prepared as in EXAMPLE 5 except that unhydrogenated gum rosin having Tg of 39° C. and a bromine number of 15 cg/g and containing polar carboxyl groups that have poor compatibility with the polypropylene was used instead of the petroleum resin substantially containing no polar-group. Moreover, the film was stretched to 5 times the initial length in the longitudinal direction and 11 times the initial length in the transverse direction.

The results are shown in Tables 3 and 4. The resulting film had a low Young's modulus in the longitudinal direction, and poor tension resistance and converting ability.

Comparative Example 13

A uniaxially stretched polypropylene film of COMPARATIVE EXAMPLE 13 having a thickness of 15 μm was prepared as in COMPARATIVE EXAMPLE 1 except that the film was stretched to 8 times the initial length in the longitudinal direction and was directly wounded right after cooling.

The results are shown in Tables 3 and 4. The film readily split along lines parallel to the longitudinal direction, had poor handling convenience, and poor converting ability.

TABLE 3

| | Characteristics of polypropylene resin Characteristics of HMS-PP resin | | | | | |
|---|---|---|---|---|---|---|
| | MS (cN) | MFR (g/10 min) | log(MS) | −0.61log(MFR) +0.82 | formula (1) satisfied? | Content (wt. %) |
| COMPARATIVE EXAMPLE 1 | — | — | — | — | — | — |
| COMPARATIVE EXAMPLE 2 | — | — | — | — | — | — |
| COMPARATIVE EXAMPLE 3 | — | — | — | — | — | — |
| COMPARATIVE EXAMPLE 4 | — | — | — | — | — | — |
| COMPARATIVE EXAMPLE 5 | — | — | — | — | — | — |
| COMPARATIVE EXAMPLE 6 | — | — | — | — | — | — |
| COMPARATIVE EXAMPLE 7 | — | — | — | — | — | — |
| COMPARATIVE EXAMPLE 8 | — | — | — | — | — | — |
| COMPARATIVE EXAMPLE 9 | — | — | — | — | — | — |
| COMPARATIVE EXAMPLE 10 | — | — | — | — | — | — |
| COMPARATIVE EXAMPLE 11 | 20.0 | 3.0 | 1.30 | 0.53 | Yes | 100 |
| COMPARATIVE EXAMPLE 12 | 20.0 | 3.0 | 1.30 | 0.53 | Yes | 10 |

TABLE 3-continued

| | MS (cN) | MFR (g/10 min) | log(MS) | −0.61log(MFR) +0.52 | formula (2) satisfied? | Meso pentad fraction (%) |
|---|---|---|---|---|---|---|
| COMPARATIVE EXAMPLE 13 | — | — | — | — | — | — |

Characteristics of polypropylene resin

| | MS (cN) | MFR (g/10 min) | log(MS) | −0.61log(MFR) +0.52 | formula (2) satisfied? | Meso pentad fraction (%) |
|---|---|---|---|---|---|---|
| COMPARATIVE EXAMPLE 1 | 1.5 | 2.3 | 0.18 | 0.30 | No | 92.0 |
| COMPARATIVE EXAMPLE 2 | 1.5 | 2.3 | 0.18 | 0.30 | No | 92.0 |
| COMPARATIVE EXAMPLE 3 | 1.1 | 3.0 | 0.04 | 0.23 | No | 97.5 |
| COMPARATIVE EXAMPLE 4 | 0.6 | 6.0 | −0.22 | 0.05 | No | 99.8 |
| COMPARATIVE EXAMPLE 5 | 1.5 | 2.3 | 0.18 | 0.30 | No | 92.0 |
| COMPARATIVE EXAMPLE 6 | 1.5 | 2.3 | 0.18 | 0.30 | No | 92.0 |
| COMPARATIVE EXAMPLE 7 | 1.5 | 2.3 | 0.18 | 0.30 | No | 92.0 |
| COMPARATIVE EXAMPLE 8 | 1.5 | 2.3 | 0.18 | 0.30 | No | 92.0 |
| COMPARATIVE EXAMPLE 9 | 1.5 | 2.3 | 0.18 | 0.30 | No | 92.0 |
| COMPARATIVE EXAMPLE 10 | 1.5 | 2.3 | 0.18 | 0.30 | No | 92.0 |
| COMPARATIVE EXAMPLE 11 | 20.0 | 3.0 | 1.30 | 0.23 | Yes | 97.0 |
| COMPARATIVE EXAMPLE 12 | 3.0 | 2.3 | 0.48 | 0.30 | Yes | 92.5 |
| COMPARATIVE EXAMPLE 13 | 1.5 | 2.3 | 0.18 | 0.30 | No | 92.0 |

| | Content (wt. %) | Petroleum resin and terpene resin | Content (wt. %) | Stretching ratio (longitudinal × transverse) |
|---|---|---|---|---|
| COMPARATIVE EXAMPLE 1 | 100 | — | — | 5 × 10 |
| COMPARATIVE EXAMPLE 2 | 100 | — | — | 7 × — |
| COMPARATIVE EXAMPLE 3 | 100 | — | — | (5 × 13) |
| COMPARATIVE EXAMPLE 4 | 100 | — | — | 5 × — |
| COMPARATIVE EXAMPLE 5 | 97 | hydrogenated dicyclopentadiene | 3 | 5 × 9 |
| COMPARATIVE EXAMPLE 6 | 97 | hydrogenated dicyclopentadiene | 3 | (7 × 8) |
| COMPARATIVE EXAMPLE 7 | 97 | hydrogenated dicyclopentadiene | 3 | 8 × — |
| COMPARATIVE EXAMPLE 8 | 90 | hydrogenated dicyclopentadiene | 10 | 5 × 9 |
| COMPARATIVE EXAMPLE 9 | 90 | hydrogenated dicyclopentadiene | 10 | (8 × 7) |
| COMPARATIVE EXAMPLE 10 | 90 | hydrogenated dicyclopentadiene | 10 | 9 × — |
| COMPARATIVE EXAMPLE 11 | 100 | — | — | 5 × 12 |
| COMPARATIVE EXAMPLE 12 | 95 | unhydrogenated gum rosin | 5 | 5 × 11 |
| COMPARATIVE EXAMPLE 13 | 100 | — | — | 8 × — |

TABLE 4

| | Young's modulus (longitudinal) at 25° C. (GPa) | Young's modulus (transverse) at 25° C. (GPa) | m value at 25° C. (—) | F2 value (longitudinal) at 25° C. (MPa) | F5 value (longitudinal) at 25° C. (MPa) |
|---|---|---|---|---|---|
| COMPARATIVE EXAMPLE 1 | 1.8 | 3.7 | 0.33 | 33 | 40 |
| COMPARATIVE EXAMPLE 2 | — | — | — | — | — |
| COMPARATIVE EXAMPLE 3 | — | — | — | — | — |
| COMPARATIVE EXAMPLE 4 | — | — | — | — | — |
| COMPARATIVE EXAMPLE 5 | 2.1 | 4.0 | 0.34 | 38 | 47 |
| COMPARATIVE EXAMPLE 6 | — | — | — | — | — |
| COMPARATIVE EXAMPLE 7 | — | — | — | — | — |
| COMPARATIVE EXAMPLE 8 | 2.6 | 4.5 | 0.37 | 42 | 51 |
| COMPARATIVE EXAMPLE 9 | — | — | — | — | — |
| COMPARATIVE EXAMPLE 10 | — | — | — | — | — |
| COMPARATIVE EXAMPLE 11 | 1.7 | 2.1 | 0.45 | 41 | 50 |
| COMPARATIVE EXAMPLE 12 | 1.9 | 4.2 | 0.31 | 37 | 44 |
| COMPARATIVE EXAMPLE 13 | 2.7 | 1.1 | 0.71 | 43 | 97 |

| | Young's modulus (longitudinal) at 80° C. (GPa) | Young's modulus (transverse) at 80° C. (GPa) | m value at 80° C. (—) |
|---|---|---|---|
| COMPARATIVE EXAMPLE 1 | 0.30 | 0.60 | 0.33 |
| COMPARATIVE EXAMPLE 2 | — | — | — |
| COMPARATIVE EXAMPLE 3 | — | — | — |
| COMPARATIVE EXAMPLE 4 | — | — | — |
| COMPARATIVE EXAMPLE 5 | 0.25 | 0.55 | 0.31 |
| COMPARATIVE EXAMPLE 6 | — | — | — |
| COMPARATIVE EXAMPLE 7 | — | — | — |
| COMPARATIVE EXAMPLE 8 | 0.30 | 0.45 | 0.40 |
| COMPARATIVE EXAMPLE 9 | — | — | — |
| COMPARATIVE EXAMPLE 10 | — | — | — |
| COMPARATIVE EXAMPLE 11 | 0.21 | 0.25 | 0.46 |
| COMPARATIVE EXAMPLE 12 | 0.25 | 0.55 | 0.31 |
| COMPARATIVE EXAMPLE 13 | 0.40 | 0.15 | 0.73 |

| | Heat shrinkage (longitudinal) at 120° C. (%) | Heat shrinkage (transverse) at 120° C. (%) | Sum of heat shrinkage at 120° C. | Water Vapor permeability (g/m$^2$/d/ 0.1 mm) | Converting ability |
|---|---|---|---|---|---|
| COMPARATIVE EXAMPLE 1 | 4.0 | 2.0 | 6.0 | 1.6 | Poor |
| COMPARATIVE EXAMPLE 2 | — | — | — | — | — |
| COMPARATIVE EXAMPLE 3 | — | — | — | — | — |
| COMPARATIVE EXAMPLE 4 | — | — | — | — | — |

TABLE 4-continued

| | | | | | |
|---|---|---|---|---|---|
| COMPARATIVE EXAMPLE 5 | 3.8 | 1.2 | 5.0 | 1.3 | Poor |
| COMPARATIVE EXAMPLE 6 | — | — | — | — | — |
| COMPARATIVE EXAMPLE 7 | — | — | — | — | — |
| COMPARATIVE EXAMPLE 8 | 4.0 | 1.5 | 5.5 | 0.9 | Poor |
| COMPARATIVE EXAMPLE 9 | — | — | — | — | — |
| COMPARATIVE EXAMPLE 10 | — | — | — | — | — |
| COMPARATIVE EXAMPLE 11 | 1.5 | 0.5 | 2.0 | 2.2 | Poor |
| COMPARATIVE EXAMPLE 12 | 3.1 | 1.7 | 4.8 | 2.0 | Poor |
| COMPARATIVE EXAMPLE 13 | 4.0 | −0.5 | 3.5 | 1.8 | Poor |

Tables 1 to 4 demonstrate that, since the biaxially stretched polypropylene film comprises a polypropylene which comprises a polypropylene having a melt strength (MS) and a melt flow rate (MFR) measured at 230° C. that satisfy formula (1), or a polypropylene which consists of a polypropylene satisfying the formula (2) between the melt strength (MS) and the melt flow rate (MFR), and at least one additive that has compatibility with the polypropylene and can provide plasticity during stretching, a film having a high tension resistance and superior dimensional stability and moisture-proof property can be prepared. Moreover, such a superior quality film can be stably manufactured without process failures such as film breakages by using a conventional longitudinal-transverse sequential biaxial stretching machine.

Example 16

To 90 percent by weight of a polypropylene prepared by blending a publicly known polypropylene having a Trouton ratio of 12, a meso pentad fraction (mmmm) of 92%, an isotactic index (II) of 96%, a melt strength (MS) of 1.5 cN, and a melt flow rate (MFR) of 2.3 g/10 min with 5 percent by weight of a high-melt-strength polypropylene (HMS-PP) having a Trouton ratio of 50, a meso pentad fraction (mmmm) of 92%, an isotactic index (II) of 96.5%, a melt strength of 20 cN, and a melt flow rate of 3 g/10 min and containing long-chain branches, 10 percent by weight of polydicyclopentadiene having Tg of 80° C., a bromine number of 3 cg/g, and a hydrogenation rate of 99%, which is a petroleum resin substantially containing no polar-group, was added as an additive that has compatibility with the polypropylene and can provide plasticity during stretching to prepare a resin. To 100 parts by weight of this resin, 0.15 part by weight of crosslinked particles of a polymethacrylicacid-based polymer (crosslinked PMMA) having an average particle size of 2 μm was added as crosslinked organic particles, and 0.8 parts by weight of a 1:1 mixture of glycerin fatty acid ester and alkyldiethanolamine fatty acid ester was added as an antistatic agent. The resulting mixture was fed into a twin-screw extruder, was extruded at 240° C. into a gut-shape, cooled in a 20° C. water bath, and cut into a 3-mm length by a chip cutter. The resulting chips were dried for 2 hours at 100° C., fed into a single-screw extruder, melted at 260° C., and filtered. The resulting filtered material was extruded from a slit die and formed into a sheet by winding on a metal drum having a temperature of 25° C.

This sheet was passed between rolls maintained at 135° C., and pre-heated, and passed between rolls, which had different rotating speed and were maintained at 140° C., so that the sheet is stretched to 9 times the initial length in the longitudinal direction. The stretched sheet was then immediately cooled to room temperature. The stretched film was next fed into a tenter to be pre-heated at 165° C., stretched in the transverse direction to 7 times the initial length at 160° C., and heat-set at 160° C. while being relaxed in the transverse direction by 8%. The film was then cooled and wound so as to obtain a biaxially stretched polypropylene film having a thickness of 15 μm.

The composition of the raw material and the results of the evaluation of the film characteristics are shown in Tables 5 and 6. The resulting film had a high Young's modulus in the longitudinal direction and superior tension resistance, dimensional stability, moisture-proof property, and converting ability.

Example 17

A biaxially stretched polypropylene film of EXAMPLE 17 having a thickness of 15 μm was prepared as in EXAMPLE 16 except that the stretching ratio in the longitudinal direction was increased to 11.

The results are shown in Tables 5 and 6. The resulting film had a high Young's modulus in the longitudinal direction and superior tension resistance, dimensional stability, moisture-proof property, and converting ability.

Example 18

A biaxially stretched polypropylene film of EXAMPLE 18 having a thickness of 15 μm was prepared as in EXAMPLE 1 except that 3 percent by weight of β-pinene having a Tg of 75° C., a bromine number of 4 cg/g, and a hydrogenation rate of 99%, which is a terpene resin substantially containing no polar-group, was added as an additive that has compatibility with the polypropylene and can provide plasticity during stretching, and that the film is stretched to 8 times the initial length in the longitudinal direction and to 8 times the initial length in the transverse direction.

The results are shown in Tables 5 and 6. The resulting film had a high Young's modulus in the longitudinal direction and superior tension resistance, dimensional stability, moisture-proof property, and converting ability.

Example 19

A biaxially stretched polypropylene film of EXAMPLE 19 having a thickness of 15 μm was prepared as in EXAMPLE 18 except that 8 percent by weight of the additive terpene resin was added.

The results are shown in Tables 5 and 6. The resulting film had a high Young's modulus in the longitudinal direction and superior tension resistance, dimensional stability, moisture-proof property, and converting ability.

Example 20

A biaxially stretched polypropylene film of EXAMPLE 20 having a thickness of 15 μm was prepared as in EXAMPLE 16 except that 10 percent by weight of the HMS-PP containing long-chain branches was blended, and that 5 percent by weight of polydicyclopentadiene was added. Moreover, the film was stretched to 9 times the initial length in the longitudinal direction and to 7 times the initial length in the transverse direction.

The results are shown in Tables 5 and 6. The resulting film had a high Young's modulus in the longitudinal direction and superior tension resistance, dimensional stability, moisture-proof property, and converting ability.

Example 21

To 85 percent by weight of a HMS-PP having a Trouton ratio of 50, a meso pentad fraction (mmmm) of 97%, an isotactic index (II) of 96.5%, a melt strength (MS) of 20 cN, and a melt flow rate (MFR) of 3 g/10 min and containing long-chain branches, 15 percent by weight of a mixture containing β-pinene having a Tg of 75° C., a bromine number of 4 cg/g, and a hydrogenation rate of 99%, and hydrogenated β-dipentene having a Tg of 75° C., a bromine number of 3 cg/g, and a hydrogenation rate of 99%, which is a terpene resins substantially containing no polar-groups was added as an additive that has compatibility with the polypropylene and can provide plasticity during stretching to prepare a resin. To 100 parts by weight of this resin, 0.15 parts by weight of crosslinked particles of a polystyrene-based polymer (crosslinked PS) having an average particle size of 1 μm was added as crosslinked organic particles, and 0.8 parts by weight of a 1:1 mixture of glycerin fatty acid ester and alkyldiethanolamine fatty acid ester was added as an antistatic agent. The resulting mixture was fed into a twin-screw extruder, was extruded at 240° C. into a gut-shape, cooled in a 20° C. water bath, and cut into a 3-mm length by a chip cutter. The resulting chips were dried for 2 hours at 100° C., fed into a single-screw extruder, melted at 260° C., and filtered. The resulting filtered material was extruded from a slit die and formed into a sheet by winding on a metal drum having a temperature of 30° C.

This sheet was passed between rolls maintained at 132° C., and pre-heated, and passed between rolls, which had different rotating speed and were maintained at 137° C. so that the sheet is stretched to 8 times the initial length in the longitudinal direction. The stretched sheet was then immediately cooled to room temperature. The stretched film was next fed into a tenter to be pre-heated at 165° C., stretched in the transverse direction to 8 times the initial length at 160° C., and heat-set at 160° C. while being relaxed in the transverse direction by 8%. The film was then cooled and wound so as to obtain a biaxially stretched polypropylene film having a thickness of 15 μm.

The results are shown in Tables 5 and 6. The resulting film had a high Young's modulus in the longitudinal direction and superior tension resistance, dimensional stability, moisture-proof property, and converting ability.

Example 22

A biaxially stretched polypropylene film of EXAMPLE 22 having a thickness of 15 μm was prepared as in EXAMPLE 21 except that, to 80 percent by weight of a polypropylene prepared by blending a publicly known polypropylene having a Trouton ratio of 12, a meso pentad fraction (mmmm) of 92%, an isotactic index (II) of 96%, a melt strength (MS) of 1.5 cN, and a melt flow rate (MFR) of 2.3 g/10 min with 5 percent by weight of a HMS-PP having a Trouton ratio of 50, a meso pentad fraction (mmmm) of 97%, an isotactic index (II) of 96.5%, a melt strength of (MS) 20 cN, and a melt flow rate (MFR) of 3 g/10 min and containing long-chain branches, 20 percent by weight of polydicyclopentadiene having Tg of 80° C., a bromine number of 3 cg/g, and a hydrogenation rate of 99%, which is a petroleum resin substantially containing no polar-group, was added as an additive that has compatibility with the polypropylene and can provide plasticity during stretching. Moreover, the film was stretched to 11 times the initial length in the longitudinal direction and 6 times the initial length in the transverse direction.

The results are shown in Tables 5 and 6. The resulting film had a high Young's modulus in the longitudinal direction and superior tension resistance, dimensional stability, moisture-proof property, and converting ability.

Example 23

A biaxially stretched polypropylene film of EXAMPLE 23 having a thickness of 15 μm was prepared as in EXAMPLE 18, except that a polypropylene prepared by blending 15 percent by weight of a HMS-PP having a Trouton ratio of 40, a meso pentad fraction (mmmm) of 95%, an isotactic index (II) of 96%, a melt strength (MS) of 15 cN, and a melt flow rate (MFR) of 2.0 g/10 min and containing long-chain branches was used.

The results are shown in Tables 5 and 6. The resulting film had a high Young's modulus in the longitudinal direction and superior tension resistance, dimensional stability, moisture-proof property, and converting ability.

Example 24

A biaxially stretched polypropylene film of EXAMPLE 24 having a thickness of 15 μm was prepared as in EXAMPLE 23 except that 10 percent by weight of the HMS-PP was blended.

The results are shown in Tables 5 and 6. The resulting film had a high Young's modulus in the longitudinal direction and superior tension resistance, dimensional stability, moisture-proof property, and converting ability.

Example 25

A biaxially stretched polypropylene film of EXAMPLE 25 having a thickness of 15 μm was prepared as in EXAMPLE 18, except that 5 percent by weight of a HMS-PP having a Trouton ratio of 60, a meso pentad fraction (mmmm) of 94%, an isotactic index (II) of 95.5%, a melt strength (MS) of 30 cN, and a melt flow rate (MFR) of 2.1 g/10 min and containing long-chain branches was blended.

The results are shown in Tables 5 and 6. The resulting film had a high Young's modulus in the longitudinal direction and superior tension resistance, dimensional stability, moisture-proof property, and converting ability.

Example 26

A biaxially stretched polypropylene film of EXAMPLE 26 having a thickness of 15 μm was prepared as in EXAMPLE 16, except that 30 percent by weight of the HMS-PP containing long-chain branches was blended. Moreover, the film was stretched to 10 times the initial length in the longitudinal direction and to 7 times the initial length in the transverse direction.

The results are shown in Tables 5 and 6. The resulting film had a high Young's modulus in the longitudinal direction and superior tension resistance, dimensional stability, moisture-proof property, and converting ability.

Example 27

A biaxially stretched polypropylene film of EXAMPLE 28 having a thickness of 15 μm was prepared as in EXAMPLE 16, except that a polypropylene prepared by blending a publicly known polypropylene having a Trouton ratio of 10, a meso pentad fraction (mmmm) of 98%, an isotactic index (II) of 99%, a melt strength (MS) of 1 cN, and a melt flow rate (MFR) of 3.1 g/10 min with 5 percent by weight of the HMS-PP was used. Moreover, the film was stretched to 10 times in the longitudinal direction and to 8 times the initial length in the transverse direction.

The results are shown in Tables 5 and 6. The resulting film had a high Young's modulus in the longitudinal direction and superior tension resistance, dimensional stability, moisture-proof property, and converting ability.

Example 28

A biaxially stretched polypropylene film of EXAMPLE 28 having a thickness of 15 μm was prepared as in EXAMPLE 20, except that a polypropylene prepared by blending a publicly known polypropylene having a Trouton ratio of 11, a meso pentad fraction (mmmm) of 95.5%, an isotactic index (II) of 96%, a melt strength (MS) of 1.3 cN, and a melt flow rate (MFR) of 2.5 g/10 min with 10 percent by weight of the HMS-PP was blended. Moreover, the film was stretched to 9 times the initial length in the longitudinal direction and to 8 times the initial length in the transverse direction.

The results are shown in Tables 5 and 6. The resulting film had a high Young's modulus in the longitudinal direction and superior tension resistance, dimensional stability, moisture-proof property, and converting ability.

Example 29

A biaxially stretched polypropylene film of COMPARABLE EXAMPLE 29 having a thickness of 15 μm was prepared as in EXAMPLE 19 except that stretching in the longitudinal direction was performed in two steps, i.e., the film was preheated at 135° C., stretched to 1.5 times the initial length at 137° C. in the first step, and stretched to 5.3 times the initial length at 142° C. in the second step.

The results are shown in Tables 5 and 6. The resulting film had a high Young's modulus in the longitudinal direction and superior tension resistance, dimensional stability, moisture-proof property, and converting ability.

TABLE 5

| | Characteristics of polypropylene resin | | | |
|---|---|---|---|---|
| | Characteristics of HMS-PP resin | | | |
| | Trouton ratio | Content (wt. %) | Trouton ratio of PP as a whole | Meso pentad fraction of PP as a whole (%) |
| EXAMPLE 16 | 50 | 5 | 22 | 92.3 |
| EXAMPLE 17 | 50 | 5 | 22 | 92.3 |
| EXAMPLE 18 | 50 | 5 | 22 | 92.3 |
| EXAMPLE 19 | 50 | 5 | 22 | 92.3 |
| EXAMPLE 20 | 50 | 10 | 26 | 92.5 |
| EXAMPLE 21 | 50 | 100 | 50 | 97.0 |
| EXAMPLE 22 | 50 | 5 | 22 | 92.3 |
| EXAMPLE 23 | 40 | 15 | 18 | 92.5 |
| EXAMPLE 24 | 40 | 10 | 13 | 92.3 |
| EXAMPLE 25 | 60 | 5 | 30 | 92.1 |
| EXAMPLE 26 | 50 | 30 | 36 | 93.5 |
| EXAMPLE 27 | 50 | 5 | 19 | 98.0 |
| EXAMPLE 28 | 50 | 10 | 25 | 95.6 |
| EXAMPLE 29 | 50 | 5 | 22 | 92.3 |

| | Content (wt. %) | Petroleum resin and terpene resin | Content (wt. %) | Stretching ratio (longitudinal × transverse) |
|---|---|---|---|---|
| EXAMPLE 16 | 90 | hydrogenated dicyclopentadiene | 10 | 9 × 7 |
| EXAMPLE 17 | 90 | hydrogenated dicyclopentadiene | 10 | 11 × 6 |
| EXAMPLE 18 | 97 | hydrogenated β-pinene | 3 | 8 × 8 |
| EXAMPLE 19 | 92 | hydrogenated β-pinene | 8 | 8 × 8 |
| EXAMPLE 20 | 95 | hydrogenated dicyclopentadiene | 5 | 9 × 7 |

TABLE 5-continued

| | | | | |
|---|---|---|---|---|
| EXAMPLE 21 | 85 | hydrogenated β-pinene and hydrogenated β-dipentene | 15 | 8 × 8 |
| EXAMPLE 22 | 80 | hydrogenated dicyclopentadiene | 20 | 11 × 6 |
| EXAMPLE 23 | 97 | hydrogenated β-pinene | 3 | 8 × 8 |
| EXAMPLE 24 | 97 | hydrogenated β-pinene | 3 | 8 × 8 |
| EXAMPLE 25 | 97 | hydrogenated β-pinene | 3 | 8 × 8 |
| EXAMPLE 26 | 90 | hydrogenated dicyclopentadiene | 10 | 10 × 7 |
| EXAMPLE 27 | 90 | hydrogenated dicyclopentadiene | 10 | 10 × 8 |
| EXAMPLE 28 | | hydrogenated dicyclopentadiene | 5 | 9 × 8 |
| EXAMPLE 29 | 92 | hydrogenated β-pinene | 8 | (1.5 * 5.3) × 9 |

TABLE 6

| | Young's modulus (longitudinal) at 25° C. (GPa) | Young's modulus (transverse) at 25° C. (GPa) | m value at 25° C. (-) | F2 value (longitudinal) at 25° C. (MPa) | F5 value (longitudinal) at 25° C. (MPa) |
|---|---|---|---|---|---|
| EXAMPLE 16 | 3.9 | 3.8 | 0.51 | 67 | 95 |
| EXAMPLE 17 | 4.4 | 3.4 | 0.56 | 75 | 110 |
| EXAMPLE 18 | 3.1 | 4.0 | 0.44 | 48 | 62 |
| EXAMPLE 19 | 3.8 | 3.9 | 0.49 | 63 | 81 |
| EXAMPLE 20 | 3.3 | 3.4 | 0.49 | 53 | 78 |
| EXAMPLE 21 | 3.8 | 3.9 | 0.49 | 69 | 92 |
| EXAMPLE 22 | 5.0 | 3.2 | 0.61 | 76 | 115 |
| EXAMPLE 23 | 2.9 | 4.0 | 0.42 | 46 | 58 |
| EXAMPLE 24 | 2.7 | 4.3 | 0.39 | 42 | 54 |
| EXAMPLE 25 | 3.4 | 3.6 | 0.49 | 51 | 73 |
| EXAMPLE 26 | 4.2 | 3.1 | 0.58 | 69 | 101 |
| EXAMPLE 27 | 4.0 | 4.2 | 0.49 | 70 | 90 |
| EXAMPLE 28 | 3.5 | 4.3 | 0.45 | 58 | 68 |
| EXAMPLE 29 | 4.2 | 4.4 | 0.49 | 65 | 94 |

| | Young's modulus (longitudinal) at 80° C. (GPa) | Young's modulus (transverse) at 80° C. (GPa) | m value at 80° C. (-) |
|---|---|---|---|
| EXAMPLE 16 | 0.62 | 0.62 | 0.50 |
| EXAMPLE 17 | 0.67 | 0.60 | 0.53 |
| EXAMPLE 18 | 0.50 | 0.55 | 0.48 |
| EXAMPLE 19 | 0.63 | 0.63 | 0.50 |
| EXAMPLE 20 | 0.53 | 0.53 | 0.50 |
| EXAMPLE 21 | 0.59 | 0.59 | 0.50 |
| EXAMPLE 22 | 0.78 | 0.65 | 0.55 |
| EXAMPLE 23 | 0.48 | 0.60 | 0.44 |
| EXAMPLE 24 | 0.43 | 0.58 | 0.43 |
| EXAMPLE 25 | 0.55 | 0.55 | 0.50 |
| EXAMPLE 26 | 0.67 | 0.63 | 0.52 |
| EXAMPLE 27 | 0.75 | 0.75 | 0.50 |
| EXAMPLE 28 | 0.68 | 0.76 | 0.47 |
| EXAMPLE 29 | 0.62 | 0.65 | 0.49 |

| | Heat shrinkage (longitudinal) at 120° C. (%) | Heat shrinkage (transverse) at 120° C. (%) | Sum of heat shrinkage at 120° C. | Water vapor permeability (g/m$^2$/d/0.1 mm) | Converting ability |
|---|---|---|---|---|---|
| EXAMPLE 16 | 3.7 | 1.1 | 4.8 | 0.7 | Good |
| EXAMPLE 17 | 4.3 | 1.1 | 5.4 | 0.6 | Good |
| EXAMPLE 18 | 2.8 | 1.0 | 3.8 | 1.2 | Good |
| EXAMPLE 19 | 3.0 | 1.1 | 4.1 | 0.9 | Good |
| EXAMPLE 20 | 3.2 | 1.0 | 4.2 | 1.1 | Good |
| EXAMPLE 21 | 3.2 | 1.6 | 4.8 | 0.7 | Good |
| EXAMPLE 22 | 4.0 | 1.3 | 5.3 | 0.5 | Good |
| EXAMPLE 23 | 2.8 | 1.0 | 3.8 | 1.2 | Good |
| EXAMPLE 24 | 3.0 | 1.1 | 4.1 | 1.2 | Good |
| EXAMPLE 25 | 2.7 | 0.8 | 3.5 | 1.2 | Good |
| EXAMPLE 26 | 3.3 | 1.2 | 4.5 | 0.7 | Good |

TABLE 6-continued

| EXAMPLE 27 | 1.9 | 0.6 | 2.5 | 0.5 | Good |
| EXAMPLE 28 | 1.5 | 0.0 | 1.5 | 0.7 | Good |
| EXAMPLE 29 | 4.0 | 1.5 | 5.5 | 0.9 | Good |

Comparative Examples 1 to 4, and 11 to 13

The films of COMPARATIVE EXAMPLE 1 to 4, and 11 to 13 are shown in Tables 7 and 8.

Comparative Example 14

A biaxially stretched polypropylene film of COMPARATIVE EXAMPLE 14 having a thickness of 15 μm was prepared as in COMPARATIVE EXAMPLE 1 except that 3 percent by weight of β-pinene having a Tg of 75° C., a bromine number of 4 cg/g, and a hydrogenation rate of 99%, which is a terpene resin substantially containing no polar-group, as an additive that has compatibility with the polypropylene and can provide plasticity during stretching, was added to 97 percent by weight of polypropylene, and that the film was stretched to 5 times the initial length in the longitudinal direction and to 9 times the initial length in the transverse direction.

The results are shown in Tables 7 and 8. The resulting film had low Young's modulus in the longitudinal direction, insufficient tension resistance, and poor converting ability.

Comparative Example 15

A biaxially stretched polypropylene film of COMPARATIVE EXAMPLE 15 having a thickness of 15 μm was prepared as in COMPARATIVE EXAMPLE 14 except that the film was stretched to 7 times the initial length in the longitudinal direction and to 8 times the initial length in the transverse direction.

The results are shown in Tables 7 and 8. Because film breakage occurred during transverse stretching, a film having a sufficient length could not be obtained. The resulting film was not suited for industrial production.

Comparative Example 16

A biaxially stretched polypropylene film of COMPARATIVE EXAMPLE 16 having a thickness of 15 μm was prepared as in COMPARATIVE EXAMPLE 14 except that the stretching ratio in the longitudinal direction was increased to 8.

The results are shown in Tables 7 and 8. Because significant degree of film breakage occurred during transverse stretching, a sufficient film could not be obtained.

Comparative Example 17

A biaxially stretched polypropylene film of COMPARATIVE EXAMPLE 17 having a thickness of 15 μm was prepared as in COMPARATIVE EXAMPLE 14 except that 10 percent by weight of β-pinene was added.

The results are shown in Tables 7 and 8. The film had a low Young's modulus in the longitudinal direction at 80° C., insufficient tension resistance, and poor dimensional stability and converting ability.

Comparative Example 18

A biaxially stretched polypropylene film of COMPARATIVE EXAMPLE 18 having a thickness of 15 μm was prepared as in COMPARATIVE EXAMPLE 17 except that the film was stretched to 8 times the initial length in the longitudinal direction and to 7 times the initial length in the transverse direction.

The results are shown in Tables 7 and 8. Because film breakage occurred during transverse stretching, a film having a sufficient length could not be obtained. The resulting film was not suited for industrial production.

Comparative Example 19

A biaxially stretched polypropylene film of COMPARATIVE EXAMPLE 19 having a thickness of 15 μm was prepared as in COMPARATIVE EXAMPLE 17 except that the stretching ratio in the longitudinal direction was increased to 9.

The results are shown in Tables 7 and 8. Because significant degree of film breakage occurred during transverse stretching, a sufficient film could not be obtained.

TABLE 7

| | Characteristics of polypropylene resin | | | |
| --- | --- | --- | --- | --- |
| | Characteristics of HMS-PP resin | | | Meso pentad fraction of |
| | Trouton ratio | Content (wt. %) | Trouton ratio of PP as a whole | PP as a whole (%) |
| COMPARATIVE EXAMPLE 1 | — | — | 12 | 92.0 |
| COMPARATIVE EXAMPLE 2 | — | — | 12 | 92.0 |
| COMPARATIVE EXAMPLE 3 | — | — | 10 | 97.5 |
| COMPARATIVE EXAMPLE 4 | — | — | 8 | 99.8 |
| COMPARATIVE EXAMPLE 11 | 50 | 100 | 50 | 97.0 |

TABLE 7-continued

| | | | | |
|---|---|---|---|---|
| COMPARATIVE EXAMPLE 12 | 50 | 10 | 26 | 92.5 |
| COMPARATIVE EXAMPLE 13 | — | — | 12 | 92.0 |
| COMPARATIVE EXAMPLE 14 | — | — | 12 | 92.0 |
| COMPARATIVE EXAMPLE 15 | — | — | 12 | 92.0 |
| COMPARATIVE EXAMPLE 16 | — | — | 12 | 92.0 |
| COMPARATIVE EXAMPLE 17 | — | — | 12 | 92.0 |
| COMPARATIVE EXAMPLE 18 | — | — | 12 | 92.0 |
| COMPARATIVE EXAMPLE 19 | — | — | 12 | 92.0 |

| | Content (wt. %) | Petroleum resin and terpene resin | Content (wt. %) | Stretching ratio (longitudinal × transverse) |
|---|---|---|---|---|
| COMPARATIVE EXAMPLE 1 | 100 | — | — | 5 × 10 |
| COMPARATIVE EXAMPLE 2 | 100 | — | — | 7 × — |
| COMPARATIVE EXAMPLE 3 | 100 | — | — | (5 × 13) |
| COMPARATIVE EXAMPLE 4 | 100 | — | — | 5 × — |
| COMPARATIVE EXAMPLE 11 | 100 | — | — | 5 × 12 |
| COMPARATIVE EXAMPLE 12 | 95 | unhydrogenated gum rosin | 5 | 5 × 11 |
| COMPARATIVE EXAMPLE 13 | 100 | — | — | 8 × — |
| COMPARATIVE EXAMPLE 14 | 97 | hydrogenated β-pinene | 3 | 5 × 9 |
| COMPARATIVE EXAMPLE 15 | 97 | hydrogenated β-pinene | 3 | (7 × 8) |
| COMPARATIVE EXAMPLE 16 | 97 | hydrogenated β-pinene | 3 | 8 × — |
| COMPARATIVE EXAMPLE 17 | 90 | hydrogenated β-pinene | 10 | 5 × 9 |
| COMPARATIVE EXAMPLE 18 | 90 | hydrogenated β-pinene | 10 | (8 × 7) |
| COMPARATIVE EXAMPLE 19 | 90 | hydrogenated β-pinene | 10 | 9 × — |

TABLE 8

| | Young's modulus (longitudinal) at 25° C. (GPa) | Young's modulus (transverse) at 25° C. (GPa) | m value at 25° C. (—) | F2 value (longitudinal) at 25° C. (MPa) | F5 value (longitudinal) at 25° C. (MPa) |
|---|---|---|---|---|---|
| COMPARATIVE EXAMPLE 1 | 1.8 | 3.7 | 0.33 | 33 | 40 |
| COMPARATIVE EXAMPLE 2 | — | — | — | — | — |
| COMPARATIVE EXAMPLE 3 | — | — | — | — | — |
| COMPARATIVE EXAMPLE 4 | — | — | — | — | — |
| COMPARATIVE EXAMPLE 11 | 1.7 | 2.1 | 0.45 | 41 | 50 |
| COMPARATIVE EXAMPLE 12 | 1.9 | 4.2 | 0.31 | 37 | 44 |
| COMPARATIVE EXAMPLE 13 | 2.7 | 1.1 | 0.71 | 43 | 97 |
| COMPARATIVE EXAMPLE 14 | 2.1 | 4.0 | 0.34 | 38 | 45 |
| COMPARATIVE EXAMPLE 15 | — | — | — | — | — |
| COMPARATIVE EXAMPLE 16 | — | — | — | — | — |

TABLE 8-continued

| | | | | | |
|---|---|---|---|---|---|
| COMPARATIVE EXAMPLE 17 | 2.4 | 4.7 | 0.34 | 40 | 49 |
| COMPARATIVE EXAMPLE 18 | — | — | — | — | — |
| COMPARATIVE EXAMPLE 19 | — | — | — | — | — |

| | Young's modulus (longitudinal) at 80° C. (GPa) | Young's modulus (transverse) at 80° C. (GPa) | m value at 80° C. (−) |
|---|---|---|---|
| COMPARATIVE EXAMPLE 1 | 0.30 | 0.60 | 0.33 |
| COMPARATIVE EXAMPLE 2 | — | — | — |
| COMPARATIVE EXAMPLE 3 | — | — | — |
| COMPARATIVE EXAMPLE 4 | — | — | — |
| COMPARATIVE EXAMPLE 11 | 0.21 | 0.25 | 0.46 |
| COMPARATIVE EXAMPLE 12 | 0.25 | 0.55 | 0.31 |
| COMPARATIVE EXAMPLE 13 | 0.40 | 0.15 | 0.73 |
| COMPARATIVE EXAMPLE 14 | 0.28 | 0.55 | 0.34 |
| COMPARATIVE EXAMPLE 15 | — | — | — |
| COMPARATIVE EXAMPLE 16 | — | — | — |
| COMPARATIVE EXAMPLE 17 | 0.28 | 0.50 | 0.36 |
| COMPARATIVE EXAMPLE 18 | — | — | — |
| COMPARATIVE EXAMPLE 19 | — | — | — |

| | Heat shrinkage (longitudinal) at 120° C. (%) | Heat shrinkage (transverse) at 120° C. (%) | Sum of heat shrinkage at 120° C. | Water vapor permeability (g/m$^2$/d/0.1 mm) | Converting ability |
|---|---|---|---|---|---|
| COMPARATIVE EXAMPLE 1 | 4.0 | 2.0 | 6.0 | 1.6 | Poor |
| COMPARATIVE EXAMPLE 2 | — | — | — | — | — |
| COMPARATIVE EXAMPLE 3 | — | — | — | — | — |
| COMPARATIVE EXAMPLE 4 | — | — | — | — | — |
| COMPARATIVE EXAMPLE 11 | 1.5 | 0.5 | 2.0 | 2.2 | Poor |
| COMPARATIVE EXAMPLE 12 | 3.1 | 1.7 | 4.8 | 2.0 | Poor |
| COMPARATIVE EXAMPLE 13 | 4.0 | −0.5 | 3.5 | 1.8 | Poor |
| COMPARATIVE EXAMPLE 14 | 4.0 | 1.0 | 5.0 | 1.4 | Poor |
| COMPARATIVE EXAMPLE 15 | — | — | — | — | — |
| COMPARATIVE EXAMPLE 16 | — | — | — | — | — |
| COMPARATIVE EXAMPLE 17 | 4.2 | 1.8 | 6.0 | 1.0 | Poor |
| COMPARATIVE EXAMPLE 18 | — | — | — | — | — |
| COMPARATIVE EXAMPLE 19 | — | — | — | — | — |

Tables 5 to 8 demonstrate that, since the biaxially stretched polypropylene film comprises a polypropylene which comprises a polypropylene having a Trouton ratio of 30 or more or a polypropylene which consists of a polypropylene having a Trouton ratio of 16 or more, and at least one additive that has compatibility with the polypropylene and can provide plasticity during stretching, a film having a high tension resistance and superior dimensional stability and moisture-proof property can be prepared. Moreover, such a superior quality film can be stably manufactured without process failures such as film breakages by using a conventional longitudinal-transverse sequential biaxial stretching machine.

Example 30

A biaxially stretched polypropylene film of EXAMPLE 30 having a thickness of 15 µm was prepared as in EXAMPLE 3 except that the temperature of the cooling drum was increased to 80° C. to prepare the unstretched sheet. The results of evaluation of the film characteristics are shown in Table 9.

Comparative Example 20

A biaxially stretched polypropylene film of COMPARATIVE EXAMPLE 20 having a thickness of 15 µm was prepared as in COMPARATIVE EXAMPLE 1 except that the temperature of the cooling drum was increased to 80° C. to prepare the unstretched sheet. The results of evaluation of the film characteristics are shown in Table 9.

fibrils and the width of the fibrils were controllable by adjusting the film-forming conditions such as the temperature of the cooling drum. In contrast, conventional films of the COMPARATIVE EXAMPLES did not contain longitudinal fibrils, and the fibril structures readily deformed against applied stresses, resulting in a film having low tension resistance and, because the films did not satisfy the above-described formula, exhibited poor converting ability. Furthermore, no longitudinal fibrils were obtained even when the film-forming conditions were altered.

TABLE 10

|  | Presence of longitudinal fibrils | Average width of longitudinal fibrils | No. of longitudinal fibrils | formula (5) |
| --- | --- | --- | --- | --- |
| EXAMPLE 1 | A | 75 | 3 | Satisfied |
| EXAMPLE 3 | C | 59 | 2 | Satisfied |
| EXAMPLE 17 | A | 120 | 5 | Satisfied |

TABLE 9

|  | Young's modulus (longitudinal) at 25° C. (GPa) | Young's modulus (transverse) at 25° C. (GPa) | m value at 25° C. (-) | F2 value (longitudinal) at 25° C. (MPa) | F5 value (longitudinal) at 25° C. (MPa) |
| --- | --- | --- | --- | --- | --- |
| EXAMPLE 30 | 4.0 | 3.5 | 0.53 | 63 | 88 |
| COMPARATIVE EXAMPLE 20 | 1.9 | 3.9 | 0.33 | 33 | 41 |

|  | Young's modulus (longitudinal) at 80° C. (GPa) | Young's modulus (transverse) at 80° C. (GPa) | m value at 80° C. (-) |
| --- | --- | --- | --- |
| EXAMPLE 30 | 0.70 | 0.50 | 0.58 |
| COMPARATIVE EXAMPLE 20 | 0.30 | 0.60 | 0.33 |

|  | Heat shrinkage (longitudinal) at 120° C. (%) | Heat shrinkage (transverse) at 120° C. (%) | Sum of heat shrinkage at 120° C. (%) | Water vapor permeability (g/m²/d/0.1 mm) | Converting ability |
| --- | --- | --- | --- | --- | --- |
| EXAMPLE 30 | 2.7 | 0.3 | 3.0 | 1.0 | Good |
| COMPARATIVE EXAMPLE 20 | 3.9 | 1.8 | 5.7 | 1.6 | Poor |

Observation Results of Fibril Structures of Examples 1, 3, 17, 19, and 30, and Comparative Examples 1, 5, 17 and 20

The fibril structure of each of the films of EXAMPLES 1, 3, 17, 19, and 30, and COMPARATIVE EXAMPLES 1, 5, 17 and 20 described above was observed by using an atomic force microscope (AFM).

The observation results of the fibril structures are shown in Table 10. The films contained longitudinal fibrils that rarely deform against applied stresses, resulting in a film having a superior tension resistance. Moreover, the handling convenience during converting process was also superior because the formula below between Young's modulus in the longitudinal direction Y(MD) at 25° C. and the heat shrinkage in the longitudinal direction S(MD) at 120° C. was satisfied:

$Y(MD) \geq S(MD) - 1$.

Accordingly, a film having such superior characteristics can be stably manufactured. Moreover, the number of the TABLE 10-continued

|  | Presence of longitudinal fibrils | Average width of longitudinal fibrils | No. of longitudinal fibrils | formula (5) |
| --- | --- | --- | --- | --- |
| EXAMPLE 19 | B | 70 | 2 | Satisfied |
| EXAMPLE 30 | A | 72 | 3 | Satisfied |
| COMPARATIVE EXAMPLE 1 | NONE | — | — | Not satisfied |
| COMPARATIVE EXAMPLE 5 | NONE | — | — | Not satisfied |
| COMPARATIVE EXAMPLE 17 | NONE | — | — | Not satisfied |
| COMPARATIVE EXAMPLE 20 | NONE | — | — | Not satisfied |

Example 31

A biaxially stretched polypropylene film was prepared by biaxial stretching as in EXAMPLE 3 except that the antistatic agent was not added and that the amount of the crosslinked particles of a polymethacrylicacid-based copolymer (crosslinked PMMA) having an average particle size of 2μm was changed to 0.05 parts by weight. Subsequently, one side of the film was subjected to corona discharge treatment in an atmosphere containing 15% of carbon dioxide gas and 85% of nitrogen gas to obtain a biaxially stretched polypropylene film with a surface wetting tension of 45 mN/m. The biaxially stretched polypropylene film was then installed in a vacuum metallization apparatus. While the film was allowed to run, aluminum metal was heated, melted, and evaporated so that a layer having a thickness of 30 nm was deposited on the side that had been subjected to corona discharge treatment. Thus, a metallized biaxially stretched polypropylene film was obtained.

The gas barrier properties of the metallized biaxially stretched polypropylene film were as follows: oxygen permeability: 200 ml/$m^2$.d.MPa; and water vapor permeability: 0.2 g/$m^2$.d. The gas barrier property after converting process was as follows: oxygen permeability: 205 ml/$m^2$.d.MPa; and water vapor permeability: 0.2 g/$m^2$.d. No significant change in gas barrier properties was observed.

Example 32

A biaxially stretched polypropylene film was prepared as in EXAMPLE 5, except that the antistatic agent and the crosslinked PMMA particles were not added and that 0.05 parts by weight of crosslinked silicon particles having an average particle size of 2 μm were added. Then metallized biaxially stretched polypropylene film was prepared as in EXAMPLE 31.

The gas barrier properties of the metallized biaxially stretched polypropylene film were as follows: oxygen permeability: 150 ml/$m^2$.d.MPa; and water vapor permeability: 0.15 g/$m^2$.d. The gas barrier properties, i.e., the oxygen permeability and the water vapor permeability, after converting process were the same as those before converting.

Example 33

A biaxially stretched polypropylene film was prepared as in EXAMPLE 16, except that the antistatic agent was not added and that 0.02 parts by weight of crosslinked PMMA particles having an average particle size of 2 μm were added. Then metallized biaxially stretched polypropylene film was prepared as in EXAMPLE 31.

The gas barrier properties of the metallized biaxially stretched polypropylene film were as follows: oxygen permeability: 130 ml/$m^2$.d.MPa; and water vapor permeability: 0.13 g/$m^2$.d.MPa. The gas barrier properties, i.e., the oxygen permeability and the water vapor permeability, after converting process were the same as those before converting.

Example 34

In EXAMPLE 26, a metallized biaxially stretched polypropylene film was prepared as in EXAMPLE 33.

The gas barrier properties of the metallized biaxially stretched polypropylene film were as follows: oxygen permeability: 100 ml/$m^2$.d.MPa; and water vapor permeability: 0.1 g/$m^2$.d. The gas barrier properties, i.e., the oxygen permeability and the water vapor permeability, after converting process were the same as those before converting.

Comparative Example 21

A biaxially stretched polypropylene film was prepared as in COMPARATIVE EXAMPLE 1 except that the antistatic agent was not added and that the amount of the crosslinked particles of a polymethacrylicacid-based copolymer (crosslinked PMMA) having an average particle size of 2 μm was changed to 0.05 part by weight as in EXAMPLE 31. Using this film, a metallized biaxially stretched polypropylene film was obtained as in EXAMPLE 31.

The gas barrier properties of the metallized biaxially stretched polypropylene film were as follows: oxygen permeability: 300 ml/$m^2$.d.MPa; and water vapor permeability: 0.25 g/$m^2$.d. The metallized biaxially stretched polypropylene film had low Young's modulus in the longitudinal direction, insufficient tension resistance, and poor converting ability. The gas barrier properties after converting process were as follows: oxygen permeability: 620 ml/$m^2$.d.MPa; and water vapor permeability: 0.23 g/$m^2$.d. The oxygen permeability dramatically degraded after converting.

Comparative Example 22

In COMPARATIVE EXAMPLE 8, a metallized biaxially stretched polypropylene film was prepared as in EXAMPLE 31. The gas barrier properties of the metallized biaxially stretched polypropylene film were as follows: oxygen permeability: 270 ml/$m^2$.d.MPa; and water vapor permeability: 0.28 g/$m^2$.d.

The metallized biaxially stretched polypropylene film had a low Young's modulus at high temperature, i.e., 80° C., insufficient tension resistance, and poor converting ability. The gas barrier properties after converting process were as follows: oxygen permeability: 680 ml/$m^2$.d.MPa; and water vapor permeability: 0.23 g/$m^2$.d. The oxygen permeability dramatically degraded after converting.

Example 35

The resin composition as in EXAMPLE 3 but without the antistatic agent and with 0.05 part by weight of crosslinked particles of the polymethacrylicacid-based polymer (crosslinked PMMA) was extruded and formed into a sheet as in EXAMPLE 3 to prepare a core layer. The sheet was stretched in the longitudinal direction to 8 times the initial length as in EXAMPLE 1, and the surface of the film stretched to 8 times was subjected to corona discharge treatment in air so as to obtain a surface wetting tension of 37 mN/m. A blended coating material containing 100 parts by weight of "Hydran" AP-40F (manufactured by Dainippon Ink and Chemicals, Inc., solid content: 30%) as a water-dispersible polyesterpolyurethane-based resin, 15 parts by weight of N-methylpyrrolidone as a water-soluble organic solvent, and 5 parts by weight of a melamine compound, i.e., "Beckamine" APM (manufactured by Dainippon Ink and Chemicals, Inc.) as a crosslinking agent, and 2 parts by weight of a water-soluble acidic compound, i.e., "Catalyst" PTS (manufactured by Dainippon Ink and Chemicals, Inc.) as a crosslinking accelerator was applied on this treated surface by a coating bar to form a coating layer. Subsequently, the coated film was stretched in the transverse direction as in EXAMPLES so as to prepare a biaxially stretched polypropylene film. The film thickness construction was coating layer/core layer=0.2 μm/15 μm. The adhesive strength between the surface of the film of the present invention and the coating layer was 2.3 N/cm, the centerline average roughness Ra of the coating layer was 0.03 μm, and the surface gloss was 140%.

Next, the biaxially stretched polypropylene film was installed in a vacuum metallizing apparatus, and aluminum metal was heated, melted, and evaporated so that the evaporated aluminum cohere and deposit on the film surface to make a metallization layer. Thus, a metallized biaxially stretched polypropylene film was obtained.

The gas barrier properties of the metallized biaxially stretched polypropylene film were as follows: oxygen permeability: 20 ml/m$^2$.d.MPa; and water vapor permeability: 0.07 g/m$^2$.d. The adhesive strength between the coating layer and the metallization layer was 1.7 N/cm. The gas barrier properties after converting process were maintained as high as those before converting and were as follows: oxygen permeability 22 ml/m$^2$.d.MPa; and water vapor permeability: 0.07 g/m$^2$.d.

Example 36

A biaxially stretched polypropylene film provided with a coating layer having a thickness of 0.2 μm was prepared as in EXAMPLE 35 except that a blended coating material containing 100 parts by weight of "Hydran" AP-40F (manufactured by Dainippon Ink and Chemicals, Inc., solid content: 30%) as a water-dispersible polyesterpolyurethane-based resin, 5 parts by weight of a melamine compound, i.e., "Beckamine" APM (manufactured by Dainippon Ink and Chemicals, Inc.) as a crosslinking agent, and 2 parts by weight of a water-soluble acidic compound, i.e., "Catalyst" PTS (manufactured by Dainippon Ink and Chemicals, Inc.) as a crosslinking accelerator was coated using the coating bar. The adhesive strength between the surface of the film and the coating layer was 2.0 N/cm, the centerline average roughness Ra of the coating layer was 0.03 μm, and the glossiness was 138%.

Next, an aluminum metallization layer was formed on the biaxially stretched polypropylene film as in EXAMPLE 34 so as to obtain a metallized biaxially stretched polypropylene film.

The gas barrier properties of the metallized biaxially stretched polypropylene film were as follows: oxygen permeability: 30 ml/m$^2$.d.MPa; and water vapor permeability: 0.08 g/m$^2$.d. The adhesive strength between the coating layer and the metallization layer was 1.5 N/cm. The gas barrier properties after converting process were maintained as high as those before converting and were as follows: oxygen permeability 32 ml/m$^2$.d.MPa; and water vapor permeability: 0.09 g/m$^2$.d.

Example 37

The surface of the biaxially stretched polypropylene film of EXAMPLE 16 was subjected to corona discharge treatment in air so as to obtain a surface wetting tension of 37 mN/m, and the blended coating material of EXAMPLE 34 was applied on this treated surface using an off-line gravure coater to form a coating layer having a thickness of 0.2 μm. The film was wound and subjected to aluminum metallization as in EXAMPLE 35 to obtain a metallized biaxially stretched polypropylene film.

The gas barrier properties of the metallized biaxially stretched polypropylene film were as follows: oxygen permeability: 10 ml/m$^2$.d.MPa; and water vapor permeability: 0.08 g/m$^2$.d. The adhesive strength between the biaxially stretched polypropylene film and the coating layer was 3 N/cm, and the adhesive strength between the coating layer and the metallization layer was 2 N/cm. The gas barrier properties after converting process were maintained as high as those before converting and were as follows: oxygen permeability 12 ml/m$^2$.d.MPa; and water vapor permeability: 0.08 g/m$^2$.d.

Example 38

A biaxially stretched polypropylene film was prepared as in EXAMPLE 26 but without adding the antistatic agent and the particles and a coating layer was formed as in EXAMPLE 35. Subsequently, a metallized biaxially stretched polypropylene film was prepared as in EXAMPLE 35.

The gas barrier properties of the metallized biaxially stretched polypropylene film were as follows: oxygen permeability: 8 ml/m$^2$.d.MPa; and water vapor permeability: 0.05 g/m$^2$.d. The adhesive strength of the coating layer was 3.2 N/cm, and the adhesive strength between the coating layer and the metallization layer was 2.5 N/cm. The gas barrier properties after converting process were maintained as high as those before converting and were as follows: oxygen permeability 8 ml/m$^2$.d.MPa; and water vapor permeability: 0.05 g/m$^2$.d.

Comparative Example 23

A metallized biaxially stretched polypropylene film was prepared as in EXAMPLE 35 but with a different coating material prepared as follows. In the presence of a catalyst, 0.12 mol of terephthalic acid, 0.84 mol of isophthalic acid, 0.33 mol of diethylene glycol, and 0.65 mol of neopentyl glycol were allowed to react at 190 to 220° C. for 6 hours while removing distillation water, and the resulting substance was subjected to condensation reaction for 1 hour at 250° C. in vacuum so as to obtain a prepolymer. The prepolymer was blended with 0.13 mol of 5-(2,5dioxotetrahydrofurfryl)-3-methyl-3-cyclohexene-1,2-dicarboxyl anhydride so as to perform selective monoesterification reaction at 140° C. for 3 hours to obtain a polymer. Next, the polymer was neutralized with ammonia to prepare a polyester resin. To 100 parts by weight of active principle of the polyester resin, 10 parts by weight of an isocyanate compound, i.e., hexamethylene diisocyanate as a crosslinking agent and 1.5 parts by weight of "Catalyst" PTS (manufactured by Dainippon Ink and Chemicals, Inc.) as a crosslinking catalyst were added to prepare the coating material.

The gas barrier properties of the metallized biaxially stretched polypropylene film were as follows: oxygen permeability: 120 ml/m$^2$.d.MPa; and water vapor permeability: 0.1 g/m$^2$.d. The adhesive strength between the metallized biaxially stretched polypropylene film and the coating layer was low, and coating layer peeled from the film during converting process. Thus, the gas barrier properties were dramatically decreased to an oxygen permeability of 750 ml/m$^2$.d.MPa and a water vapor permeability of 0.35 g/m$^2$.d.

Comparative Examples 24 and 25

A metallized biaxially stretched polypropylene film of COMPARATIVE EXAMPLE 24 was prepared as in EXAMPLE but with a coating layer having a thickness of 0.03 μm. A metallized biaxially stretched polypropylene film of COMPARATIVE EXAMPLE 25 was prepared as in EXAMPLE 35 but with a coating layer having a thickness of 4 μm.

In COMPARATIVE EXAMPLE 24, gas barrier properties did not improve due to the thin coating layer. The oxygen permeability was 195 ml/m$^2$.d.MPa, and the water vapor permeability was 0.2 g/m$^2$.d.

In COMPARATIVE EXAMPLE 25, the coating layer did not sufficiently cure due to the large thickness of the layer, and the adhesive strength to the film surface was low. As for the gas barrier properties, the oxygen permeability was 210 ml/m$^2$.d.MPa, and the water vapor permeability was 0.13 g/m$^2$.d.

Comparative Example 26

In COMPARATIVE EXAMPLE 1, a metallized biaxially stretched polypropylene film was prepared as in EXAMPLE 35.

Due to the deposition of the coating layer, the gas barrier properties of the metallized biaxially stretched polypropylene film were improved, i.e., oxygen permeability: 30 ml/m$^2$.d.MPa, and water vapor permeability: 0.15 g/m$^2$.d. However, because the metallized biaxially stretched polypropylene film had a low Young's modulus in the longitudinal direction and insufficient tension resistance, the gas barrier properties significantly degraded after converting process, i.e., oxygen permeability: 420 ml/m$^2$.d.MPa; and water vapor permeability: 0.27 g/m$^2$.d.

Comparative Example 27

In COMPARATIVE EXAMPLE 14, a metallized biaxially stretched polypropylene film was prepared as in EXAMPLE 35. Due to the coating layer, the gas barrier properties of the metallized biaxially stretched polypropylene film were improved, i.e., oxygen permeability: 27 ml/m$^2$.d.MPa, and water vapor permeability: 0.10 g/m$^2$.d. However, because the metallized biaxially stretched polypropylene film had a low Young's modulus in the longitudinal direction and insufficient tension resistance, the gas barrier properties significantly degraded after converting process, i.e., oxygen permeability: 370 ml/m$^2$.d.MPa; and water vapor permeability: 0.23 /m$^2$.d.

TABLE 11

| | Thickness arrangement (μm) base layer/coating layer/metallization layer | Young's modulus (longitudinal) at 25° C. (GPa) | Adhesive strength between surface and the coating layer (N/cm) | Adhesive strength of the metallization layer (N/cm) |
|---|---|---|---|---|
| EXAMPLE 31 | 15/—/0.03 | 3.1 | — | 0.7 |
| EXAMPLE 32 | 15/—/0.03 | 3.6 | — | 0.6 |
| EXAMPLE 33 | 15/—/0.03 | 3.9 | — | 0.7 |
| EXAMPLE 34 | 15/0.2/0.03 | 4.2 | — | 0.7 |
| EXAMPLE 35 | 15/0.2/0.03 | 3.1 | 2.3 | 1.7 |
| EXAMPLE 36 | 15/0.2/0.03 | 3.1 | 2.0 | 1.5 |
| EXAMPLE 37 | 15/0.2/0.03 | 3.9 | 3.0 | 2.0 |
| EXAMPLE 38 | 15/0.2/0.03 | 4.2 | 3.2 | 2.5 |
| COMPARATIVE EXAMPLE 21 | 15/—/0.03 | 2.0 | — | 0.7 |
| COMPARATIVE EXAMPLE 22 | 15/—/0.03 | 2.6 | — | 0.7 |
| COMPARATIVE EXAMPLE 23 | 15/0.2/0.03 | 3.1 | 0.7 | — |
| COMPARATIVE EXAMPLE 24 | 15/0.03/0.03 | 3.1 | 1.5 | 0.7 |
| COMPARATIVE EXAMPLE 25 | 15/4/0.03 | 3.1 | 1.0 | 0.2 |
| COMPARATIVE EXAMPLE 26 | 15/0.2/0.03 | 2.0 | 2.3 | 1.7 |
| COMPARATIVE EXAMPLE 27 | 15/0.2/0.03 | 2.1 | 2.3 | 1.7 |

| | Oxygen permeability after metallization (ml/m$^2$/d/MPa) | Water vapor permeability after metallization (g/m$^2$/d) | Oxygen permeability after converting process (ml/m$^2$/d/MPa) | Water vapor permeability after converting process (g/m$^2$/d) |
|---|---|---|---|---|
| EXAMPLE 31 | 200 | 0.20 | 205 | 0.20 |
| EXAMPLE 32 | 150 | 0.15 | 150 | 0.15 |
| EXAMPLE 33 | 130 | 0.13 | 130 | 0.13 |
| EXAMPLE 34 | 100 | 0.10 | 100 | 0.10 |
| EXAMPLE 35 | 20 | 0.07 | 22 | 0.07 |
| EXAMPLE 36 | 30 | 0.08 | 32 | 0.09 |
| EXAMPLE 37 | 10 | 0.08 | 12 | 0.08 |
| EXAMPLE 38 | 8 | 0.05 | 8 | 0.05 |
| COMPARATIVE EXAMPLE 21 | 300 | 0.25 | 620 | 0.28 |
| COMPARATIVE EXAMPLE 22 | 270 | 0.22 | 680 | 0.23 |
| COMPARATIVE EXAMPLE 23 | 120 | 0.10 | 750 | 0.35 |

TABLE 11-continued

| | | | | |
|---|---|---|---|---|
| COMPARATIVE EXAMPLE 24 | 195 | 0.20 | 200 | 0.20 |
| COMPARATIVE EXAMPLE 25 | 210 | 0.30 | 220 | 0.23 |
| COMPARATIVE EXAMPLE 26 | 30 | 0.15 | 420 | 0.27 |
| COMPARATIVE EXAMPLE 27 | 27 | 0.10 | 370 | 0.23 |

The results of the evaluation of the film characteristics are shown in Table 11. Because the biaxially stretched polypropylene film has high stiffness in the longitudinal direction, degradation in barrier property after converting process can be avoided when the film is used as a base film of a metallized film. Moreover, by forming a coating layer between the base layer and the metallization layer, the barrier property can be further enhanced.

INDUSTRIAL APPLICABILITY

A biaxially stretched polypropylene film has an increased stiffness in the longitudinal direction without degrading important characteristics such as dimensional stability and moisture-proof property, when compared with conventional biaxially stretched polypropylene films. Thus, the biaxially stretched polypropylene film has superior handling convenience and exhibits superior tension resistance against converting tension applied during film converting such as printing, laminating, coating, metallization, and bag-making. The troubles derived from the quality of the base film, such as cracks and print pitch displacement, can be avoided. Moreover, since the film has a stiffness in the longitudinal direction higher than that of the conventional polypropylene film of the same thickness and exhibits a superior tension resistance, sufficient converting ability can be maintained with a thickness smaller than that of conventional biaxially stretched polypropylene films.

The biaxially stretched polypropylene film is suitable for packaging and for industrial use.

The invention claimed is:

1. A biaxially stretched polypropylene film comprising a polypropylene which comprises a polypropylene having a melt strength (MS) and a melt flow rate (MFR) measured at 230° C. that satisfies formula (1) below:

$$\log(MS) > -0.61 \log(MFR) + 0.82 \quad (1)$$

and a petroleum resin substantially containing no polar-group and/or a terpene resin substantially containing no polar-group that has compatibility with the polypropylene and provides plasticity during stretching, wherein the Young's modulus in the longitudinal direction (Y(MD)) at 25° C. is at least 2.5 GPa.

2. A biaxially stretched polypropylene film comprising a polypropylene which consists of a polypropylene having a melt strength (MS) and a melt flow rate (MFR) measured at 230° C. that satisfies formula (2) below:

$$\log(MS) > -0.61 \log(MFR) + 0.52 \quad (2)$$

and a petroleum resin substantially containing no polar-group and/or a terpene resin substantially containing no polar-group that has compatibility with the polypropylene and provides plasticity during stretching, wherein the Young's modulus in the longitudinal direction (Y(MD)) at 25° C. is at least 2.5 GPa.

3. The biaxially stretched polypropylene film according to claim 1 or 2, wherein the polypropylene has a meso pentad fraction (mmmm) in the range of 90 to 99.5%.

4. The biaxially stretched polypropylene film according to claim 1 or 2, wherein the m value represented by the Young's modulus in the longitudinal direction (Y(MD)) and the Young's modulus in the transverse direction (Y(TD))

$$m = Y(MD)/(Y(MD) + Y(TD))$$

is in the range of 0.4 to 0.7 at 25° C.

5. The biaxially stretched polypropylene film according to claim 1 or 2, wherein, in a 1-μm square area of a surface of the biaxially stretched polypropylene film, one side of the area being parallel to the longitudinal direction, at least one longitudinal fibril having a width of at least 40 nm and extending across two sides parallel to the transverse direction is present.

6. A biaxially stretched polypropylene film comprising a polypropylene which comprises a polypropylene having a Trouton ratio of at least 30 and a petroleum resin substantially containing no polar-group and/or a terpane resin substantially containing no polar-group that has compatibility with the polypropylene and provides plasticity during stretching, wherein the Young's modulus in the longitudinal direction (Y(MD)) at 25° C. is at least 2.5 GPa.

7. A biaxially stretched polypropylene film comprising a poly-propylene which consists of a polypropylene having a Trouton ratio of at least 16 and a petroleum resin substantially containing no polar-group and/or a terpane resin substantially containing no polar-group that has compatibility with the polypropylene and provides plasticity during stretching, wherein the Young's modulus in the longitudinal direction (Y(MD)) at 25° C. is at least 2.5 GPa.

8. The biaxially stretched polypropylene film according to claim 6 or 7, wherein the polypropylene has a meso pentad fraction (mmmm) in the range of 90 to 99.5%.

9. The biaxially stretched polypropylene film according to claim 6 or 7, wherein the m value represented by the Young's modulus in the longitudinal direction (Y(MD)) and the Young's modulus in the transverse direction (Y(TD))

$$m = Y(MD)/(Y(MD))Y(TD)$$

is in the range of 0.4 to 0.7 at 25° C.

10. The biaxially stretched polypropylene film according to claim 6 or 7, wherein, in a 1-μm square area of a surface of the biaxially stretched polypropylene film, one side of the area being parallel to the longitudinal direction, at least one longitudinal fibril having a width of at least 40 nm and extending across two sides parallel to the transverse direction is present.

11. The biaxially stretched polypropylene film according to claim 10, wherein the formula between the Young's modulus in the longitudinal direction (Y(MD)) at 25° C. and the heat shrinking in the longitudinal direction (S(MD)) at 120° C. is satisfied:

$$Y(MD) \geq S(MD) - 1.$$

* * * * *

UNITED STATES PATENT AND TRADEMARK OFFICE
CERTIFICATE OF CORRECTION

PATENT NO. : 7,309,740 B2
APPLICATION NO. : 10/416396
DATED : December 18, 2007
INVENTOR(S) : Masuda et al.

Page 1 of 1

It is certified that error appears in the above-identified patent and that said Letters Patent is hereby corrected as shown below:

<u>In Column 37</u>:

In the formula at line 63, please insert -- . -- after "*(Y(TD))*".

<u>In Column 44</u>:

At lines 43 and 44, please change "($\sigma_s$=kγhda", $\sigma_s$: shear stress)" to -- ($\sigma_s = k\gamma_a^n$, $\sigma_s$: shear stress) --.

Signed and Sealed this

Nineteenth Day of August, 2008

JON W. DUDAS
*Director of the United States Patent and Trademark Office*